United States Patent
Maenosono et al.

(10) Patent No.: US 6,337,117 B1
(45) Date of Patent: Jan. 8, 2002

(54) OPTICAL MEMORY DEVICE

(75) Inventors: Shinya Maenosono; Ceco Dushkin; Yukio Yamaguchi; Harumi Asami; Soichiro Saita, all of Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/343,526

(22) Filed: Jun. 30, 1999

(30) Foreign Application Priority Data

| Jul. 1, 1998 | (JP) | 10-186098 |
| Sep. 7, 1998 | (JP) | 10-252239 |
| Sep. 16, 1998 | (JP) | 10-261333 |
| Nov. 17, 1998 | (JP) | 10-326339 |

(51) Int. Cl.$^7$ ................................. B32B 3/02
(52) U.S. Cl. ............. 428/64.1; 428/64.4; 428/147; 428/148; 428/690; 428/913; 430/495.1; 430/945
(58) Field of Search ............... 428/64.1, 64.2, 428/64.4, 143, 147, 148, 690, 913; 430/495.1, 945

(56) References Cited

U.S. PATENT DOCUMENTS 5,422,489 A * 6/1995 Bhargava ............... 250/488.1
5,456,961 A * 10/1995 Iida ........................ 428/64.4

* cited by examiner

*Primary Examiner*—Elizabeth Evans
(74) *Attorney, Agent, or Firm*—Oblon, Spivak, McClelland, Maier & Neustadt, P.C.

(57) ABSTRACT

An optical memory device comprising a luminous material capable of increasing and/or memorizing a photoluminescence intensity (hereinafter referred to as a "luminous intensity") as a function of irradiation energy of excitation light. And the luminous material comprises nanoparticles, diameters of which are smaller than Bohr radius of the luminous material so that excitons generated in the nanoparticles undergo quantum containment state in which the electrons and holes are individually contained as a result of irradiation with excitation light.

39 Claims, 39 Drawing Sheets

ILLUMINATION

FIG. 13 (a)
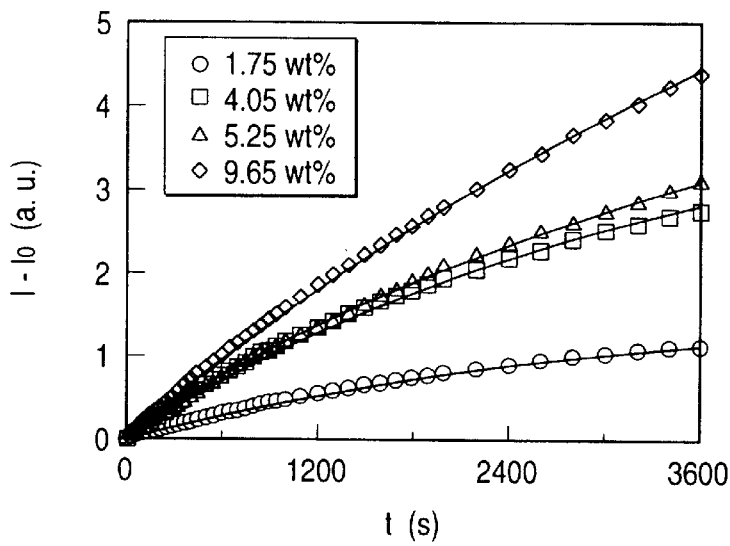
FIG. 13 (b)
FIG. 13 (c)
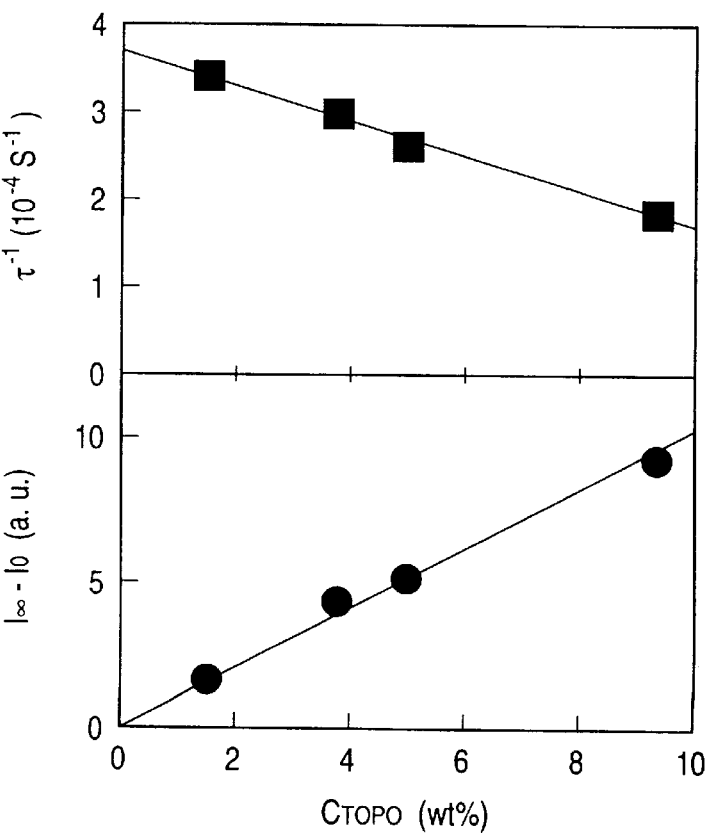

OPTICAL MEMORY DEVICE

BACKGROUND OF THE INVENTION

1. Field of the Invention

The present invention relates to an optical memory device, and more particularly, to an optical memory device operating according to a Time-Dependent Luminescence and Memory (TDLM) phenomenon which is actually a combination of two phenomena: a phenomenon that photoluminescence intensity is increased by exposure of the optical memory to excitation light; and another phenomenon that the photoluminescence intensity of the optical memory device before storage of the optical memory device is regained when the optical memory device is exposed to light after having been stored for a long period of time in a dark place without being exposed to light; namely, a retentive phenomenon.

Since the optical memory device can be subjected to rewriting and erasure a plurality of times, the optical memory device can be applied to fields such as information recording mediums, displays, image pick-up devices, image processing devices, retentive duplication, integration optical sensors, and multi-channel processors.

2. Description of the Related Art

Emission characteristics which do not change with time have been utilized for conventional light-emitting devices. The physical reason for such invariable characteristics is a very quick transition between energy levels.

The transition process is defined by Quantum mechanics and reflects interaction between carriers (electrons and holes) or excitons and photons. If the interaction (i.e., photo-(to-)electric or electric-(to-)photo conversion) is effected at very high speed within a considerably small space (on the order of atoms or molecules), luminous intensity also fluctuates at very high speed. Accordingly, in this case, the luminous intensity seems to remain unchanged on an ordinary time scale.

In most applications of light-emitting devices, from a practical viewpoint attention has conventionally been paid to materials other than nanoparticles(nano-size of particles); for example, a matrix (the continuous phase), such as polymers (Herron et al., and Buetje et al.), glass (Naoe et al.), and fluids, in which nanoparticles are embedded. Of these light-emitting devices, fluids are commonly used for measuring photoluminescence/spectrum of nanoparticles or visualization of color of the emitted light [see, for example, Dabbousi B. O., et al., J. Physic. Chem. 101, 9463 (1997)].

Light-emitting devices/mediums and optical processing devices/mediums, both using nanoparticles, are also disclosed. However, these employ light-emission characteristics which do not change with time. In all of these devices and mediums, nanoparticles (and their clusters) are spaced far apart from one another. Upon exposure to excitation light, each of the nanoparticles acts as a isolated single light-emitting substance. Such a structure of the light-emitting device is widely used for mediums such as light-emitting mediums or photoelectric materials (e.g., a photoelectric material disclosed by Herron et al.) used for producing an X-ray image.

High-density integration of nanoparticles, such as a nanoparticle film formed on a solid substrate or deposition of a nanoparticle layer, is of importance to application of nanoparticles to devices. A thin film of semiconductor nanoparticles is applied to a light-emitting diode (LED) (Alivisatos et al.), a photoelectric converting device [Greenham, N. C., et al., Phys. Rev. B, 54, 17628(1996)], an ultra high speed detector (Bhargave), an electroluminescence display and panel (Bhargave, Alivisatos et al.), a memory device of a nanostructure (Chen et al.) , and a multicolor device consisting of an arrangement of nanoparticles (Dushkin et al.) In most of these applications, nanoparticles are spaced in close proximity to one another within the thin film. Under certain conditions, nanoparticles exhibit a new photophysical property which is not observed in a single particle). The arrangement of particles [nanoparticle crystal (Murray et al.)] and the shift of the wavelength of emission (the red shift of the emission peak) of a patterned nanoparticle film (Dushkin et al.) are mentioned as examples of the photophysical property. The shift of the emission wavelength stems from long-distance resonance transportation of excitation among nanoparticles (kagan et al.).

However, for the functions of the devices and mediums the conventional art has not actively utilized the photophysical property that stems from the interaction among the particles. One conceivable reason for this is that the nanoparticle film does not have any definite (microscopic) structure and/or the structure is not uniform. Another conceivable reason is that basic interaction among the particles is cancelled by considerable interaction of electric fields (i.e., electroluminescence) (Alivisatos et al.).

The object of the present invention is to provide an optical memory device capable of increasing and storing luminous intensity.

SUMMARY OF THE INVENTION

To achieve the foregoing object, the present inventors actively utilized a collective function of a thin film for the first time, in which nanoparticles are arranged and integrated at high density. The collective function corresponds to the foregoing TDLM function of the nanoparticle film. By means of active utilization of such a function, formation of an image on the nanoparticle film can be achieved by utilization of an intensity ratio (contrast) between an exposed region and an unexposed region. The subject of the present invention is a unique photophysical property of a group of nanoparticles spatially arranged. This photophysical property differs from the physical properties of atoms and molecules, the physical properties of bulks, and the physical property of a single nanoparticle. The luminous intensity becomes greater by several orders of magnitude with time (typically with lapse of tens of minutes). At present, definite physical grounds for the process of shift in the arrangement of nanoparticles over a very long period of time still remain uncertain. Image pick-up and processing operations are examples of evident application of the foregoing phenomenon.

There will be given an explanation of a difference between the conventional technology and the TDLM phenomenon applied to the present invention.

All the conventional applications are directed toward generation of photons through recombination of carriers; namely, generation of carriers (electrons and holes) through interaction between photons and an external electric field, or vice versa. In contrast, the present invention employs the TDLM phenomenon, which is similar to optical pumping used for oscillating a laser (Sze, S. M., "Physics of Semiconductor Devices," Wiley, N.Y., 1981). The TDLM phenomenon corresponds to photo-to-photo conversion by means of generation and transportation of excitons or electron-hole pairs. Generation and transportation of electron-hole pairs is observed in a photo-refractive device/ medium such as an electro-optical crystal (Valley et al.) or a polymer (Sutter et al.). A photo-refractive device/medium records an image on the basis of the principle that carriers (electrons and holes) are spatially separated by exposure of the photo-refractive device/medium to spatially-periodic photo and an external field, which involves a change in refraction factor. This principle is generally called dynamic holography (Peyghambarian et al., Nature, vol. 383, Oct. 10, 1996, pg. 481). Transportation of excitons or carriers in the TDLM phenomenon leads to emission of light of different wavelengths (i.e., colors) from an image and differs from the photo-refractive phenomenon.

A hole-burning effect (Naoe et al.) observed in a semiconductor nanocrystal differs from the TDLM phenomenon, as will be described below. The hole-burning effect is usually observed in a matrix (continuous phase); for example, glass, in which nanoparticles of a certain particle size distribution are dispersed in an isolated manner. Upon exposure to a monochrome laser beam (i.e., a laser having a single wavelength), only a group of nanoparticles of a specific particle size corresponding to the wavelength are excited, and a spectrum hole can be formed at the wavelength of the laser beam in the unevenly spread absorption spectrum. Memory devices utilizing the hole-burning effect have already been proposed.

The TDLM phenomenon differs from the hole burning effect in the following three points:

1) The hole-burning effect utilizes absorption, whereas the TDLM phenomenon utilizes emission.
2) In the case of the hole-burning effect, the total amount of excitons or carriers remains unchanged when pumping is effected through use of excitation light having a predetermined luminous flux. In contrast, in the case of the TDLM phenomenon, the total amount of recombination is increased.
3) In the case of the hole-burning effect, a spectrum hole usually has a very short relaxation time; i.e., several microseconds or less, at room temperature. In contrast, in the case of the TDLM phenomenon, the relaxation time is on the order of several hours at room temperature.

Another phenomenon observed in a single quantum dot is intermittent emission of light (fluorescence) [Nirmal et al., Nature, pg. 383, 802(1996)]. More specifically, when an isolated single CdSe nanoparticle is continuously exposed to a laser beam and is excited, the nanoparticle blinkingly emits light (at a characteristic time of about 0.5 second). The intensity of light emitted after the light has once been extinguished is constant and remains unchanged.

In contrast, the present invention has been conceived by focusing on a characteristic that nanoparticles can increase, or increase and memorize, a photoluminescence intensity as a function of time and by applying such a characteristic to a device.

Accordingly, the present invention purports to provide the following:

According to a first aspect of the present invention, there is provided an optical memory device comprising:
a luminous material capable of increasing and/or memorizing a photoluminescence intensity (hereinafter referred to as a "luminous intensity") as a function of irradiation energy (time of excitation light or as a function of the dose) of excitation light.

According to a second aspect of the present invention, there is provided an optical memory device including luminous nanoparticles capable of increasing and/or memorizing a luminous intensity as a function of irradiation time of excitation light or as a function of the dose of excitation light, wherein
an organic compound including at least one device selected from the group comprising P, N, O and S exists in at least a portion of the surface of each luminous nanoparticle.

According to a third aspect of the present invention, there is provided an optical memory device comprising:
photoconductive material; and
luminous nanoparticles capable of increasing, or increasing and memorizing, a luminous intensity as a function of irradiation time of excitation light or as a function of the dose of excitation light, wherein the luminous nanoparticles and the photoconductive material are present in close proximity to each other.

According to a fourth aspect of the present invention, there is provided an optical memory device including luminous nanoparticles capable of increasing or increasing and memorizing a luminous intensity as a function of irradiation time of excitation light or as a function of the dose of excitation light, wherein at least a portion of the cluster of luminous nanoparticles comprises a protective layer formed from an insulating material.

According to a fifth aspect of the present invention, there is provided a nanoparticle thin film manufacturing method of forming on a solid substrate a thin film from extremely fine particles (hereinafter referred to as "nanoparticles") capable of increasing, or increasing and memorizing, a luminous intensity as a function of irradiation time of excitation light or as a function of the dose of excitation light, wherein
the solid substrate is coated, through spin coating with a suspension, which is formed by dissolving nanoparticles in a solvent in suspension, while being rotated at a speed of 500 rpm or more for ten seconds or more.

According to a sixth aspect of the present invention, there is provided a nanoparticle thin film manufacturing method of forming on a solid substrate a thin film from "nanoparticles" capable of increasing, or increasing and memorizing, a luminous intensity as a function of irradiation time of excitation light or as a function of the dose of excitation light, wherein
the solid substrate is coated, through ink-jet coating, with a dispersed solution, which is formed by dispersing nanoparticles in an emulsion whose continuous phase is a water phase and whose dispersed phase is an oily phase.

According to a seventh aspect of the present invention, there is provided a photoluminescence erasing method, wherein after the luminous intensity of an optical memory device—which includes luminous nanoparticles capable of increasing, or increasing and memorizing, a luminous intensity as a function of irradiation time of excitation light or as a function of the dose of excitation light—has been increased, or increased and memorized, the optical memory device is subjected to heat treatment, thereby diminishing the luminous intensity.

According to an eighth aspect of the present invention, there is provided an integrating optical sensor comprising:
a thin film including luminous nanoparticles capable of increasing, or increasing and memorizing, a luminous intensity as a function of irradiation time of excitation light or as a function of the dose of excitation light; and
a mask including a region which is exposed to light to be measured and a region which is not exposed to the light.

According to a ninth aspect of the present invention, there is provided an optical disk comprising, as a recording medium, luminous nanoparticles capable of decreasing, or decreasing and memorizing, reflectivity as a function of irradiation time of excitation light or as a function of the dose of excitation light.

In the present invention, luminous nanoparticles are usually used in a state of a gathering of luminous nanoparticles. The gathering of luminous nanoparticles can be in a state of clusters of luminous nanoparticles, gathering of luminous nanoparticles and another particles, clusters of luminous nanoparticles and so on.

DETAILED DESCRIPTION OF THE DRAWINGS

Figure 1:
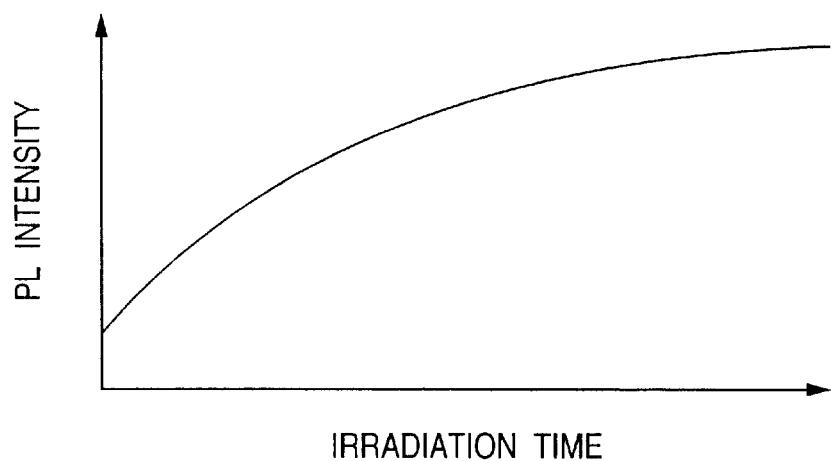
FIG. 1A is a diagrammatic graph showing a TDLM phenomenon.
FIG. 1B is a schematic representation showing a solid substrate coated with a film or layer having a TDLM effect (hereinafter referred to as a "TDLM thin film" or "TDLM film") when the substrate is exposed to excitation light.
Figure 1:
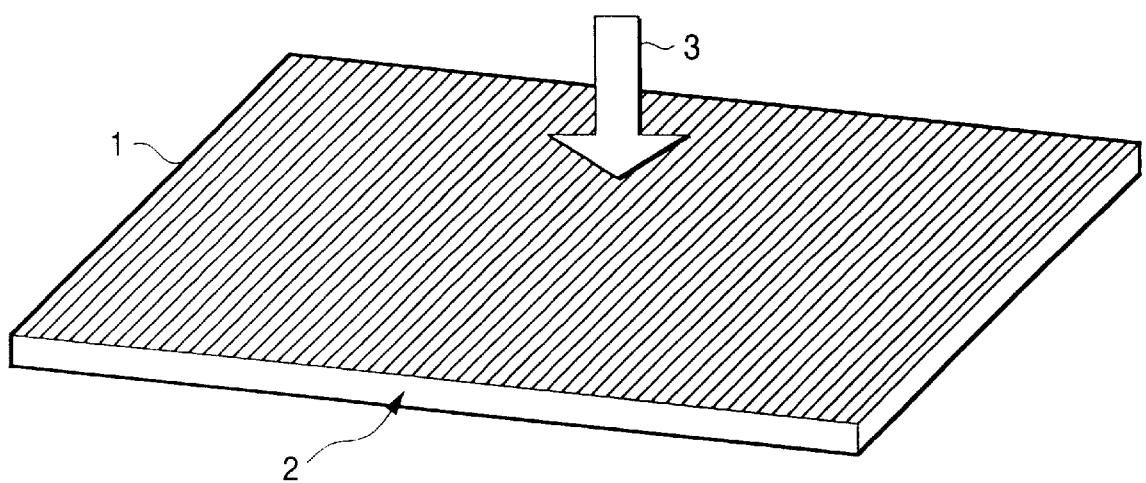
Figure 2:
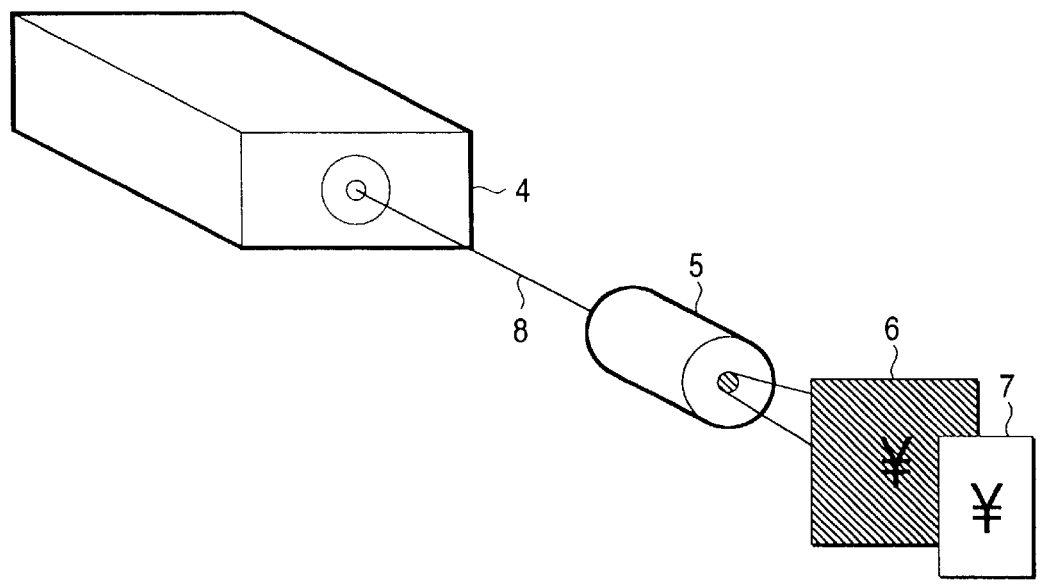
FIGS. 2A and 2B are schematic representations showing a test apparatus for forming an image on the TDLM film and reading the thus-formed image.
Figure 2:
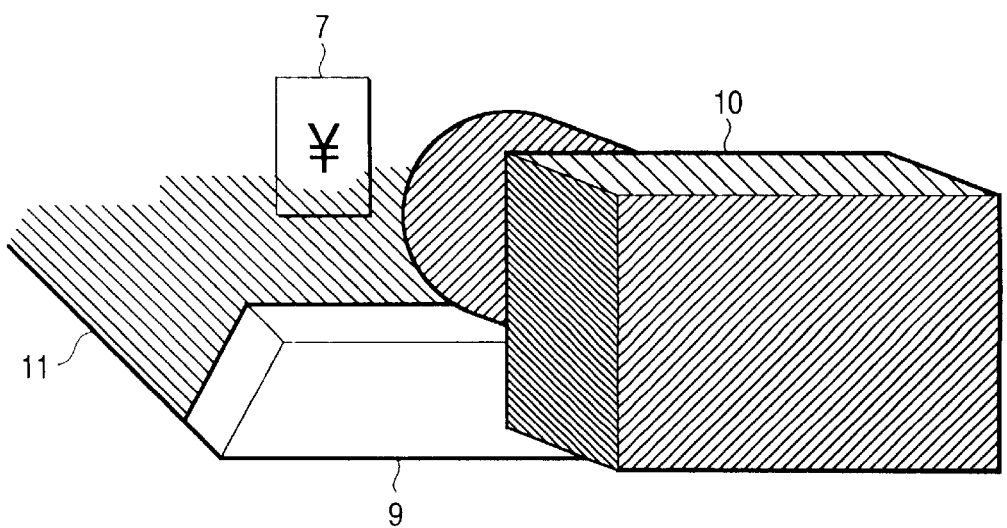
Figure 8:
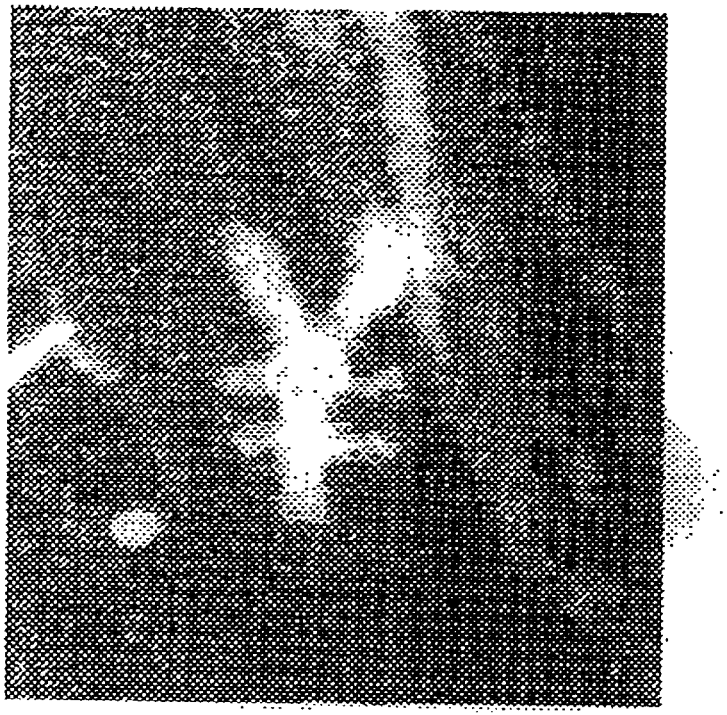
Figure 8:
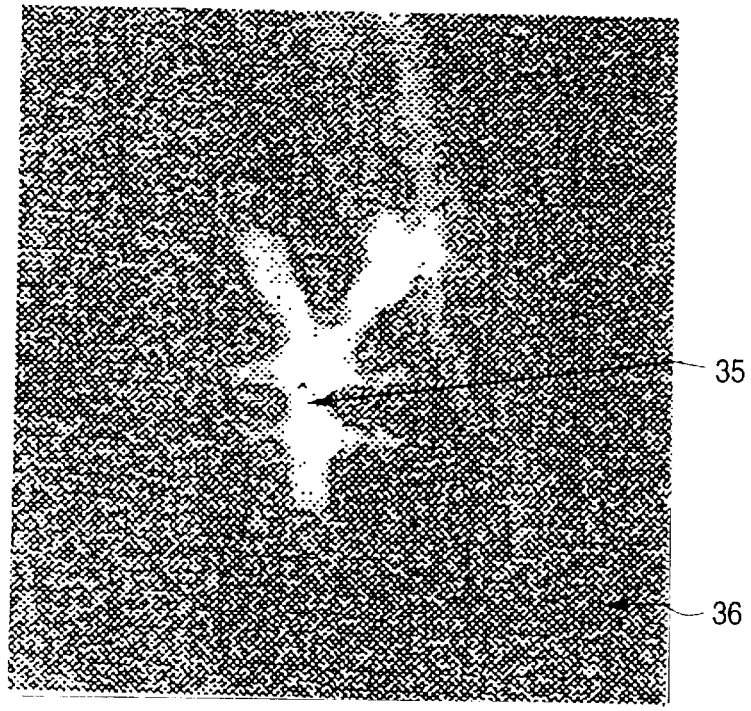
Figure 9:
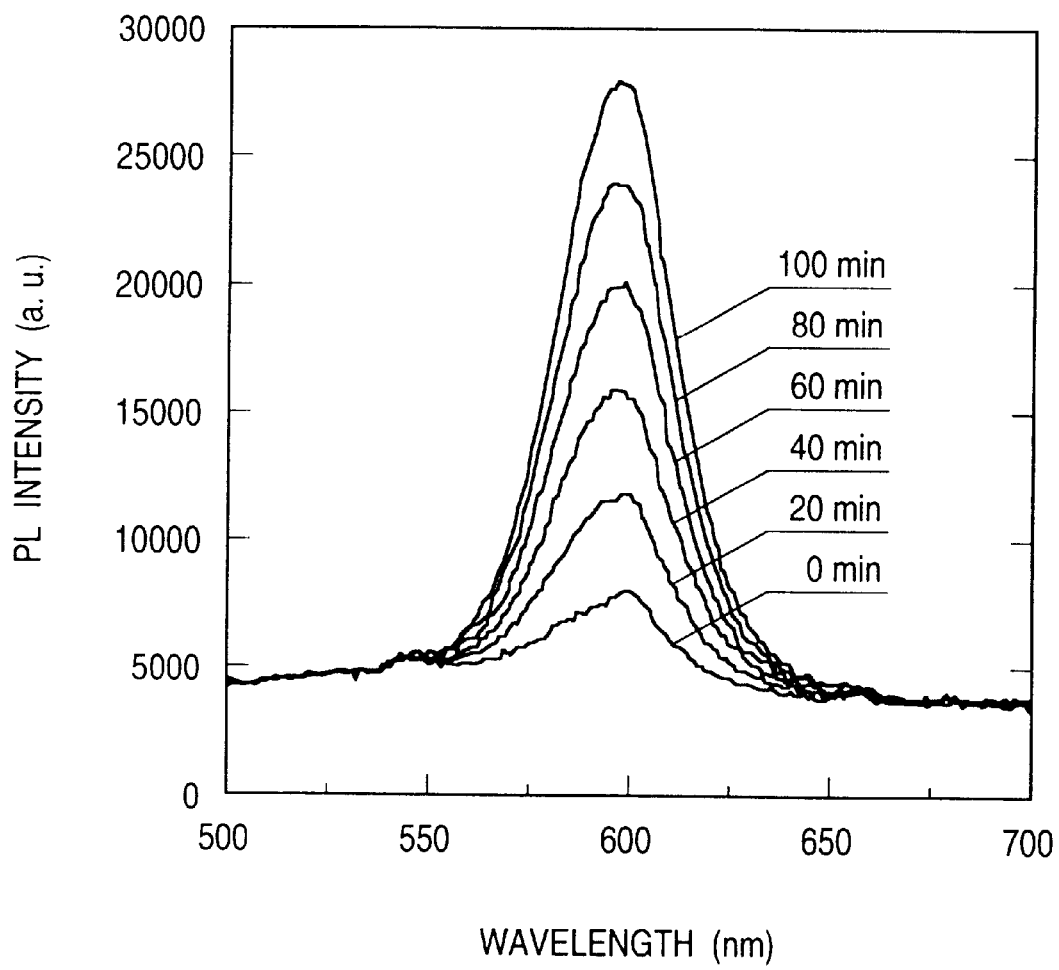
Figure 10:
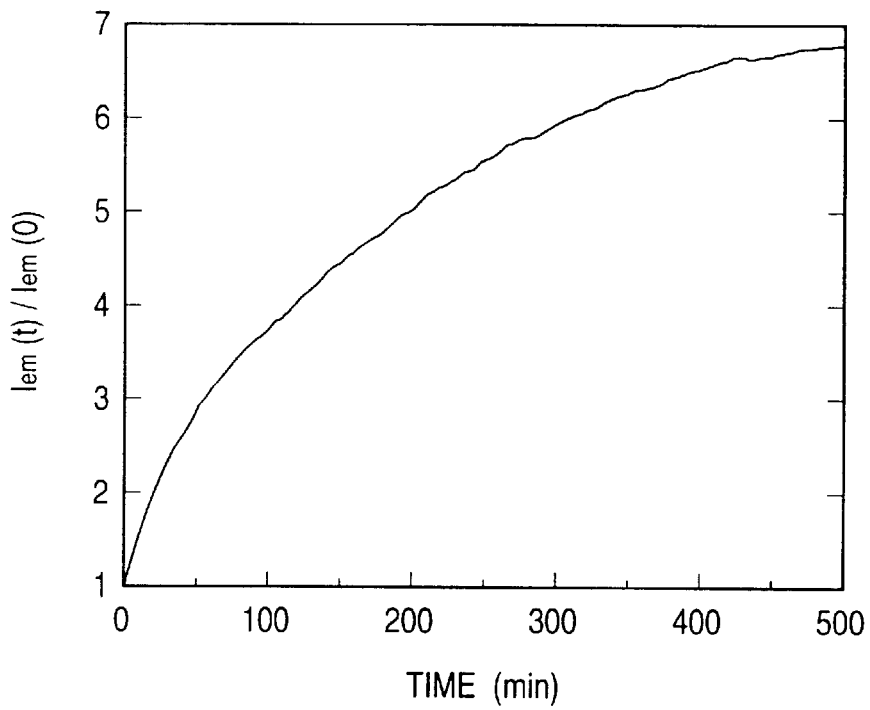
Figure 10:
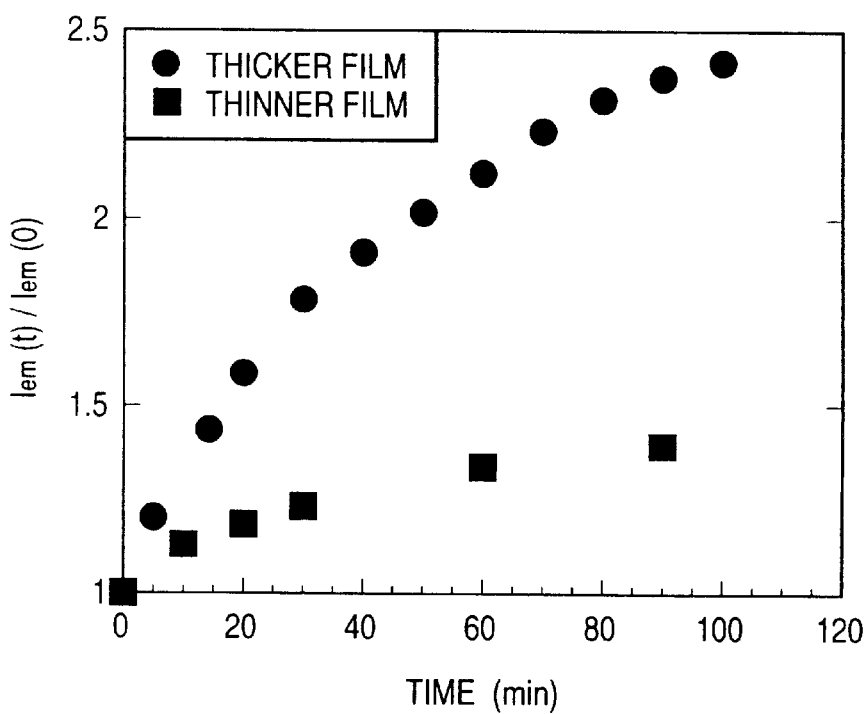
Figure 11:
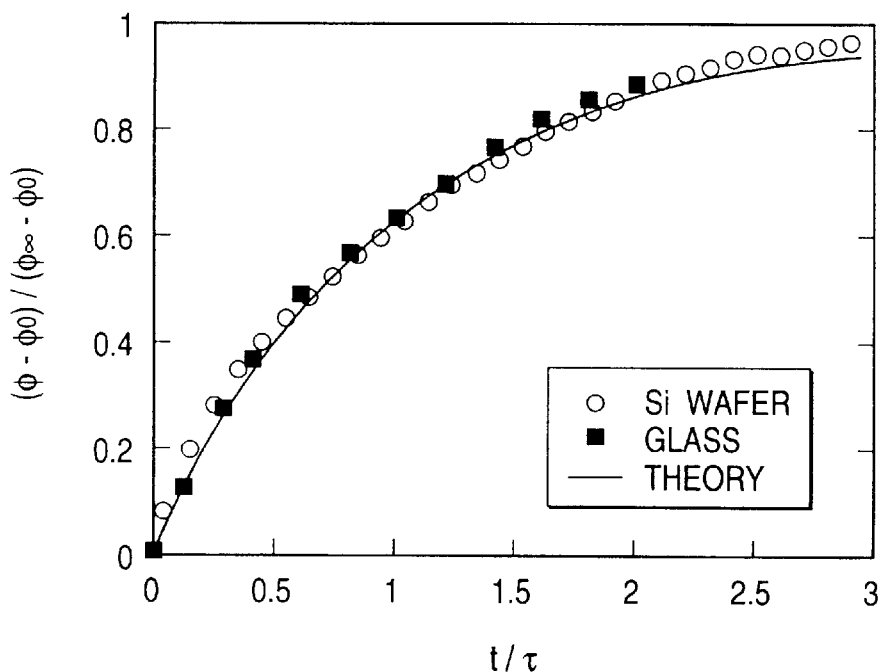
Figure 12:
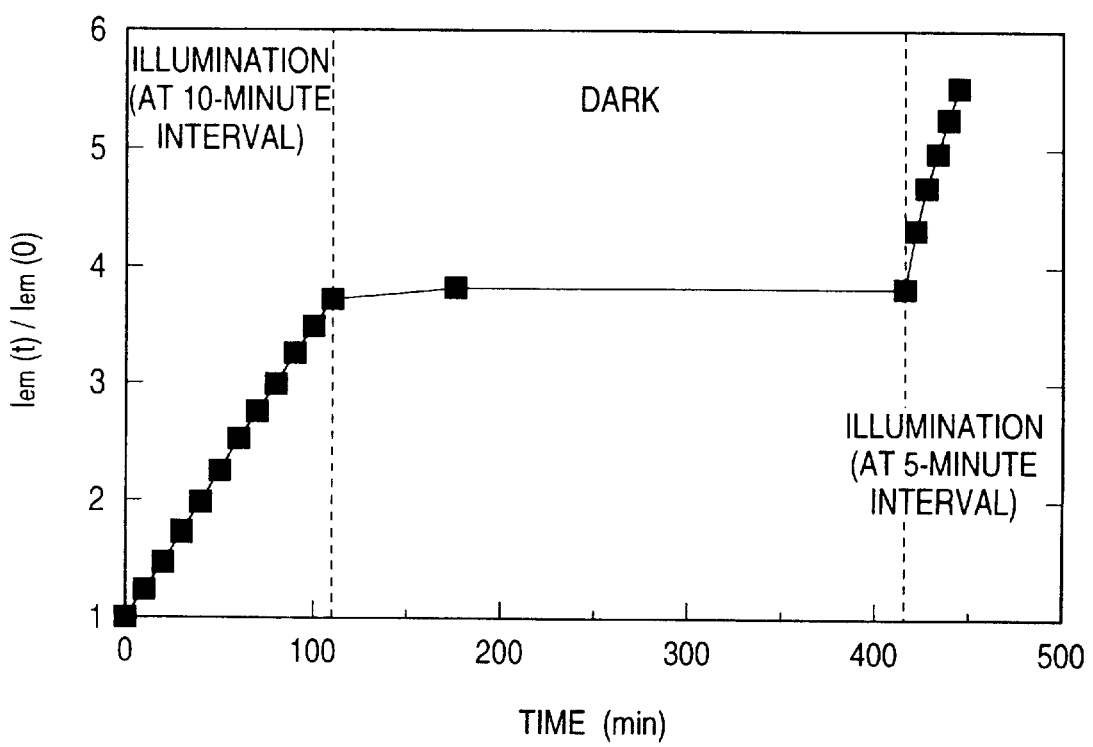
Figure 14:
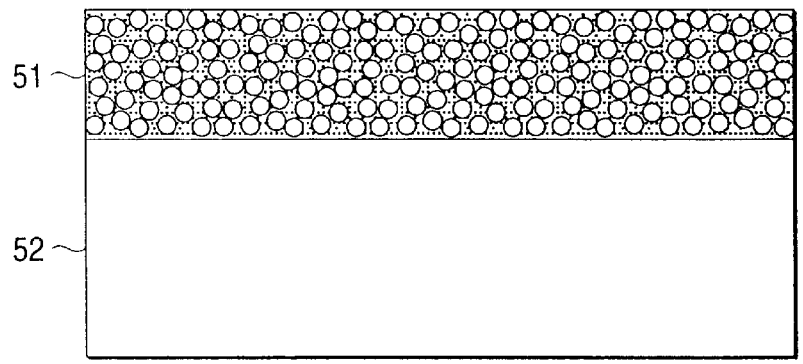
Figure 14:
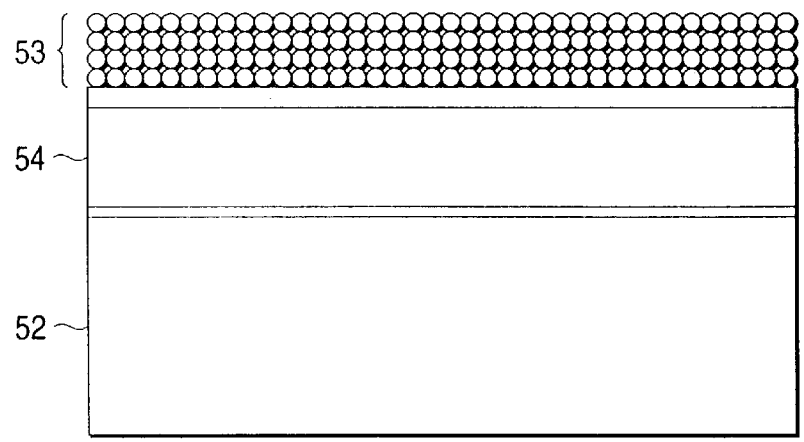
Figure 14:
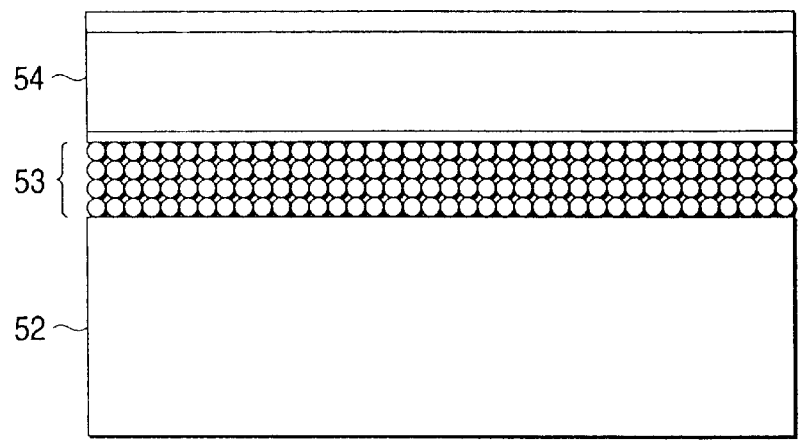
Figure 15:
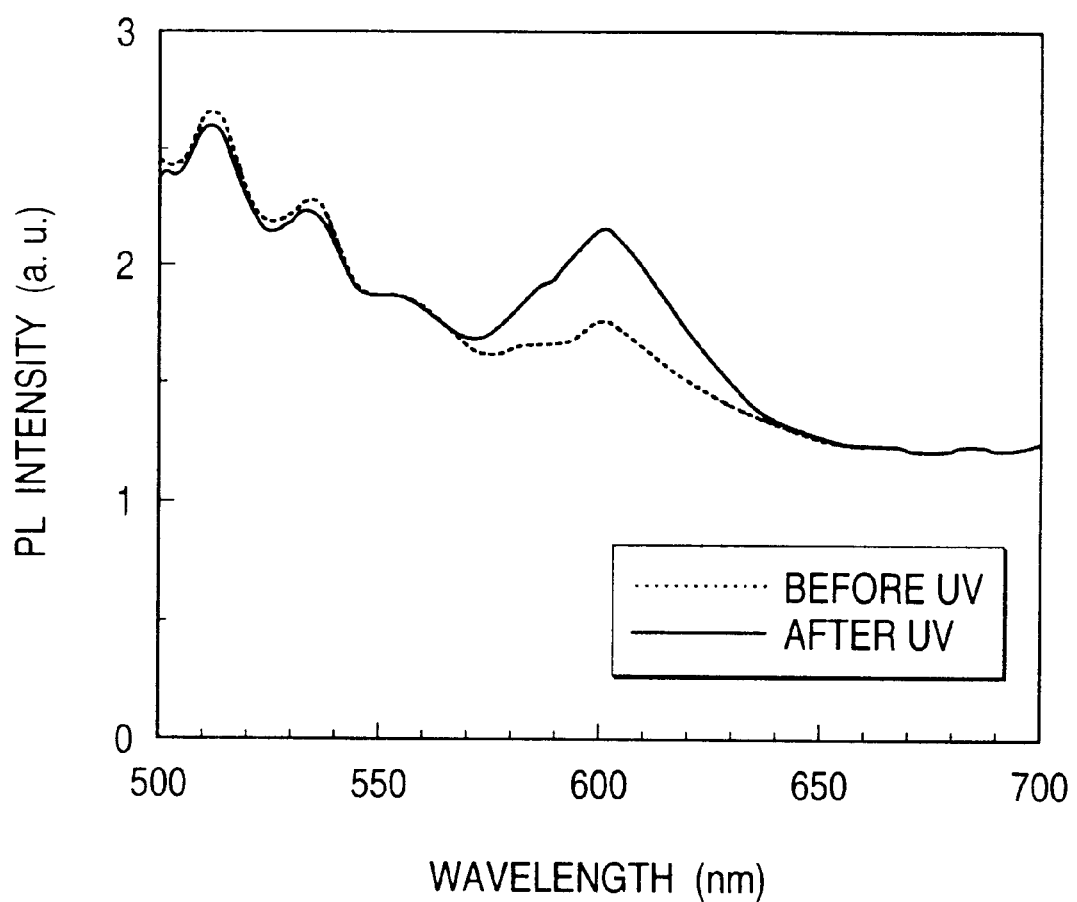
Figure 16:
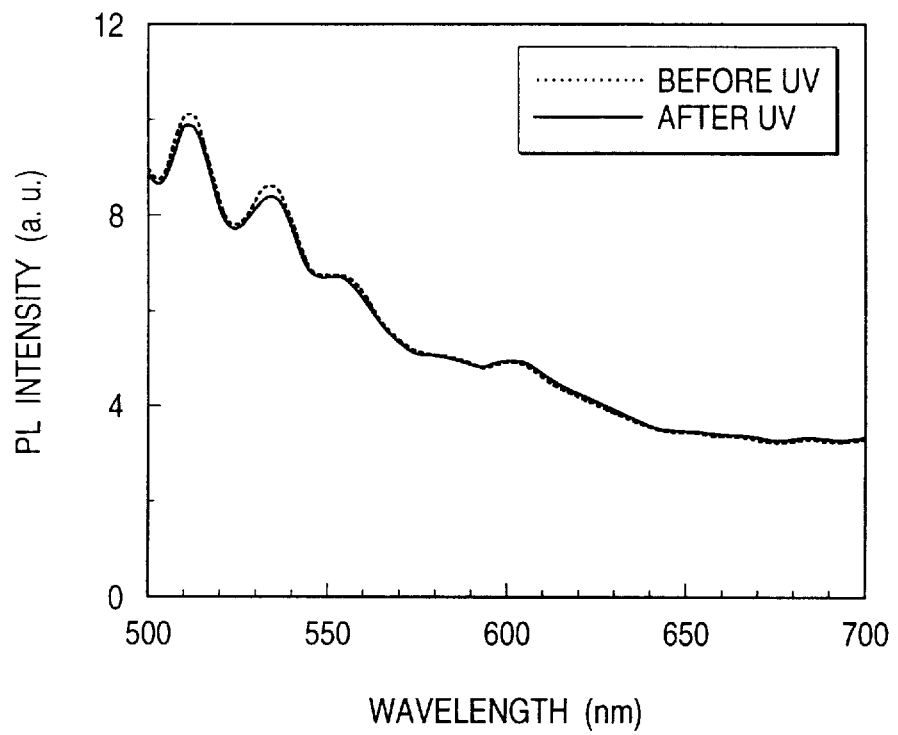
Figure 16:
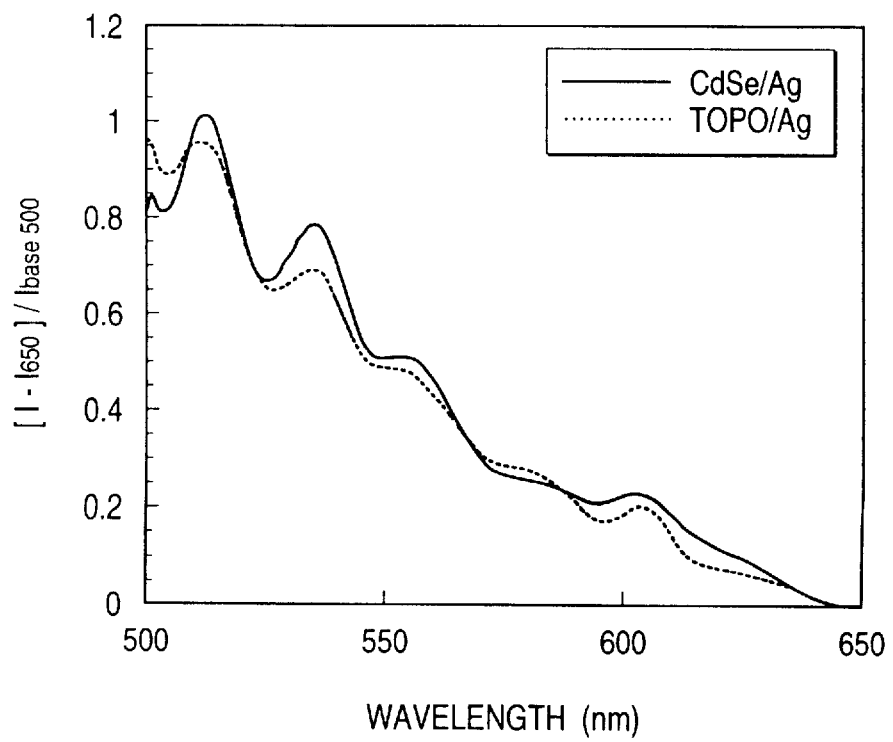
Figure 17:
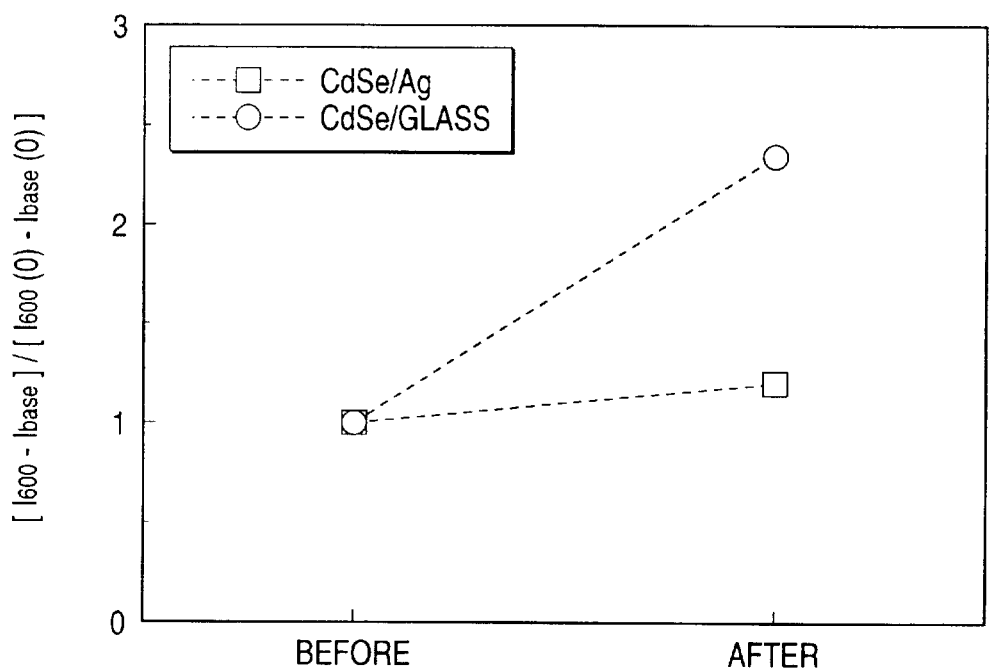
Figure 18:
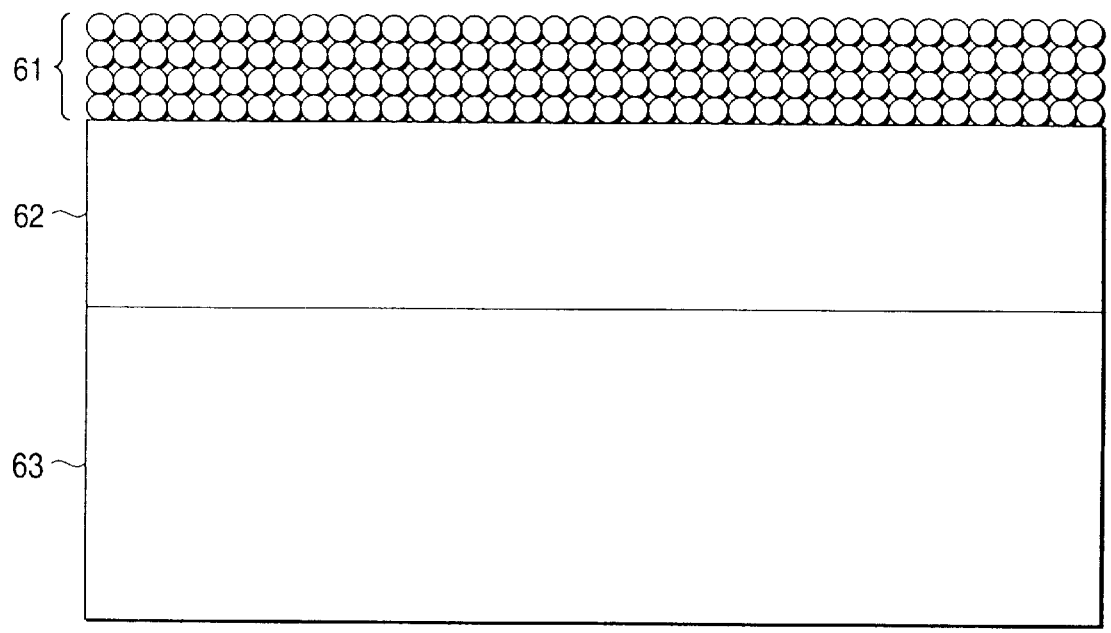
Figure 19:
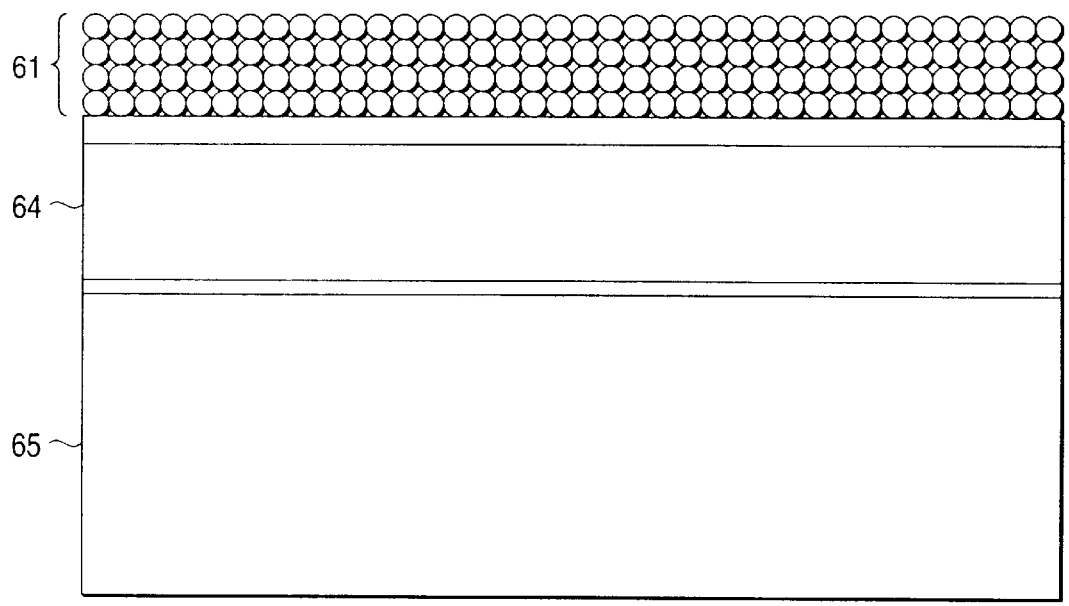
Figure 19:
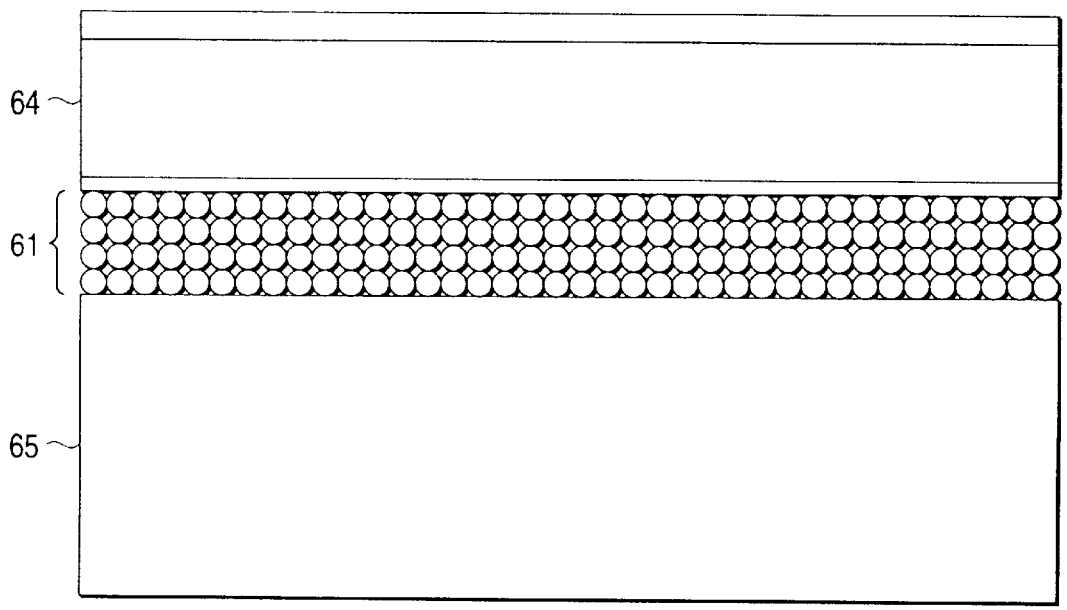
Figure 20:
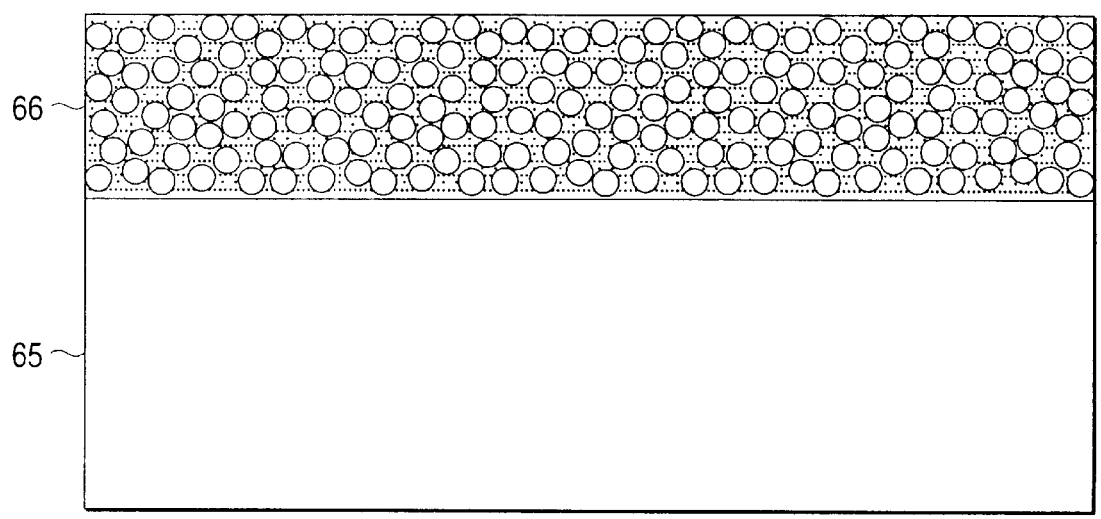
Figure 21:
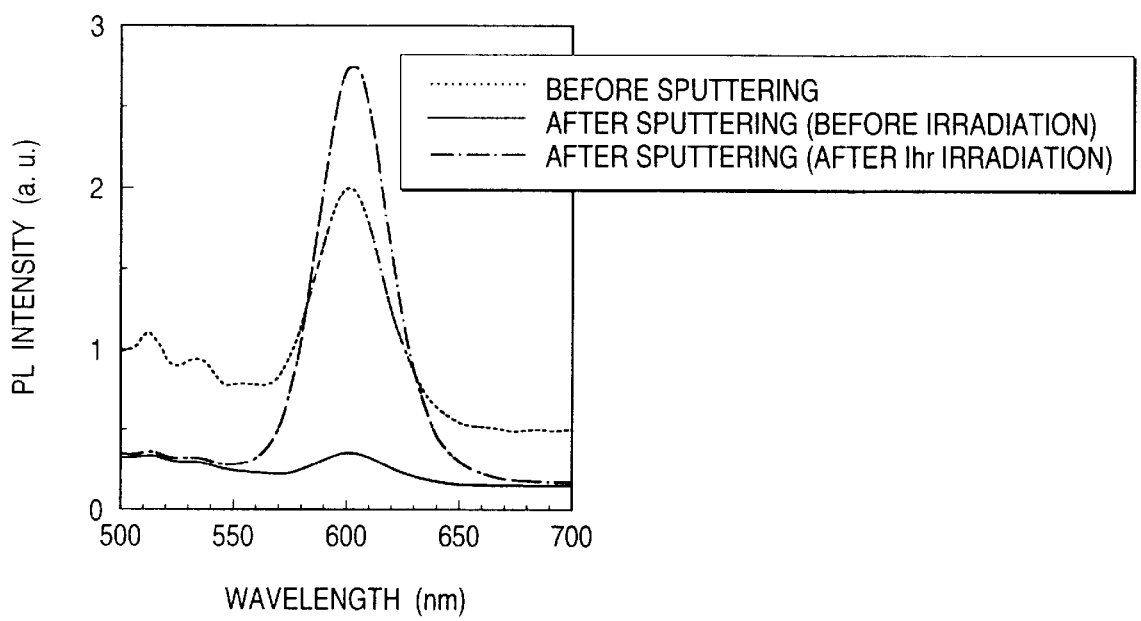
Figure 21:
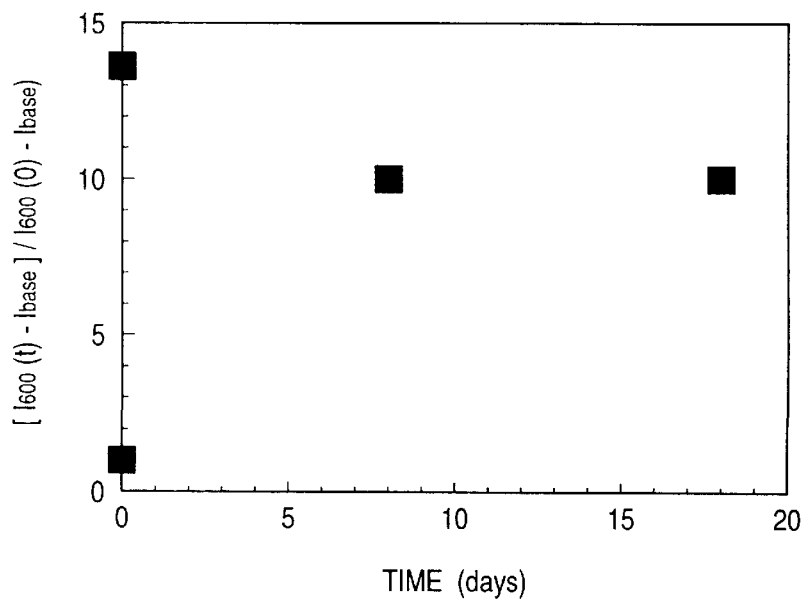
Figure 22:
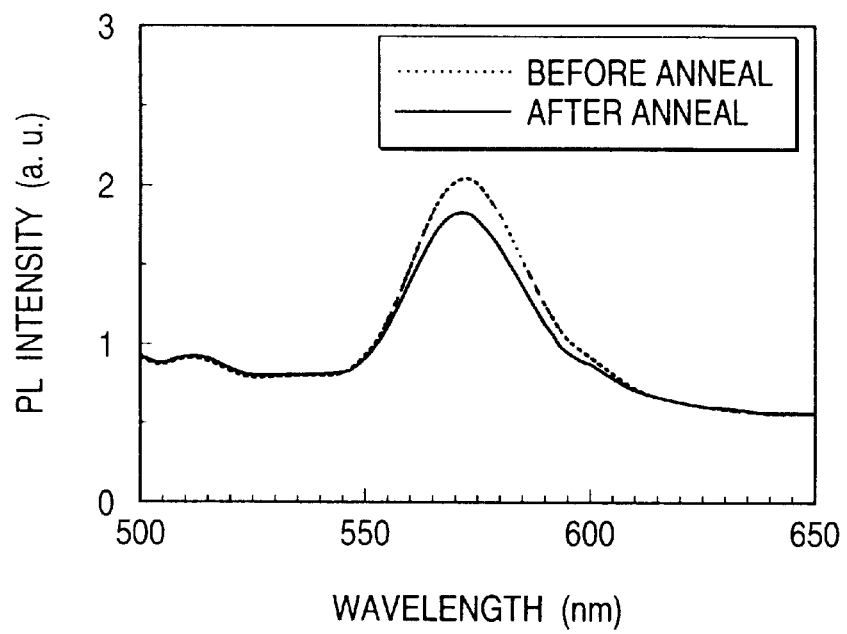
Figure 22:
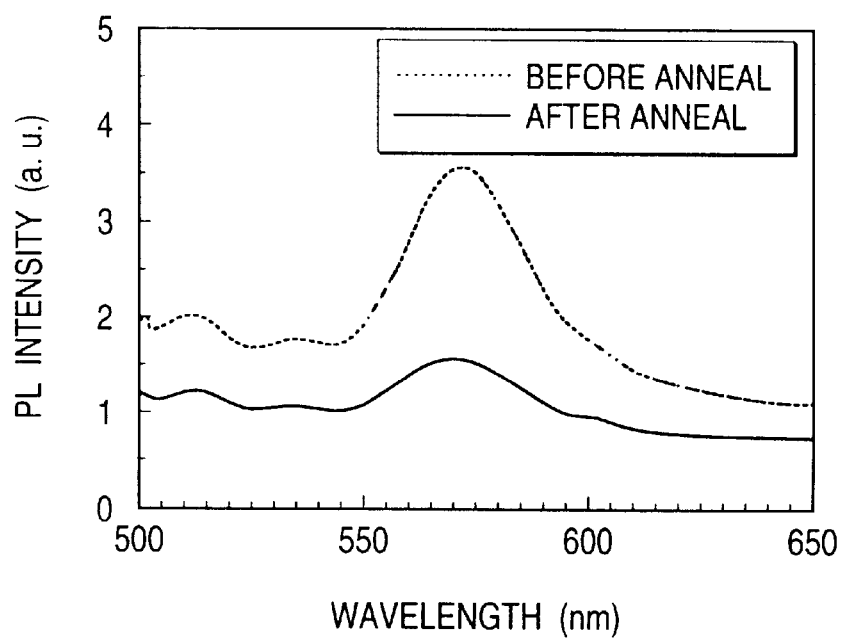
Figure 23:
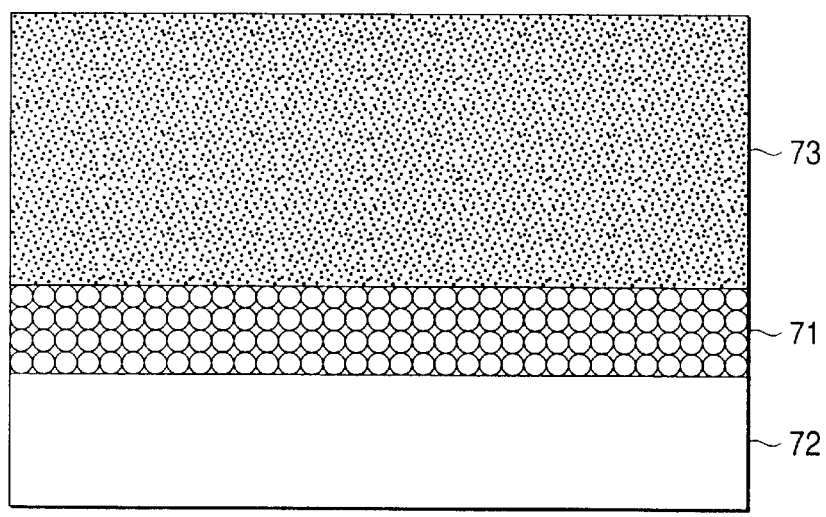
Figure 24:
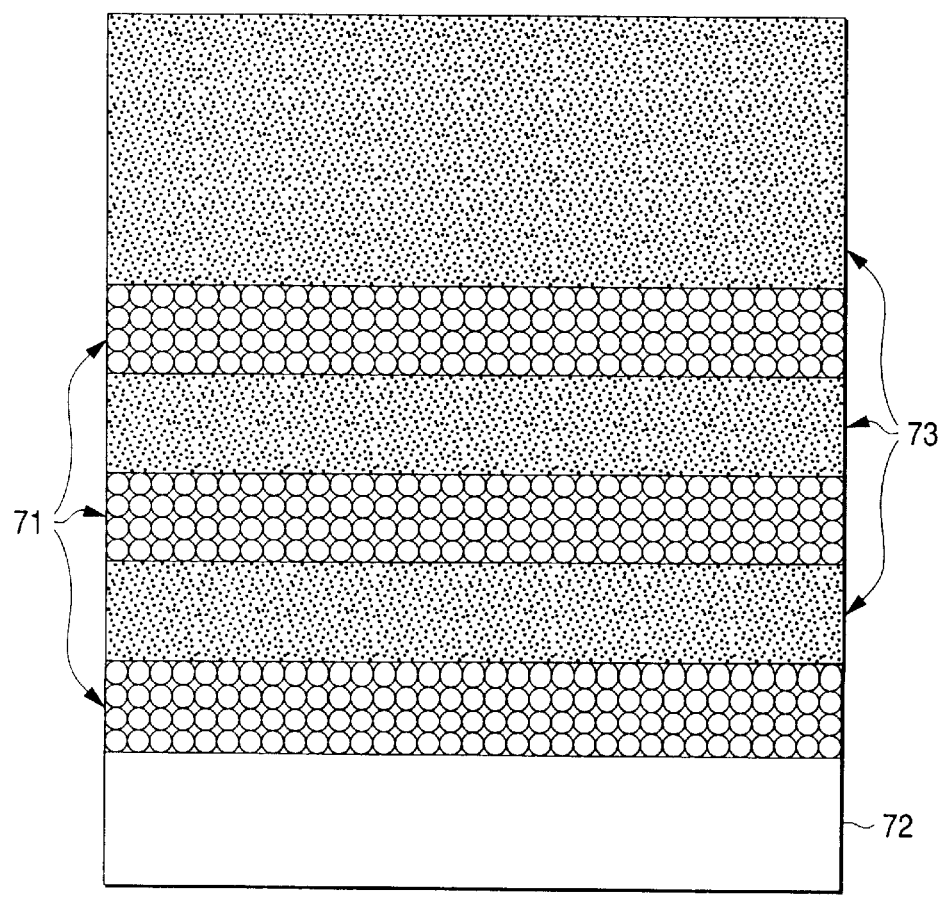
Figure 25:
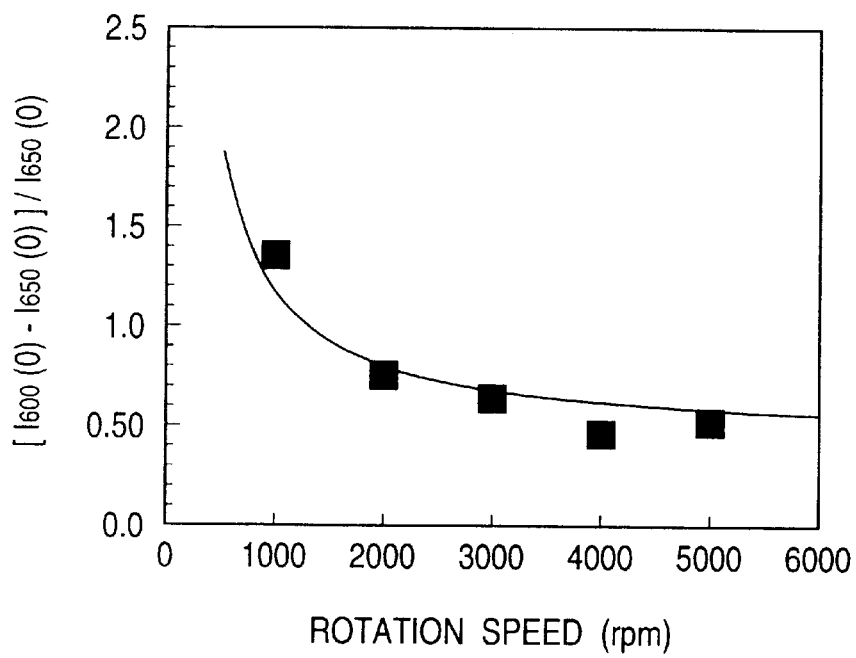
Figure 25:
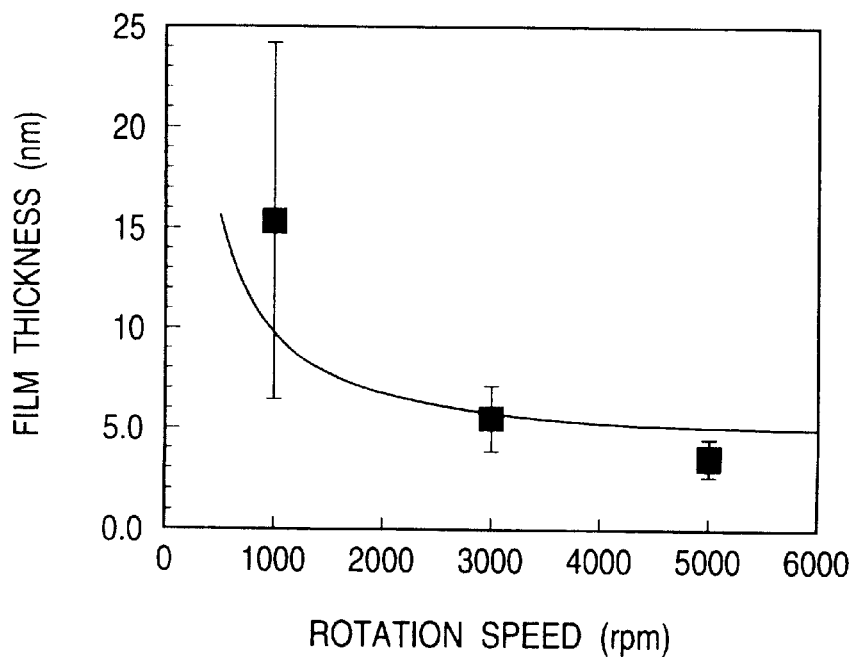
Figure 26:
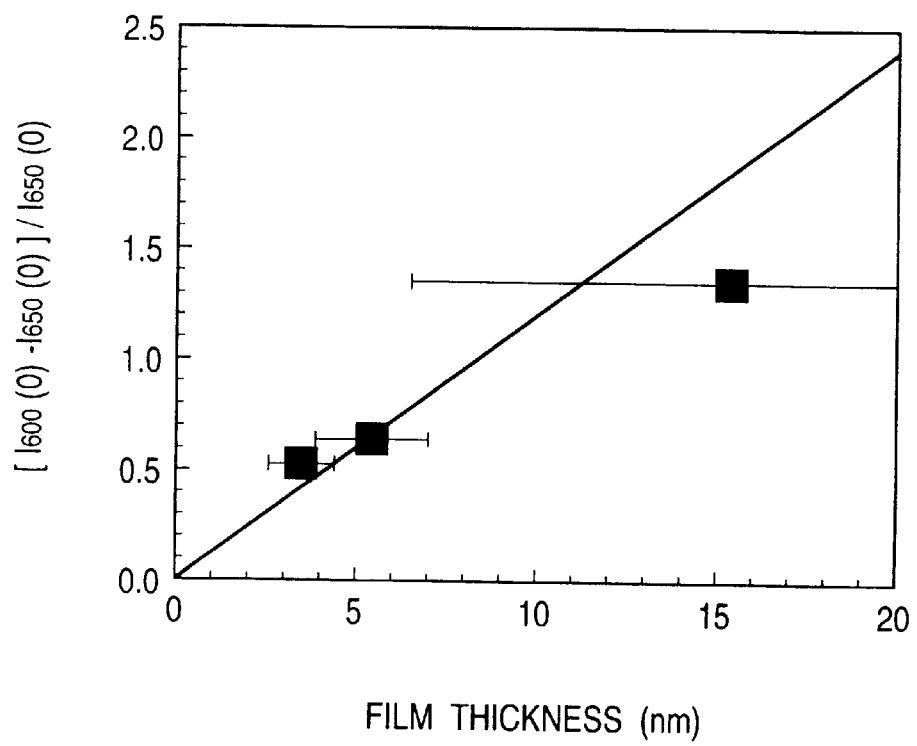
Figure 27:
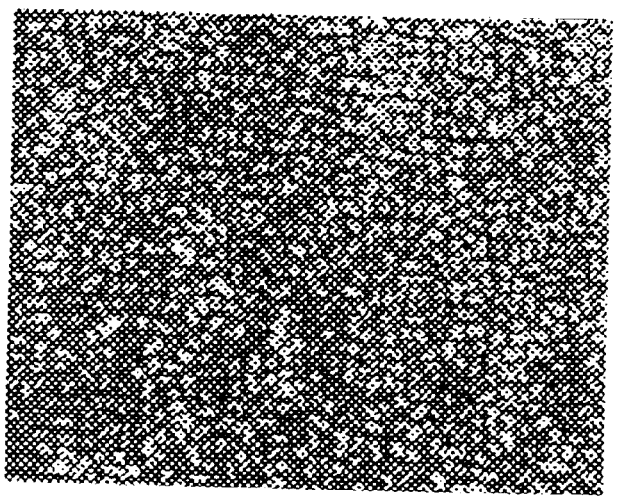
Figure 28:
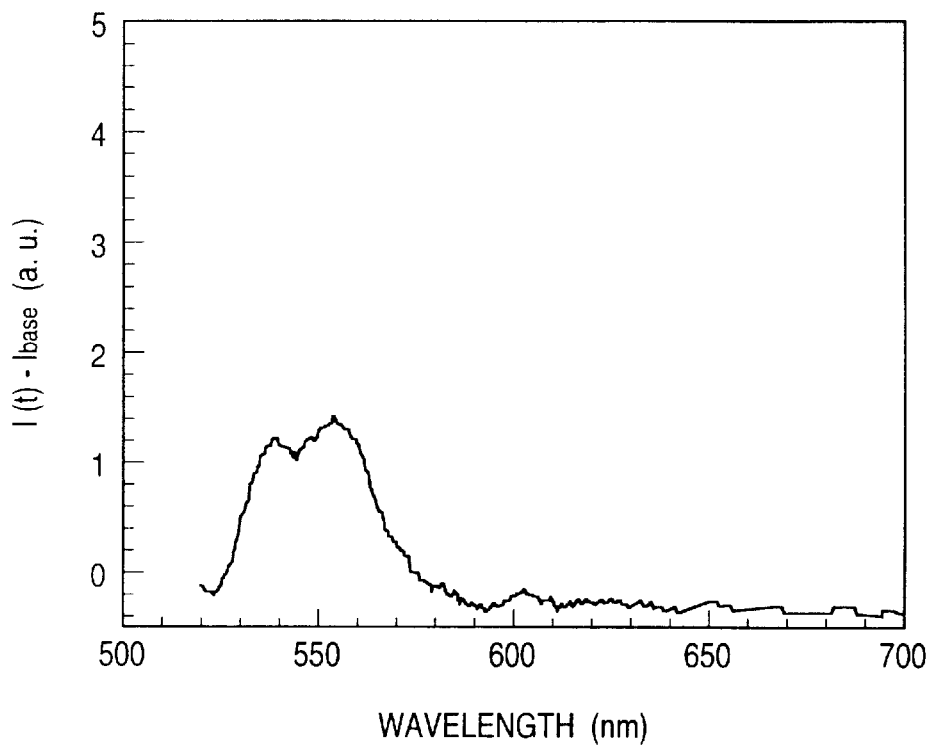
Figure 29:
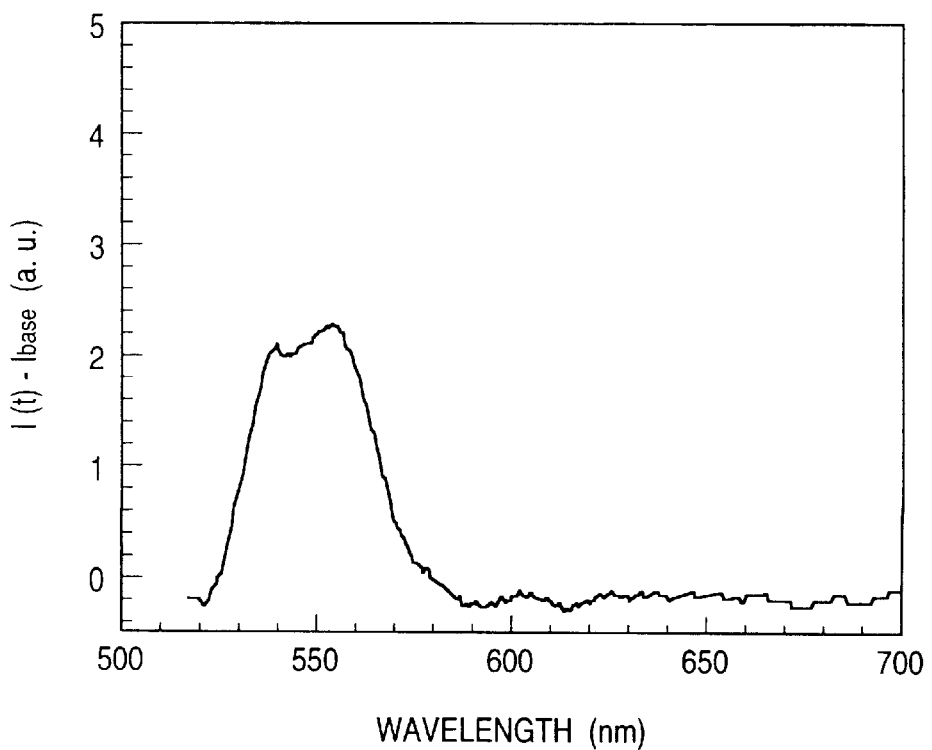
Figure 30:
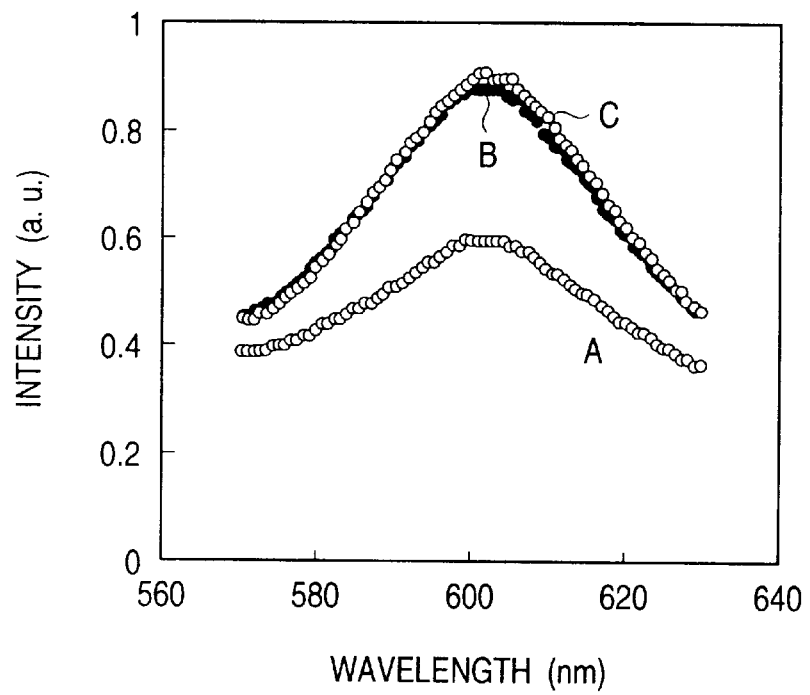
Figure 30:
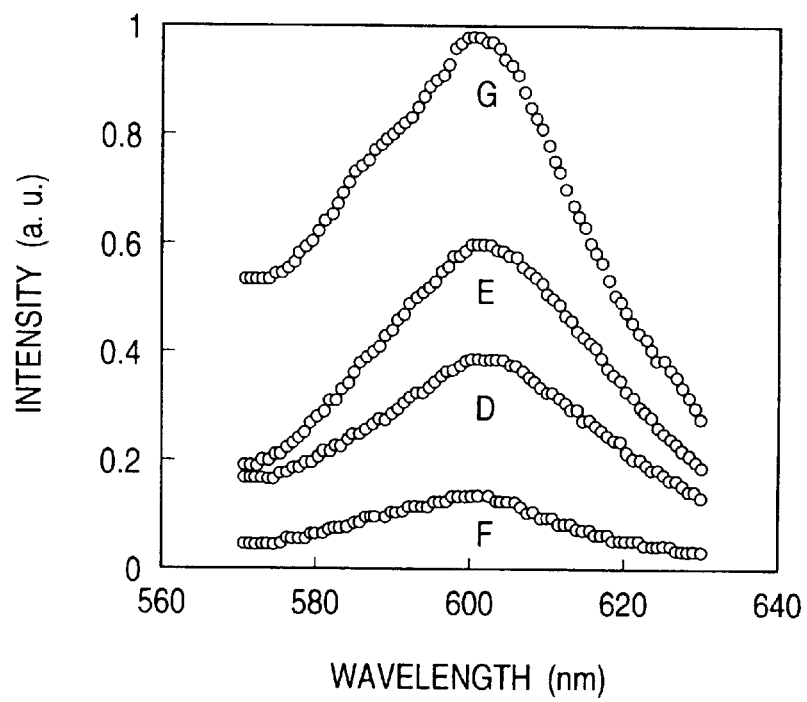
Figure 31:
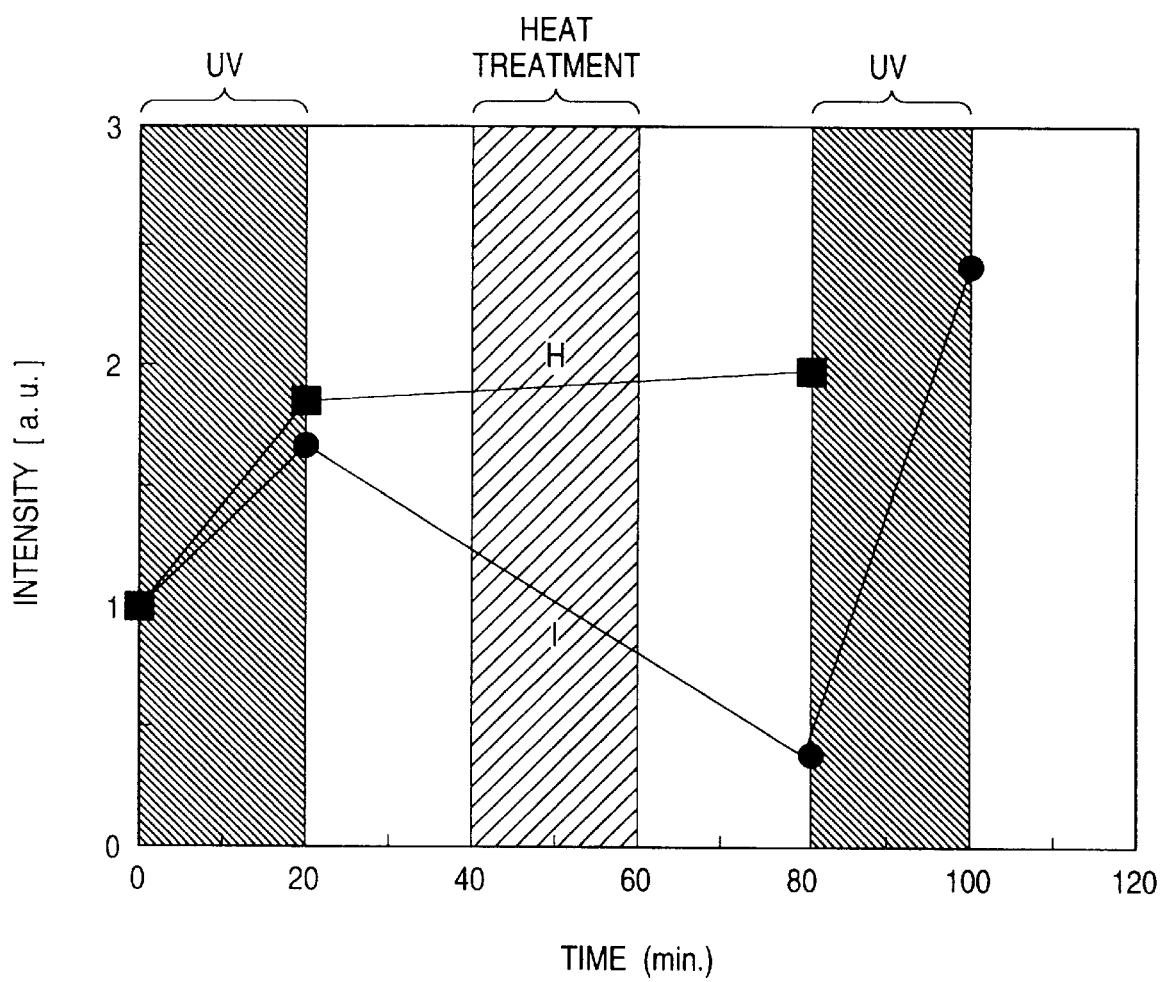
Figure 32:
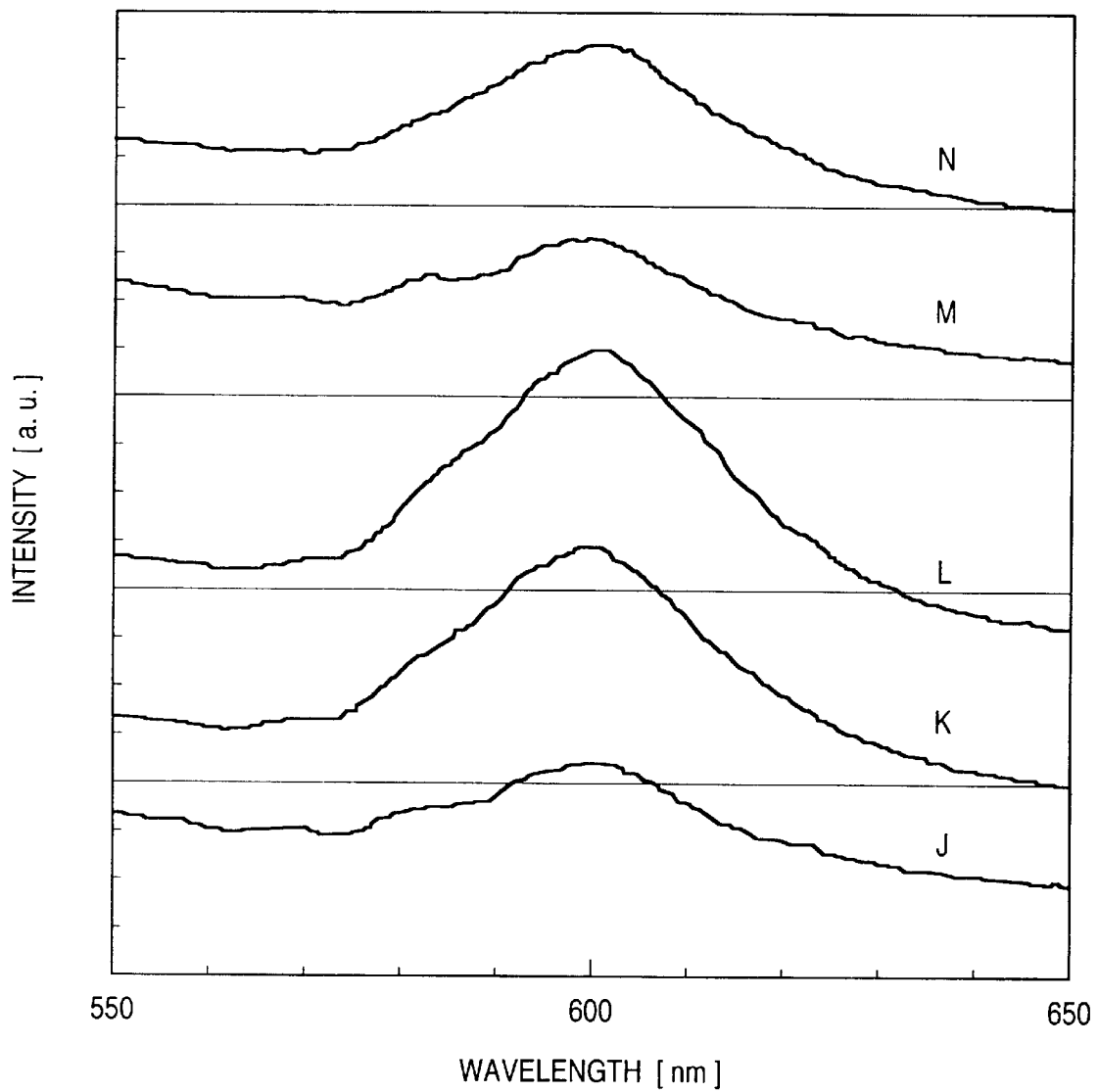
Figure 33:
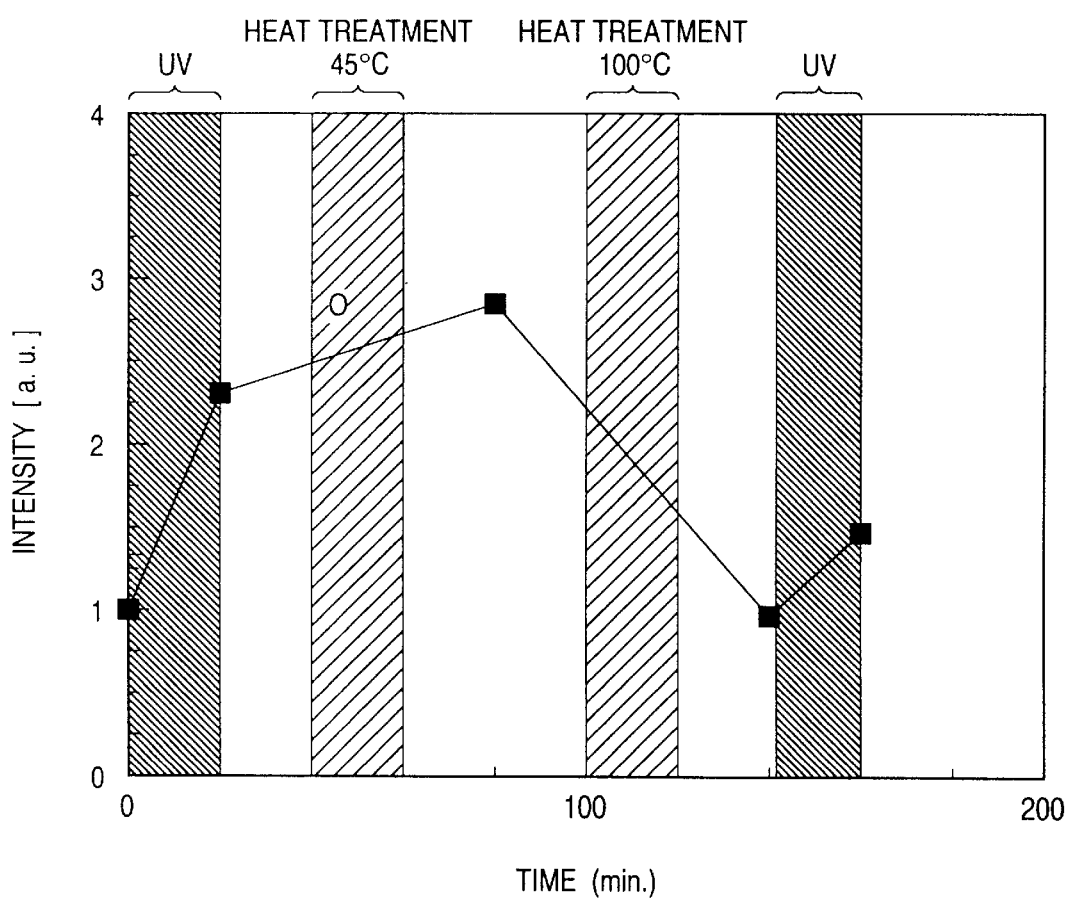
Figure 34:
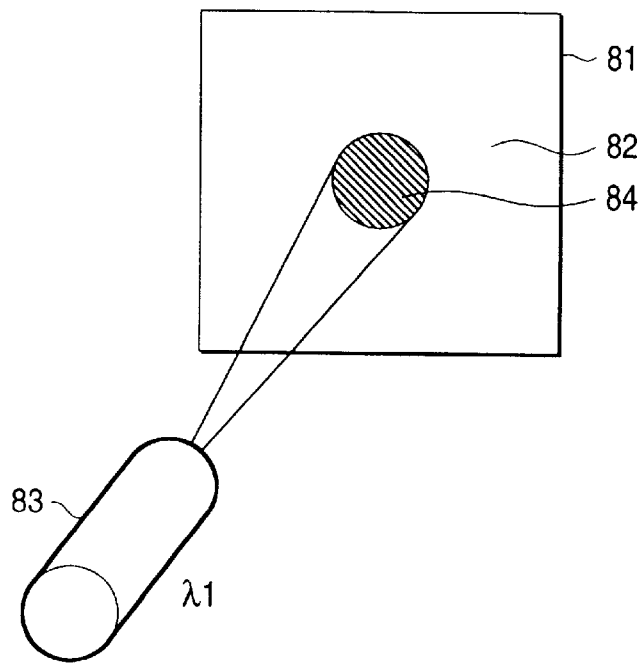
Figure 34:
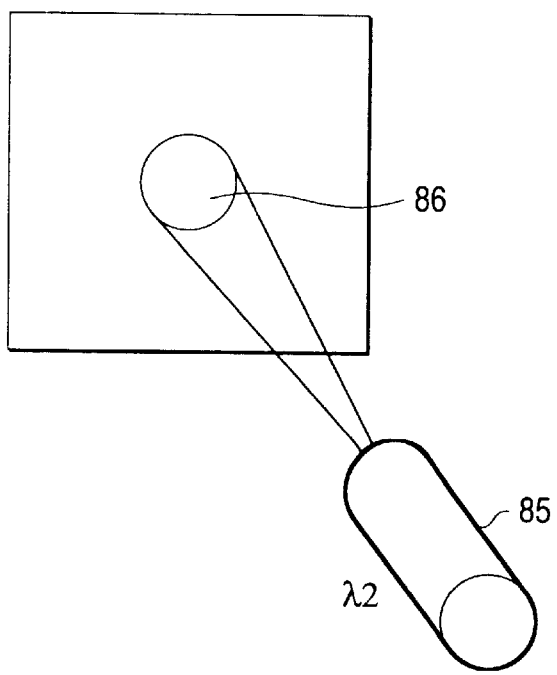
Figure 35:
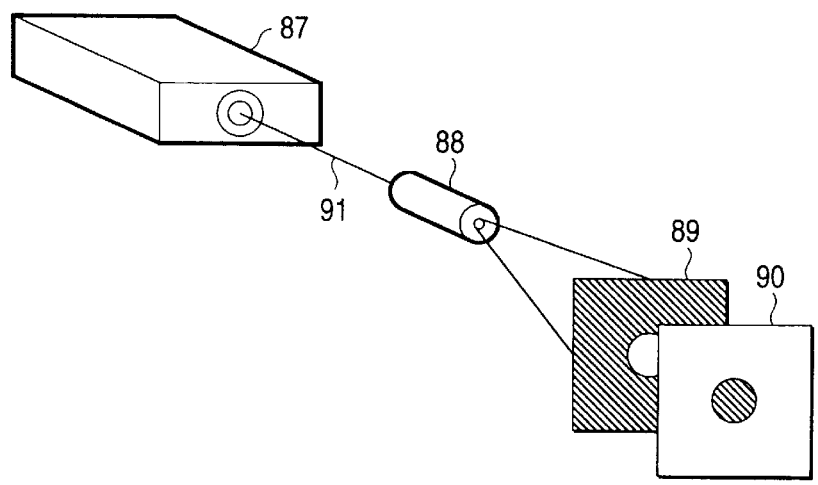
Figure 35:
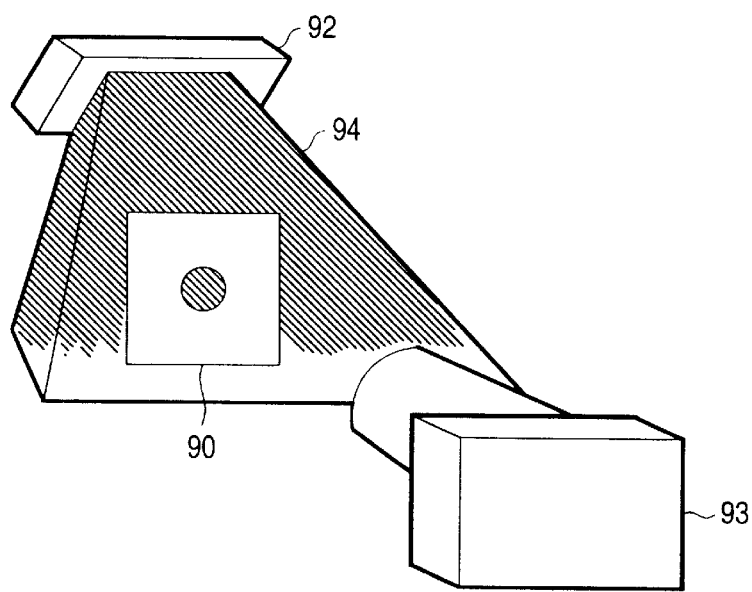
Figure 35:
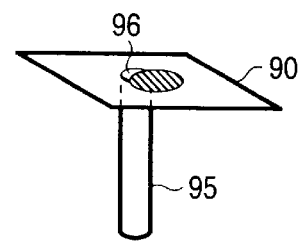
Figure 36:
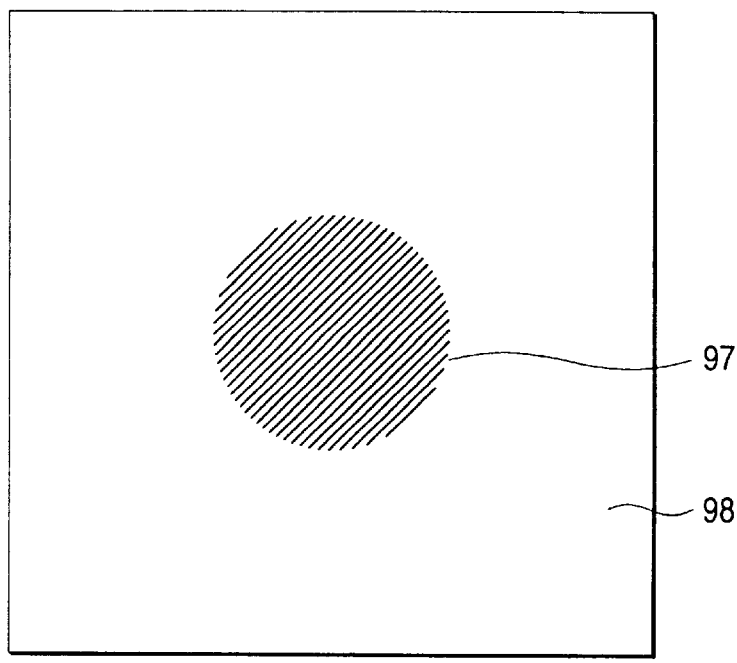
Figure 36:
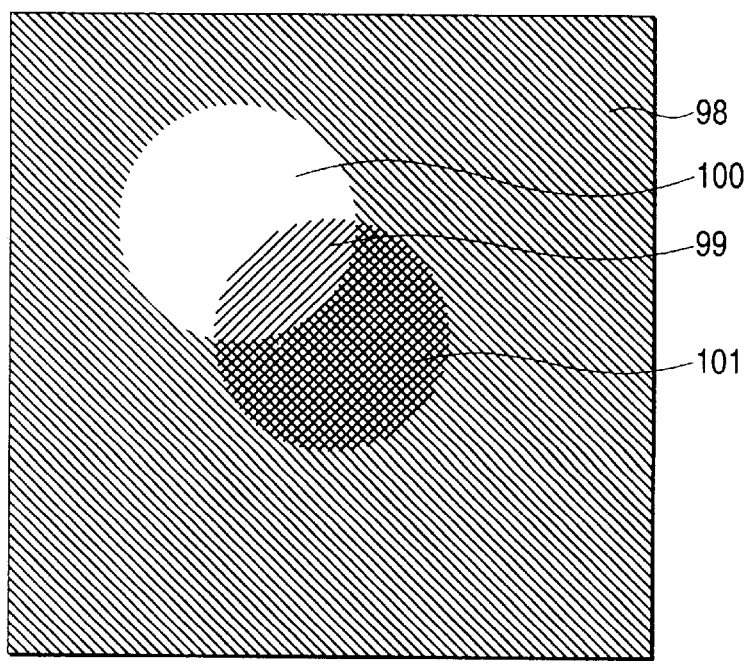
Figure 37:
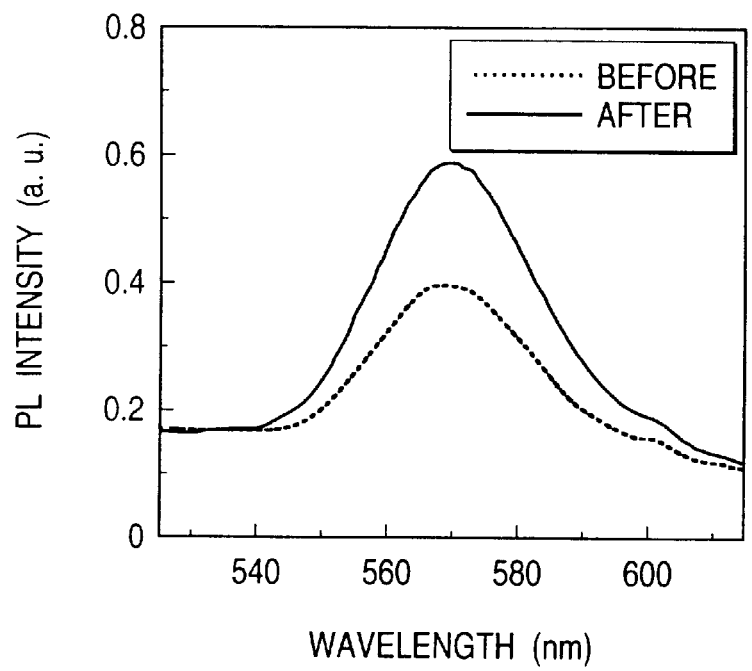
Figure 37:
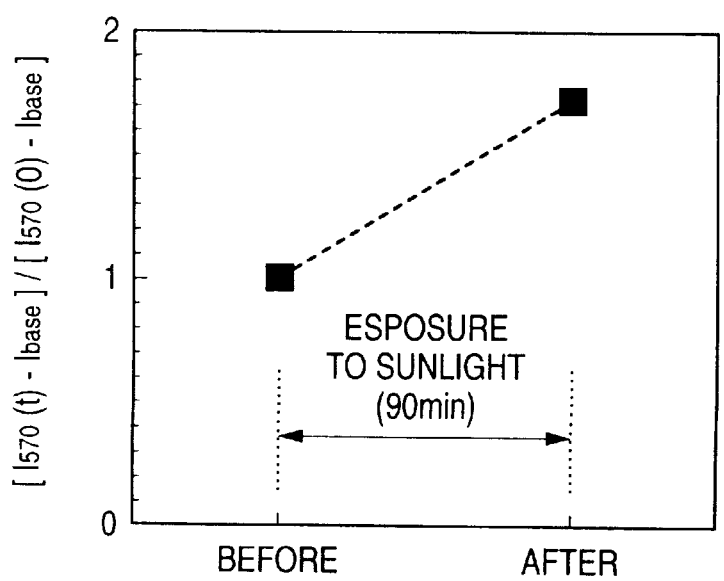
Figure 38:
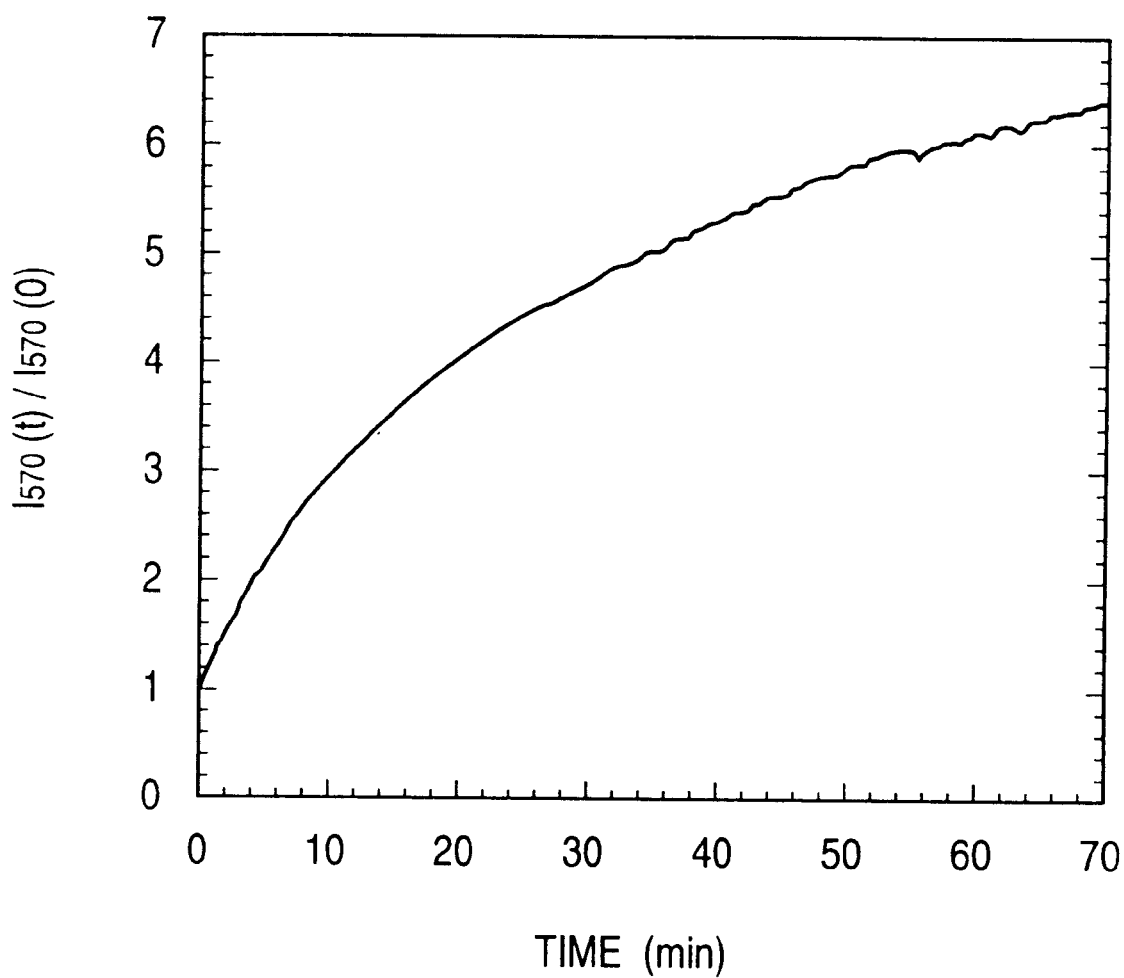
Figure 39:
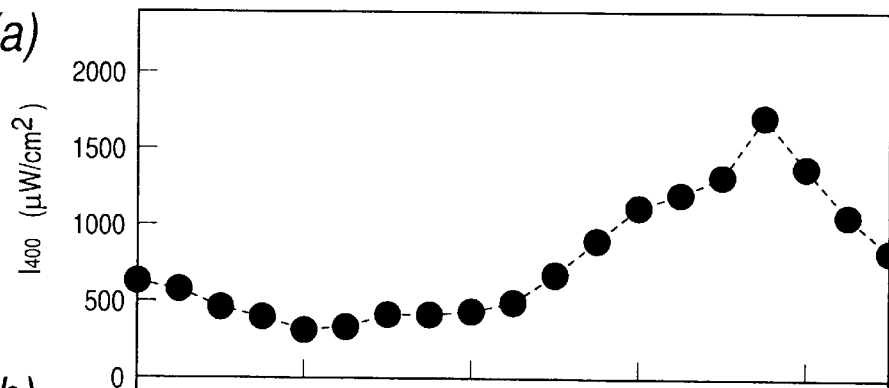
Figure 39:
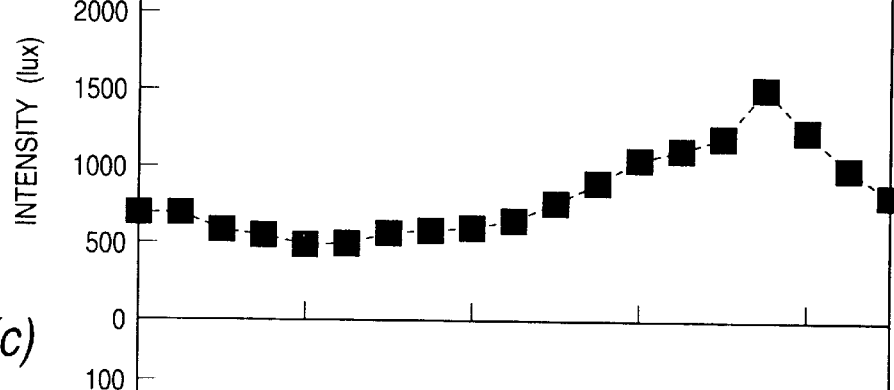
Figure 39:
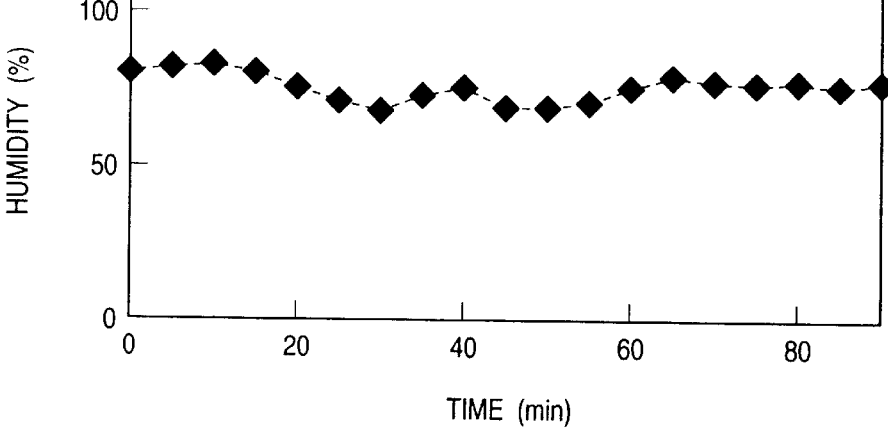
Figure 40:
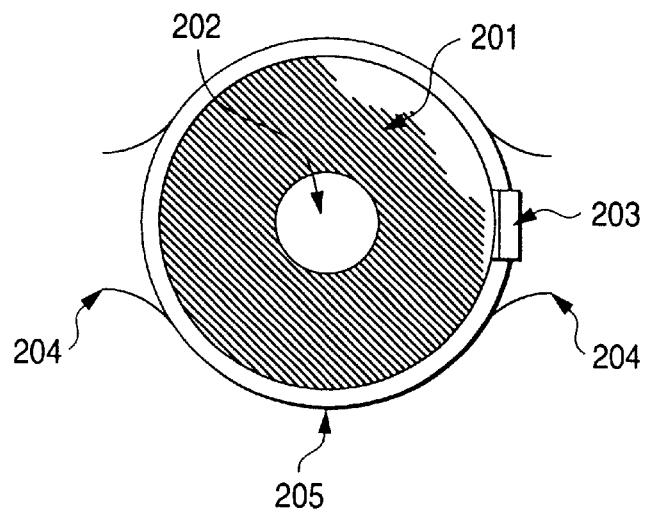
Figure 40:
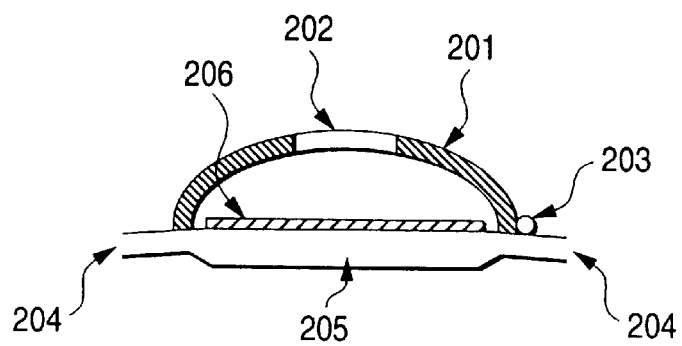
Figure 40:
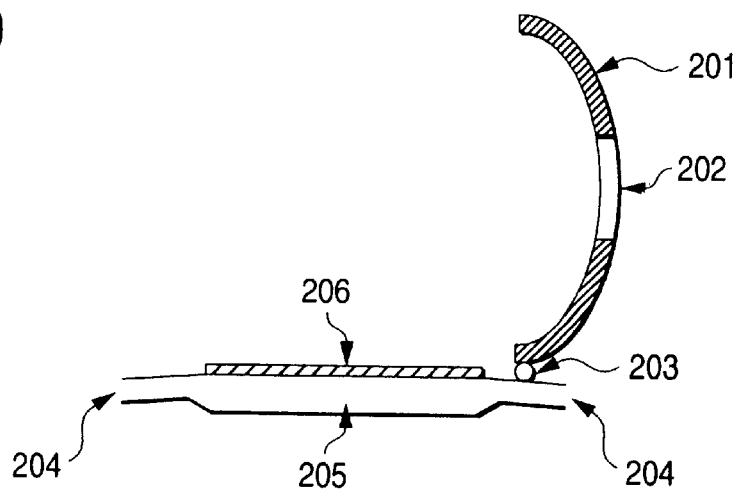
Figure 41:
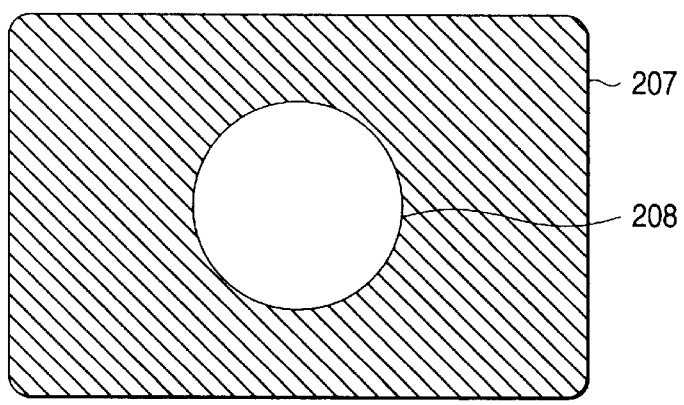
Figure 41:
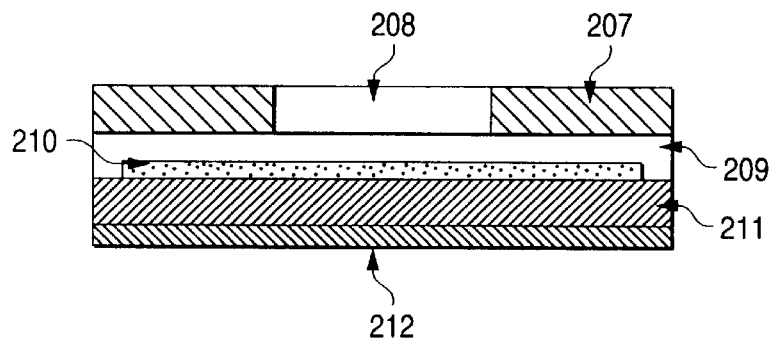
Figure 41:
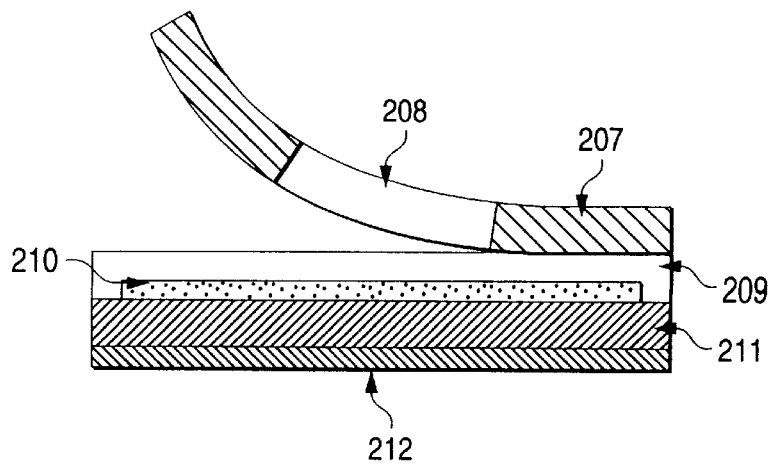
Figure 42:
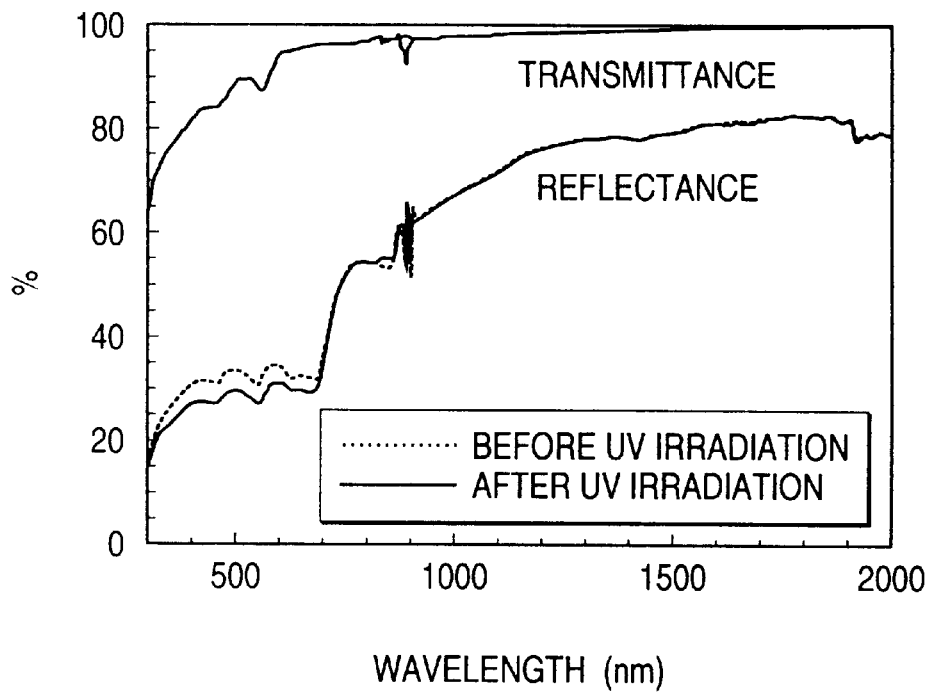
Figure 42:
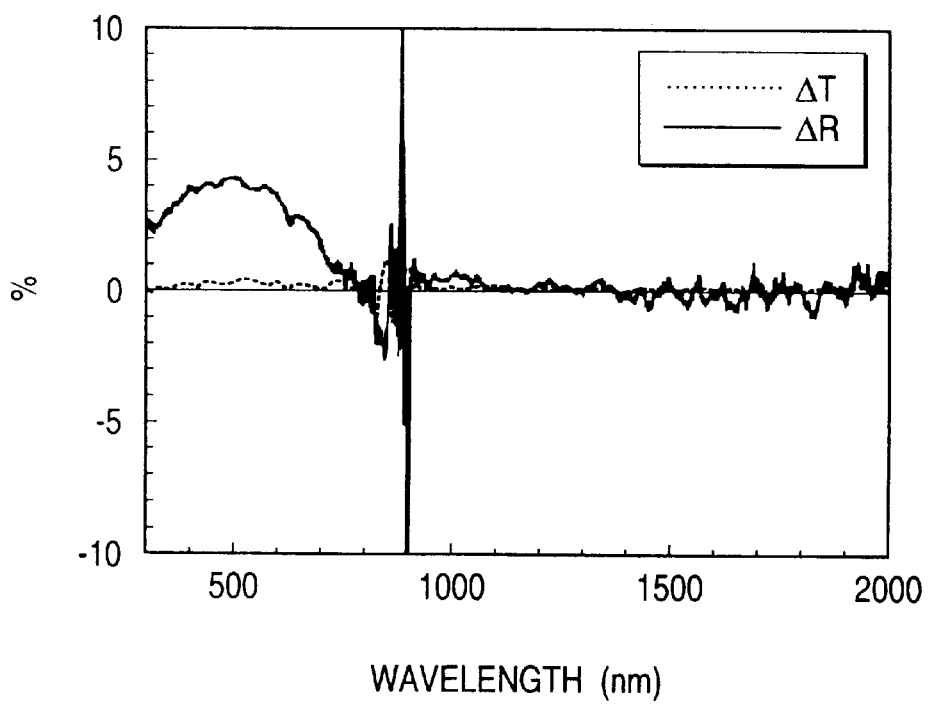
Figure 43:
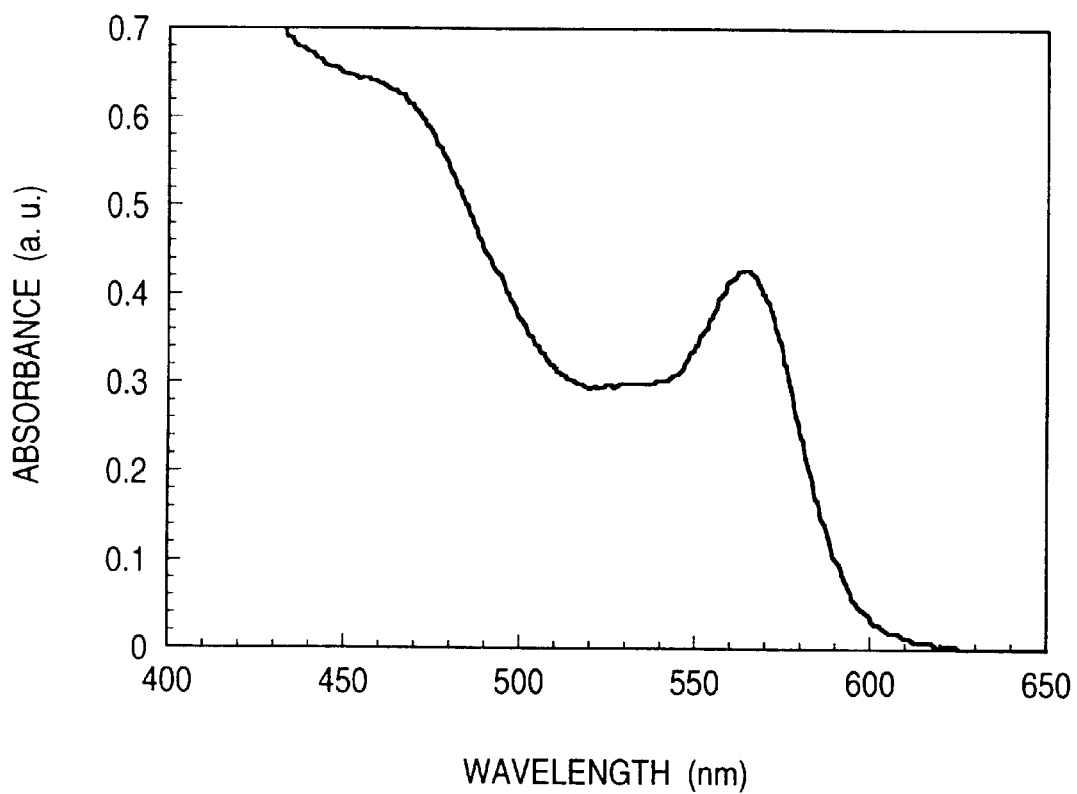
Figure 44:
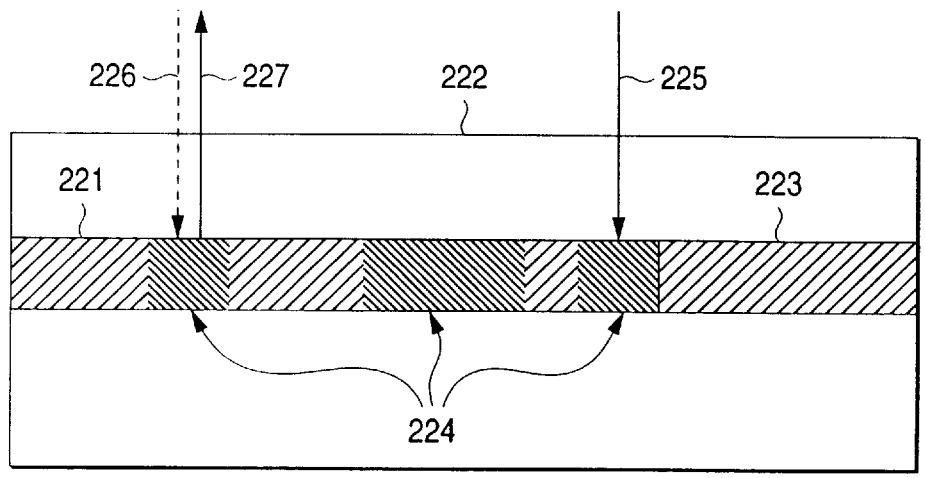
Figure 44:
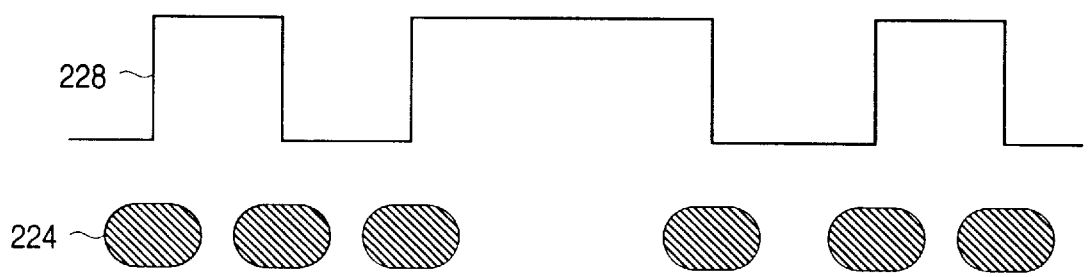
Figure 44:
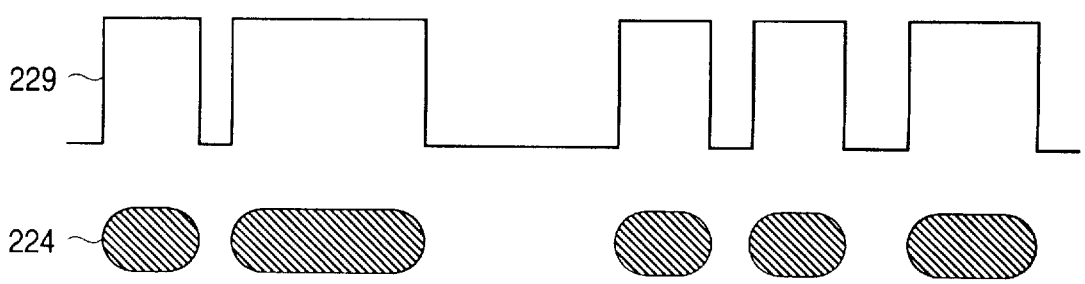

FIGS. 8A and 8B are photographs showing an image formed or recorded (or written) on a CdSe nanoparticle thin film formed on a glass substrate according to the method shown in FIGS. 2A and 2B and an image which is reproduced from the recorded image, wherein FIG. 8A shows an (Y-shaped) image recorded on the nanoparticle thin film by exposing the overall nanoparticle thin film to uniform UV rays and FIG. 8B is an image produced by subjecting the photograph shown in FIG. 8A to image processing;

FIG. 9 is a graph showing an increasing phenomenon in which the intensity of photoluminescence spectrum of a CdSe nanoparticle thin film formed on a silicon substrate is dependent on irradiation time;

FIGS. 10A and 10B are graphs showing the result of measurement of chronological changes in photoluminescence of 600 nm by continuously exposing a CdSe nanoparticle thin film formed on a different substrate to excitation light of 400 nm wavelength;

FIG. 11 is a graph showing a relationship between the intensity of standardized photoluminescence and a dimensionless irradiation time;

FIG. 12 is a graph showing the TDLM effect in the CdSe nanoparticle film;

FIG. 13A is a graph showing chronological changes in luminous intensity measured by continuously radiating excitation light of 400 nm wavelength to a thin film which is formed on a glass substrate through spin coating and comprises a mixture of CdSe nanoparticles and TOPO in various concentrations, wherein the light emitted by the CdSe nanoparticle thin film has a wavelength of 570 nm and a solid line is formed by fitting measured values according to Equation (1);

FIG. 13B is a graph formed by plotting the inverse of a characteristic time τ of an increasing process resulting from the fitting operation shown in FIG. 13A with reference to TOPO concentrations;

FIG. 13C is a graph formed by plotting the rate of increase (a difference in initial luminous intensity and saturated luminous intensity) in the increasing process resulting from the fitting operation shown in FIG. 13A with reference to TOPO concentrations;

FIG. 14A is a schematic representation showing the structure of a solid substrate coated with a thin film comprising a mixture of nanoparticles and an organic compound;

FIG. 14B is a schematic representation showing the structure of a multilayer formed on a solid substrate which comprises an organic compound thin film formed on the substrate and a nanoparticle thin film formed on the organic compound thin film;

FIG. 14C is a schematic representation showing the structure of a multilayer formed on a solid substrate which comprises a nanoparticle thin film formed on the substrate and an organic compound thin film formed on the nanoparticle thin film;

FIG. 15 is a graph showing luminous spectrum of a CdSe nanoparticle thin film formed on a glass substrate through spin coating, wherein monochrome light of 400 nm wavelength is used as excitation light; a broken line indicates initial luminous spectrum (before radiation); the light emitted from the CdSe nanoparticle thin film has a wavelength of 600 nm; the peak appearing in a range of wavelength shorter than 570 nm stems from molecular vibration of trioctylphosphineoxide (TOPO), i.e., an organic compound arranged on the surface of each CdSe nanoparticle (see FIG. 16B); and luminous intensity is increased by the TDLM effect;

FIG. 16A is a graph showing luminous spectrum of a CdSe nanoparticle thin film formed on a glass substrate through vacuum deposition, wherein monochrome light of 400 nm wavelength is used as excitation light; a broken line indicates initial luminous spectrum (before radiation); a solid line indicates luminous spectrum emitted after the film is continuously exposed to UV rays (of 365 nm) for 20 minutes; the light emitted from the CdSe nanoparticle thin film has a wavelength of 600 nm; the peak appearing in a range of wavelength shorter than 570 nm stems from molecular vibration of TOPO (see FIG. 16B); and there is observed a significant reduction in initial luminous intensity and in the TDLM effect;

FIG. 16B is a graph showing comparison between the spectrum of light emitted from a TOPO thin film—which is formed by forming an Ag thin film on a glass substrate through vacuum deposition and by evaporation of a solution prepared by dissolving only TOPO into toluene on the Ag thin film—and the spectrum of light emitted from a CdSe nanoparticle thin film formed on Ag, wherein monochrome light of 400 nm wavelength is used as excitation light; a broken line represents luminous spectrum of the TOPO thin film; a solid line indicates luminous spectrum of the CdSe nanoparticle thin film formed on Ag; and spectrum is subjected to base line correction and standardization;

FIG. 17 is a graph formed by standardizing, with use of initial luminous intensity, the luminous intensity of the CdSe nanoparticle thin film formed on the glass substrate before and after UV radiation and the luminous intensity of the CdSe nanoparticle thin film formed on the Ag film before and after UV radiation;

FIG. 18 is a schematic representation showing the layered structure of an device which is formed by deposition of an Ag film on a glass substrate and by coating the Ag film with a CdSe nanoparticle thin film;

FIGS. 19A and 19B are schematic representations showing the structure of a device capable of erasing an image recorded or stored on a nanoparticle thin film by use of light, wherein FIG. 19A shows the structure of a device comprising a solid substrate, a photoconductive thin film formed thereon, and a nanoparticle thin film applied over the photoconductive thin film, and FIG. 19B shows the structure of a device a solid substrate and a photoconductive thin film with a nanoparticle thin film sandwiched therebetween;

FIG. 20 is a schematic representation showing the structure of a device which is formed from a solid substrate coated with a film comprising a mixture of nanoparticles and a photoconductive substance and which can erase an image recorded or stored on the nanoparticle thin film using light;

FIG. 21A is a graph, wherein a broken line indicates luminous spectrum before formation of a $SiO_x$ protective film; a solid line indicates luminous spectrum after formation of the $SiO_x$ protective film; and a dashed line indicates spectrum measured after continuously subjecting a sample to excitation light one hour since measurement of the luminous spectrum indicated by the solid line was complete;

FIG. 21B is a graph formed by plotting attenuation of luminous intensity of the sample shown in FIG. 21A stemming from exposure to excitation light for one hour;

FIG. 22A is a graph, wherein a broken line indicates luminous spectrum of a sample whose luminous intensity has been increased to a certain degree by the TDLM effect, and a solid line indicates spectrum of the sample which is subjected to heat treatment for one hour at 50° C. in a dark place after measurement of the luminous spectrum indicated by the broken line;

FIG. 22B is a graph, wherein a broken line indicates luminous spectrum of a sample whose luminous intensity has been increased to a certain degree by the TDLM effect, and a solid line indicates spectrum of the sample which is subjected to heat treatment for one hour at 50° C. in a dark place after measurement of the luminous spectrum indicated by the broken line;

FIG. 23 is a schematic representation showing the multilayer structure of an device comprising a solid substrate coated with a nanoparticle thin film and an insulating material film formed on the nanoparticle thin film by PVD (physical vapor deposition), CVD (chemical vapor deposition), or coating;

FIG. 24 is a schematic representation showing the multilayer structure of an device comprising a solid substrate on which one ore more nanoparticle films and one or more insulating material films are stacked in alternating layers;

FIG. 25A is a graph, in which luminous intensity of a CdSe nanoparticle film formed on a silicon wafer by spin coating is plotted as a function of the rotation speed of a spin coater, wherein a solid line is formed by fitting test data according to Equations (5) and (6);

FIG. 25B is a graph, in which the thickness of the CdSe nanoparticle film measured by an AFM is plotted as a function of rotation speed of the spin coater, wherein a solid line is formed by fitting test data according to Equation (5);

FIG. 26 is a graph, in which luminous intensity of the CdSe nanoparticle film is plotted as a function of the thickness measured by the AFM, wherein a solid line is formed by fitting test data according to Equation (6);

FIG. 27 is a photograph taken by a high-resolution SEM showing the microstructure of the CdSe nanoparticle thin film formed on the silicon wafer by spin coating;

FIG. 28 is a graph showing luminous spectrum of a semiconductor nanoparticle thin film formed on an OHP film according to an ink-jet method;

FIG. 29 is a graph showing luminous spectrum of a semiconductor nanoparticle thin film formed on an OHP film according to an ink-jet method, which spectrum is measured after having exposed the film to excitation light of 400 nm wavelength for one hour;

FIG. 30A is a graph showing changes in luminous spectrum of a CdSe nanoparticle thin film which is formed on a glass substrate by spin coating and is dried in a desicator in a bright place at room temperature for one day, wherein the spectrum is measured when the film is reserved at room temperature;

FIG. 30B is a graph showing changes in luminous spectrum when the CdSe nanoparticle thin film formed in the same manner as is the film shown in FIG. 30A is heated at 100° C.;

FIG. 31 is a graph showing chronological changes in PL intensity based on the results of the test shown in FIGS. 30A and 30B, wherein a solid line is formed by connecting together measured points, and a line graph indicates transition of PL density expected from the measured points;

FIG. 32 is a graph showing changes in luminous spectrum of a CdSe nanoparticle thin film which is formed on a glass substrate by spin coating and is dried in a desicator in a dark place at room temperature for one day, and then dried in a vacuum of 10 mmHg or less in a dark place at 50° C., wherein the base is shifted so as to make the spectrum easy to see;

FIG. 33 is a graph showing chronological changes in PL density on the basis of results of the test shown in FIG. 32, wherein a solid line is formed by connecting together measured points, and a line graph indicates transition of PL density expected from the measured points;

FIG. 34A is a diagrammatic representation showing the process of increasing PL density by radiation of excitation light onto a nanoparticle thin film;

FIG. 34B is a diagrammatic representation showing the process of reducing the PL density by radiation of infrared rays onto the area whose PL intensity is increased;

FIG. 35A is a diagrammatic representation showing the process of forming an image by radiation of excitation light onto a nanoparticle thin film;

FIG. 35B is a diagrammatic representation showing the process of reproducing the image formed in the step shown in FIG. 35A;

FIG. 35C is a diagrammatic representation showing the process of erasing the image by application of heat to a portion of the image formed in the step shown in FIG. 35A;

FIG. 36A is a photographic image taken by reproducing the image formed in the step shown in FIG. 35A according to the method shown in FIG. 35B and by taking the image by use of a camera;

FIG. 36B is a photographic image taken by reproducing the image erased in the step shown in FIG. 35C according to the method shown in FIG. 35B and by taking the image by use of a camera;

FIG. 37A is a graph showing luminous spectrum of a CdSe nanoparticle thin film formed on a glass substrate by spin coating, wherein a broken line indicates luminous spectrum before exposure to sunlight; a solid line indicates luminous spectrum after continuous exposure to sunlight for 90 minutes; and an increase in luminous intensity due to the TDLM effect is observed;

FIG. 37B is a graph, wherein the base line of the luminous intensity shown in FIG. 37A is corrected, and the luminous intensity is standardized by means of the luminous intensity (i.e., the initial luminous intensity) measured before exposure to sunlight;

FIG. 38 is a graph showing chronological changes (TDLM phenomenon) in the intensity of light of 570 nm wavelength measured after excitation light of 400 nm wavelength has been continuously radiated onto a CdSe nanoparticle thin film formed on a glass substrate by spin coating, wherein the luminous intensity is standardized by the initial luminous intensity;

FIG. 39A is a graph showing chronological changes in the intensity of light of 400 nm wavelength in sunlight when the CdSe nanoparticle thin film is exposed to sunlight;

FIG. 39B is a graph showing chronological changes in illumination of sunlight when the CdSe nanoparticle thin film is exposed to sunlight;

FIG. 39C is a graph showing chronological changes in humidity in atmosphere when the CdSe nanoparticle thin film is exposed to sunlight;

FIGS. 40A to 40C are schematic representations showing a wrist watch type handy UV-radiation sensor which is an example of application, to a UV sensor, of the integrating optical sensor capable of measuring the dose of light, wherein FIG. 40A is a top view of the wrist watch type handy UV-radiation sensor, FIG. 40B is a side cross-sectional view of the same, and FIG. 40C is a side cross-sectional view showing the sensor when a cap-shaped mask is opened;

FIGS. 41A to 41C are schematic diagrams showing a UV-radiation sensor seal for use in preventing sunburn which is an example of application, to a a UV sensor, of the integrating optical sensor capable of measuring the dose of light, wherein FIG. 41A is a top view of the UV-radiation sensor seal, FIG. 41B is a side cross-sectional view of the same, and FIG. 41C is a side cross-sectional view showing the seal when a sheet-like mask is removed;

FIG. 42A is a graph showing transmissivity and reflectance spectrum of a CdSe nanoparticle thin film formed on a glass substrate by spin coating, wherein a broken line indicates spectrum before exposure to UV rays (of 365 nm); a solid line indicates spectrum after exposure to UV rays (of 365 nm); although no substantial difference arises in transmissivity spectrum before and after exposure to UV rays, a reduction in reflectivity is found to arise in the range of 750 nm or less; and vibration waveforms arising in spectra in the vicinity of the range of wavelength from 800 to 900 nm are noises caused at the time of replacement of a detector of a spectrophotometer;

FIG. 42B is a graph showing a difference in transmissivity spectrum before and after exposure to UV rays and a difference in reflectance spectrum before and after exposure to UV rays (i.e., a difference is calculated by subtracting spectrum after exposure from spectrum before exposure);

FIG. 43 is a graph showing absorption spectrum of a CdSe nanoparticle, wherein an absorption peak of exciton of the nanoparticle resides in a wavelength of 564 nm;

FIG. 44A is a diagrammatic representation showing the principle underlying a recording/reproduction method for use with an optical disk comprising a solid substrate coated with a nanoparticle thin film and a protective film of $SiO_2$ or the like formed on the nanoparticle thin film, the method comprising steps of forming recording pits on the disk by radiation of excitation light (writing light) onto the disk, by causing reproduction light to fall on the disk, by detecting light reflected by the disk, and by reading a difference in reflectivity between the recording pits and a land;

FIG. 44B shows a mark position recording method (in which a signal is written into the center of each recording pit); and FIG. 44C shows a mark edge recording method (in which a signal is written into the edge of each recording pit).

DETAILED DESCRIPTION OF THE PREFERRED EMBODIMENTS

First Embodiment

A first embodiment of the present invention is directed to an optical memory device comprising:

a solid substrate; and a thin film comprising a luminous material having a TDLM function of increasing and/or memorizing a photoluminescence intensity (hereinafter referred to as a "luminous intensity") as a function of irradiation time of excitation light or as a function of the dose of excitation light.

In the case of use of the thin film including luminous "nanoparticles", if the thin film is exposed to excitation light while being left at room temperature and in air, nanoparticles included in the exposed region of the thin film effectuate photoluminescence (fluorescence). By means of the TDLM function, the intensity of photoluminescence is increased, as a function of irradiation time (or the dose), to several times the initial intensity of photoluminescence. An arbitrary image can be formed on the nanoparticle thin film by means of an intensity ratio (contrast) between an exposed region and an unexposed region on the nanoparticle thin film. Such an optical memory effect is an intrinsic physical property of a multiparticle-based thin film formed on a solid substance by any of various coating methods, wherein nano particles are in close proximity to one another in the nanoparticle thin film. The intensity of photoluminescence emitted from the nanoparticle thin film can be controlled by changing the thickness of the nanoparticle thin film, the material of the solid substrate, the intensity of excitation light, and the manner of irradiation (for example, continuous or intermittent irradiation).

Further, the optical memory device according to the present invention can improve the rate of increase of luminous intensity, a storage time, and a retention time and can store, retain, or reserve an image formed on the optical memory device semipermanently.

According to the present invention, the time during which the luminous intensity is increased is usually three hours or less, more preferably $1 \times 10^{-6}$ seconds to one hour, and the rate of increase of luminous intensity is usually 1.1 times the original luminous intensity, more preferably about 5 to 100 times.

The time during which luminous intensity is sustained, retained, or stored is, at a temperature of 77K or more, one second or more, preferably one hour or more, more preferably 24 hours or more.

The luminous nanoparticles having the TDLM function which are the object of the present invention assumes a particle size of 0.5 to 100 nm, preferably 0.5 to 50 nm, more preferably 1 to 10 nm. If the luminous nanoparticles are excessively greater in size than described above, the particles will assume the nature of a bulk. In contrast, if the luminous nanoparticles are excessively smaller in size than described above, the particles will have to be single atoms or molecules.

The nanoparticles constituting the TDLM material are not limited to any particular type and are solely required to solely have a predetermined particle size. The nanoparticles are formed from; for example, group I–VII compound semiconductors such as CuCl; group II–VI devices such as CdS and CdSe; group III–V compound semiconductors such as InAs; semiconductor crystal of group IV semiconductors; metal oxides such as $TiO_2$, SiO, and $SiO_2$; inorganic compounds such as phosphor; organic compounds such as furaren, dendrimar, phtarocyanine, and azo compounds; and composites thereof.

Within the scope in which the objective of the present invention is attained, the surface of the nanoparticles may be modified chemically or physically. Alternatively, an additive, such as a surfactant, a dispersing and stabilizing agent, or an antioxidant, may be added to the nanoparticles.

Such nanoparticles may be synthesized through use of a colloidal-chemistry technique; for example, an inverse micelle method [Lianos, P. et al., Chem. Physics, Letter 125, 299(1986)]; or a hot soap method [Pen, X. et al., J. Am. Chem. Soc., 119, 7019(1997)].

An arbitrary solid substrate on which a film including luminous nanoparticles (hereinafter often referred to as a "TDLM film") is formed to one layer or more layers may be cited as an example of the optical memory device according to the present invention.

The solid substrate used in the present invention is usually formed from an organic solid substance, such as polymer or paper, or from an inorganic solid substrate, such as glass, metal, metal oxide, silicon, or a compound semiconductor. In order to retain the original emission characteristics of the TDLM film, desirably the solid substrate does not exhibit noticeable light emission within a luminous band of luminous material or the vicinity thereof. Within the scope in which the object of the present invention is achieved, the surface of the solid substrate may be reformed so as to become hydrophobic or hydrophilic. In order to enable erasure of the image stored or reserved by the TDLM function, a thin film of photoconductive material may be provided on the solid substrate. Then said nanoparticles thin film can be formed on the thin film of photoconductive material.

Within the scope in which the object of the present invention is achieved, an antireflection film or a film of insulating material may be formed on the surface of the TDLM film.

The thickness of the TDLM film is not particularly limited but is usually greater than the diameter of the luminous nanoparticle but less than 1 mm, preferably greater than the diameter of the luminous nanoparticle but less than 100 μm.

Preferably, luminous nanoparticles are present in at least a certain density in the TDLM film. In this sense, desirably a mean distance between the luminous nanoparticles in the TDLM film usually falls within a range whose maximum is ten times the diameter of the nanoparticle, more preferably within a range whose maximum is twice the diameter of the nanoparticle. If the mean distance between nanoparticles is too large, the luminous nanoparticles fail to exhibit a collective function.

The TDLM film can be produced by preparation of suspension through dispersing nanoparticles into a solvent; dissolving an organic compound to be described later into the suspension, as required, to thereby prepare another suspension; and coating a solid substrate with the suspension and drying the suspension.

A spin coating method, a dip coating (or immersion coating) method, a wetting film (liquid membrane) method, a spray coating method, an ink-jet method, or Langmuir Blodgett's technique may be used for coating.

The nanoparticle content in the suspension is not particularly limited and may differ according to a coating method and a desired film (layer) structure, or according to the structure of arrangement of nanoparticles and the thickness of the nanoparticle film (or layer). For example, in a case where the solid substrate is coated with nanoparticles through use of the spin coating method, the thickness of the nanoparticle film can be changed by changing the nanoparticle content or the rotation speed of the solid substrate.

The solvent used for dispersing nanoparticles is usually a liquid, such as water, methanol, ethanol, toluene, hexane, pyridine, or chloroform. A liquid having the property of enabling dispersion of nanoparticles is desirable. Further, in view of the object of obtaining a film with which an organic substance is mixed, a fluid which can dissolve an organic substance is desirable. Further, in view of the objective of obtaining a dry solid TDLM film, a volatile liquid is desirable. Further, so long as a pattern is formed on a solid substrate beforehand (for example, a pattern is formed on a hydrophilic or hydrophobic surface of a solid substrate), the previously-described geometric pattern of a nanoparticle thin film can be controlled arbitrarily.

Within the scope in which the object of the present invention is achieved, there may be added to the suspension an additive such as a dispersing and stabilizing agent or an antioxidant, or a binder such as polymer or a material which gelates during coating and drying processes.

The thus-patterned or non-patterned (uniform) nanoparticle thin film shows the noticeable TDLM effect such as that mentioned previously. By exciting the nanoparticle thin film (continuously or intermittently) through exposure to light of an appropriate wavelength, the intensity of photoluminescence emitted by the nanoparticle thin film increases as a function of irradiation time of excitation light. If the nanoparticle thin film is exposed to light without being subjected to special treatment, the increased intensity of photoluminescence emitted from the exposed region of the film is retained for at least several hours at room temperature. The thus-increased photoluminescence intensity may be diminished (or erased) by application of an external field, such as an optical thermal field, an electric field, a chemical field, a magnetic field, or a mechanical field, to the nanoparticle thin film. The intensity of photoluminescence emitted by the nanoparticle thin film can be controlled by changing the thickness of the nanoparticle thin film, the material of the solid substrate, the intensity of excitation light, and the manner of irradiation (for example, continuous or intermittent irradiation).

Applications of the optical memory device will now be described.

(1) FIGS. 2A and 2B are diagrammatic representations showing the principle underlying an application of the optical memory device (e.g., a data recording medium or an image pick-up device). An image is recorded on a film or layer having a TDLM effect 7 (hereinafter referred to as a "TDLM film" or a "thin film") through use of a writing beam 8. The writing beam 8 may be patterned or uniform. The image recorded on the TDLM film 7 is reproduced and read by means of an image reading beam 11 (see FIG. 2B). The recorded image can be reserved for a long period of time or can be erased.

FIG. 2A shows an imaging (or writing) process. A CdSe nanoparticle TDLM thin film 7 formed on a glass substrate is excited by a blue laser beam 8 emanated from a laser light source 4. First, the diameter of a spot of the laser beam 8 is enlarged by means of a beam expander, and the laser beam 8 is then patterned through use of a mask 6. The nanoparticle TDLM thin film 7 is partially excited by means of the thus-patterned beam. In such a case, the excitation light may be either continuous or intermittent. The photoluminescence intensity of the exposed region of the TDLM thin film 7 increases with lapse of irradiation time, and an image is formed on the TDLM thin film 7 by means of an intensity ratio (contrast) between an exposed region and an unexposed region. FIG. 2B shows an image reproduction (reading) process. After the image has been formed and recorded on the TDLM thin film 7 through the foregoing processes, the TDLM thin film 7 as a sample is placed in front of a camera 10, and the entire TDLM thin film 7 is uniformly exposed to UV rays 11 emitted from a UV light source 9. Then photoluminescence is generated from the TDLM thin film 7 corresponding to the recorded datum. Even when the TDLM thin film 7 is exposed to uniform UV rays, a difference arises in photoluminescence intensity between the region exposed to the laser beam 8 in the process shown in FIG. 2A and an unexposed region.

Figure 3:
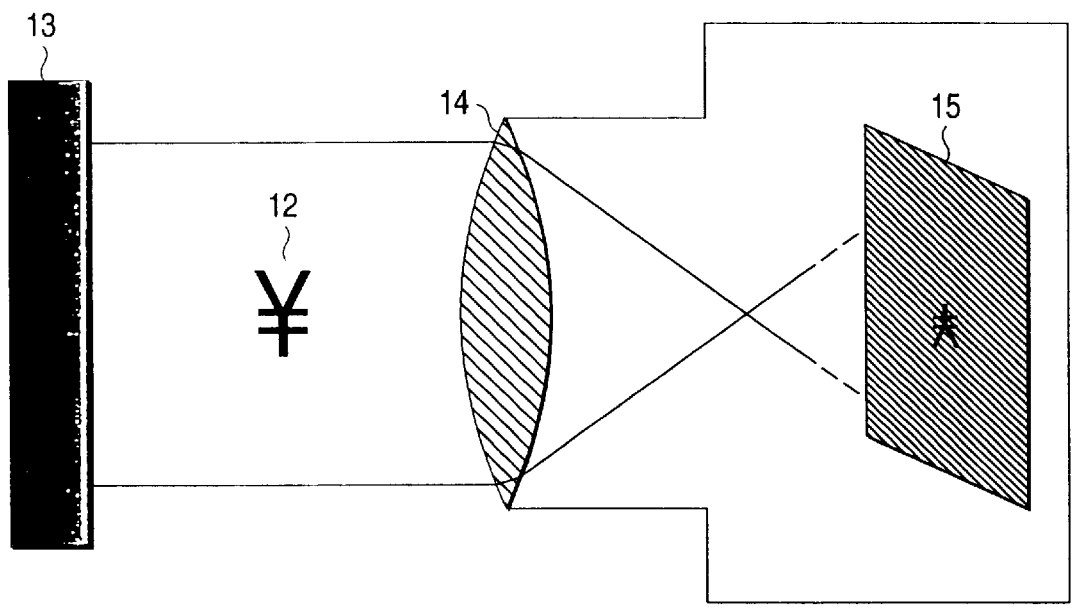
FIG. 3A is a schematic representation showing an apparatus for forming a negative image of a subject onto a TDLM film.
FIG. 3B is a schematic representation showing another apparatus, in which the pattern of excitation light which is emitted from a light source while being patterned is projected onto a TDLM film, and the light emitted from the TDLM film is projected onto a screen, preferably by way of a lens.
Figure 3:
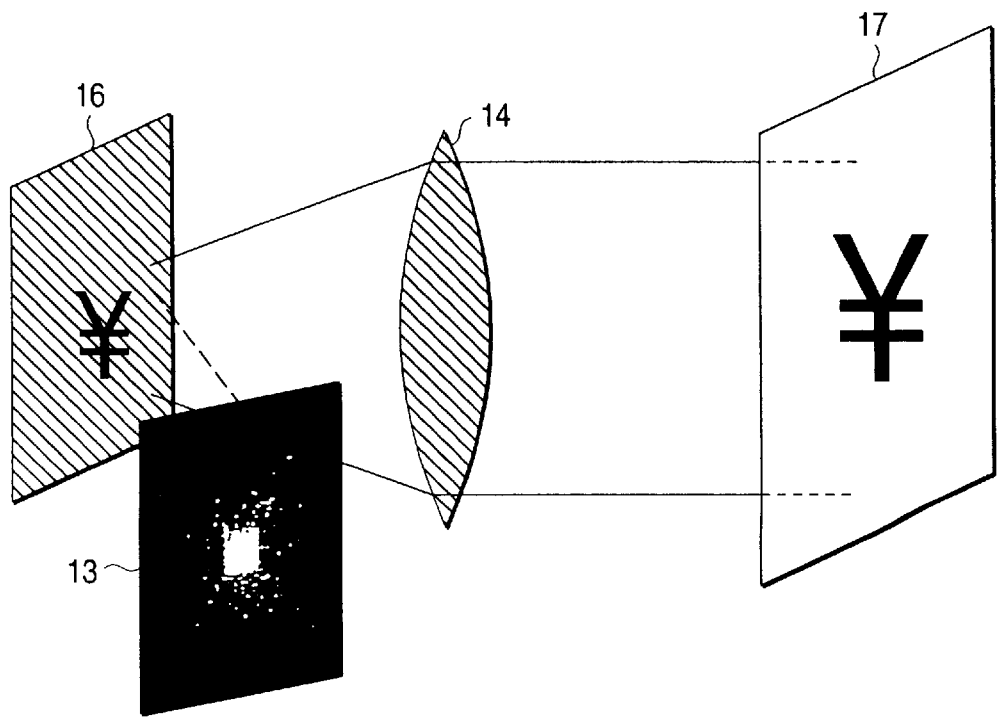

(2) FIGS. 3A and 3B are diagrammatic representations showing the principle underlying another application of the optical memory device (e.g., an image pick-up device). During an image pick-up process (shown in FIG. 3A), a negative image of a subject 12 is formed on a TDLM film 15. Preferably, a subject image is formed on the TDLM film 15 through a lens 14.

In an image projection process (shown in FIG. 3B), a TDLM film 16 is exposed to patterned light emitted from a light source 13, and the pattern of the light is projected onto the TDLM film 16. A projected image is formed by projecting onto a screen 17 the light emitted from the TDLM film 16. Preferably, the light emitted from the TDLM film 16 is projected onto the screen 17 by way of the lens 14. The thus-recorded image or pattern can be reserved for a long period of time or can be erased.

More specifically, FIG. 3A is a diagrammatic representation showing an apparatus for forming a negative image of the subject 12 onto the TDLM film 15. The subject 12 is exposed to light (e.g., UV rays) emitted from the light source 13 opposite the lens 14, and an image is formed and recorded on the TDLM film 15 by means of the light that has transmitted through the subject 12. Preferably, the transmitted light forms an image on the TDLM film 15 by way of the lens 14. The contrast of the image depends on the exposure time.

FIG. 3B is a diagrammatic representation showing an apparatus for producing a projected image. The TDLM film 16 is exposed to patterned light (e.g., UV rays) emitted from the light source 13, and the pattern of the light is projected onto the TDLM film 16. Preferably, the light emitted from the TDLM film 16 is projected onto the screen 17 by way of the lens 14.

Figure 4:
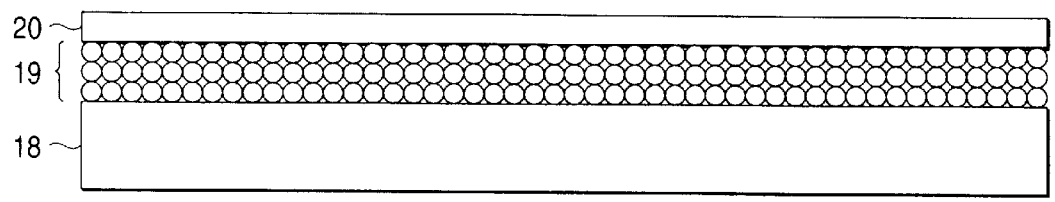
FIGS. 4A to 4C are cross-sectional views showing the TDLM film formed on the solid substrate.
Figure 4:
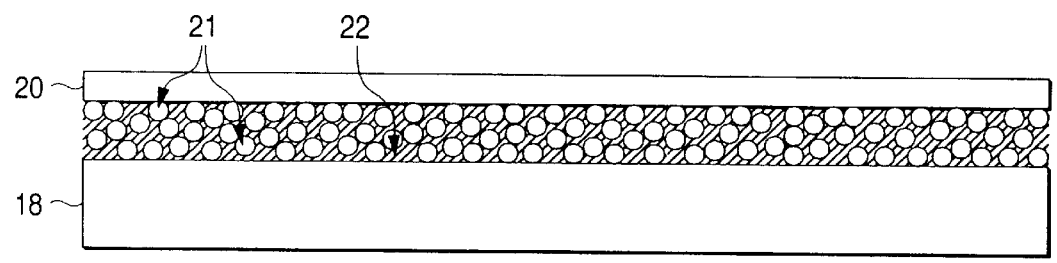
Figure 4:
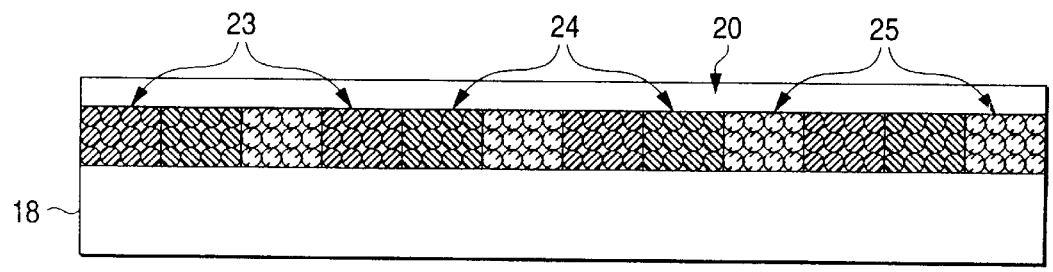

(3) FIGS. 4A to 4C are schematic diagrams showing the principle underlying still another application of the optical memory device (e.g., an image pick-up device or a display). A nanoparticle TDLM thin film 19 formed on a solid substrate 18 shown in FIG. 4A is preferably protected by a protective layer 20. The particle size distribution of nanoparticles is arbitrary. Further, the nanoparticles may have a single composition, or a plurality of types of particles may coexist. Further, an electrode formed from metal or ITO may be laminated on one side or both sides of the nanoparticle TDLM thin film 19. By radiating patterned light onto the side of the TDLM thin film 19 opposite the solid substrate 18, the pattern (or image) of the light is recorded on the TDLM thin film 19. By uniformly or partially radiating a reading beam onto the side of the TDLM thin film 19 having the image recorded or written thereon, the image is reproduced. The same also applies to a TDLM thin film (shown in FIG. 4B) which is formed on the solid substrate 18 and comprises nanoparticles 21 and binders 22, as well as to a nanoparticle TDLM thin film (shown in FIG. 4C) which is patterned. The nanoparticle TDLM thin film which is formed on the solid substrate 18 and is patterned is separated into red light emission regions 23, green light emission regions 24, and blue light emission regions 25. Preferably, the entire surface of such a TDLM thin film is coated with the protective layer 20. The red light emission regions 23 comprise nanoparticles of a particle size distribution or particle composition whose emission wavelength is red; the green light emission regions 24 comprise nanoparticles of a particle size or particle composition whose emission wavelength is green; and the blue light emission regions 25 comprise nanoparticles of a particle size or particle composition whose emission wavelength is blue.

The thus-recorded image or pattern can be reserved for a long period of time or can be erased.

Figure 5:
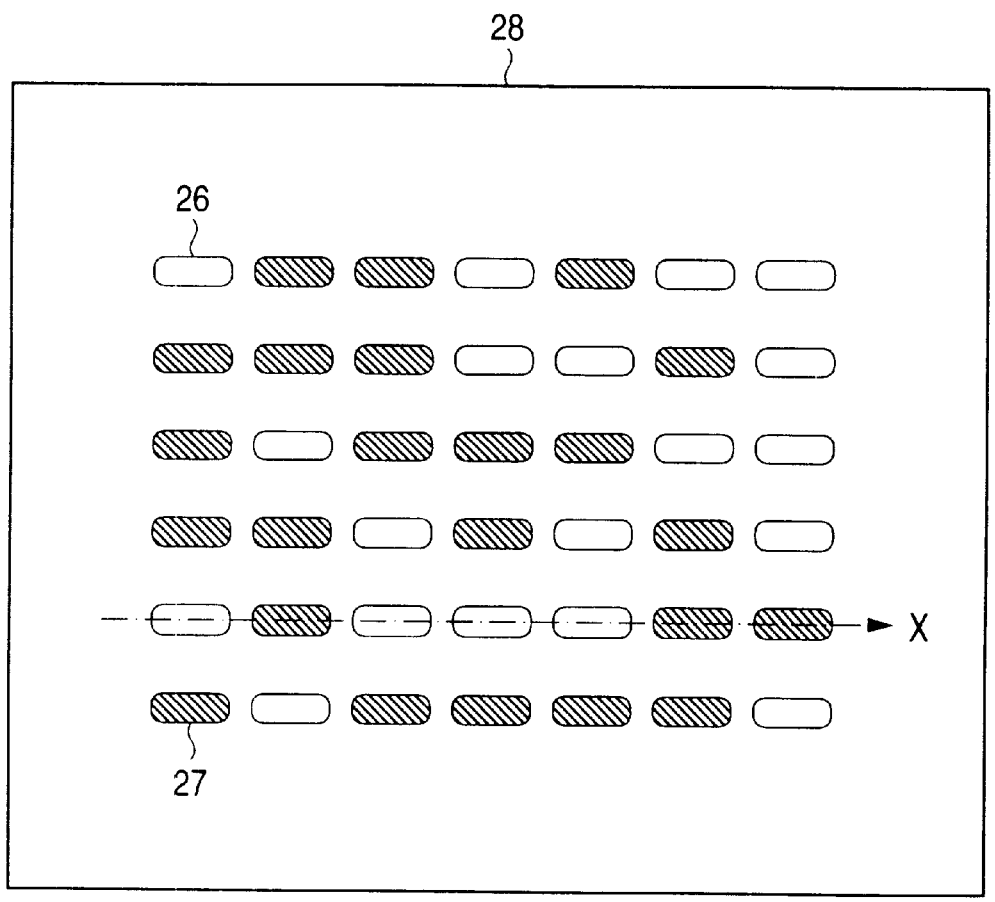
FIG. 5A is a fragmentary schematic representation showing the TDLM film formed on the solid substrate.
FIG. 5B is a graph showing spatial distribution of intensity of photoluminescence resulting from scanning of the TDLM film in direction designated by arrow (i.e., X shown in FIG. 5A)
Figure 5:
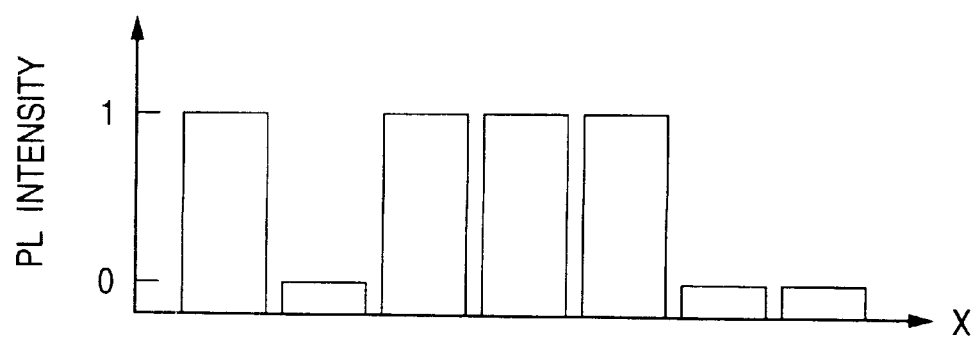

(4) FIGS. 5A and 5B are diagrammatic representations showing the principle underlying a yet another example of the optical memory device (e.g., a data recording medium). A TDLM film 28 formed on a solid substrate is exposed (or excited) in a spatially regular manner by means of a writing beam, with the result that digital data are recorded on the TDLM film 28 in the form of bits. The TDLM film 28 having digital data recorded thereon is scanned and exposed through use of a reading beam, thus causing fluctuations in the luminous intensity of individual bits. These fluctuations are read as a digital signal, thereby reproducing the recorded data. A signal reproduced from one bit can also be imparted with steps (gradations) by changing the time during which digital data are recorded through use of the writing beam (or the intensity of the writing beam used for recording digital data). The thus-recorded bit data can be reserved for a long period of time or can be erased.

FIG. 5A is a fragmentary diagrammatic view showing the TDLM film 28 formed on the solid substrate. White dots 26 represent regions exposed (or excited) to appropriate excitation light (or a writing beam) for a certain period of time, and black dots 27 represent unexposed (or unexcited) regions.

FIG. 5B is a plot showing the spatial distribution of photoluminescence intensity obtained by scanning the TDLM film 28 in the direction designated by arrow shown in FIG. 5A (i.e., direction X) through use of the reading beam. Strong light emitted from the white dot (written region) 26 is taken as a "1" or "ON" digital signal, and weak light emitted from the black dot (unwritten region) 27 is taken as a "0" or "OFF" digital signal, thereby recording digital data. The data represented by each dot can be imparted with steps (gradations) by changing the time during which the data are recorded through use of excitation light (or by changing the intensity of excitation light).

(5) Another conceivable application of the optical memory device is photoconductive storage material. In a xerography machine such as a copier or laser printer, so long as a TDLM film is used as a carrier generation layer (CGL), an image formed or recorded through one-time selection of light or uniform exposure is recorded on the carrier generation layer, thus yielding the possibility of realization of a memory xerography machine which eliminates a necessity for repetitions of exposure in a duplication (printing) process.

Figure 6:
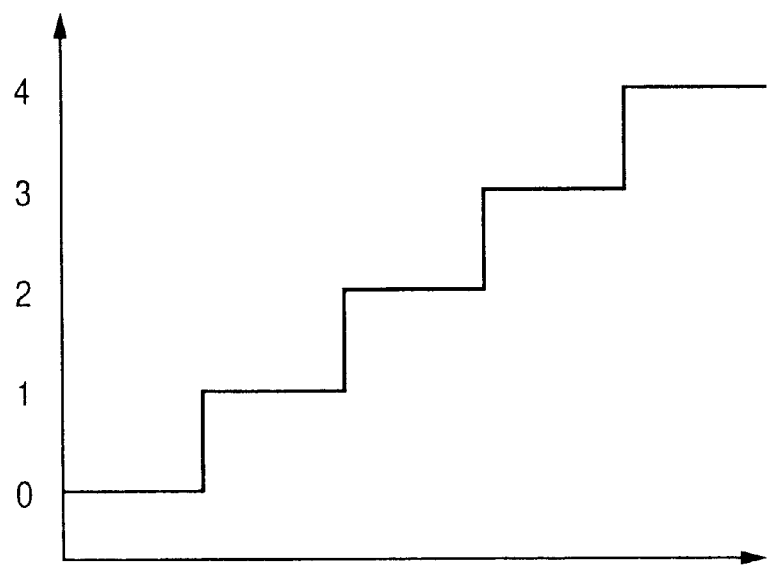
FIGS. 6A and 6B are graphs showing the property of a multichannel processor utilizing the TDLM film.
Figure 6:
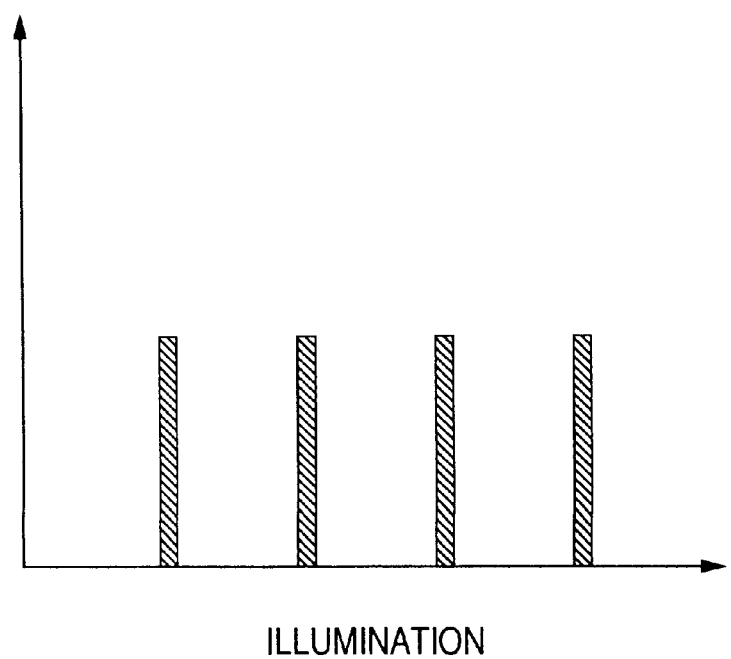

(6) FIGS. 6A and 6B are diagrammatic representations showing the principle underlying another example of the optical memory device (e.g., a multichannel processor).

In a multichannel processor utilizing a TDLM film, the intensity of an optical signal output from a multichannel processor is changed stepwise (as shown in FIG. 6A) by exposure of the processor to discrete excitation light (shown in FIG. 6B). The optical signal output from the multichannel processor has two or more states, and hence the multichannel processor can handle many information items.

FIG. 6B is a plot showing illumination of discrete excitation light for the purpose of changing the states (strength) of a signal output from the optical memory device.

Figure 7:
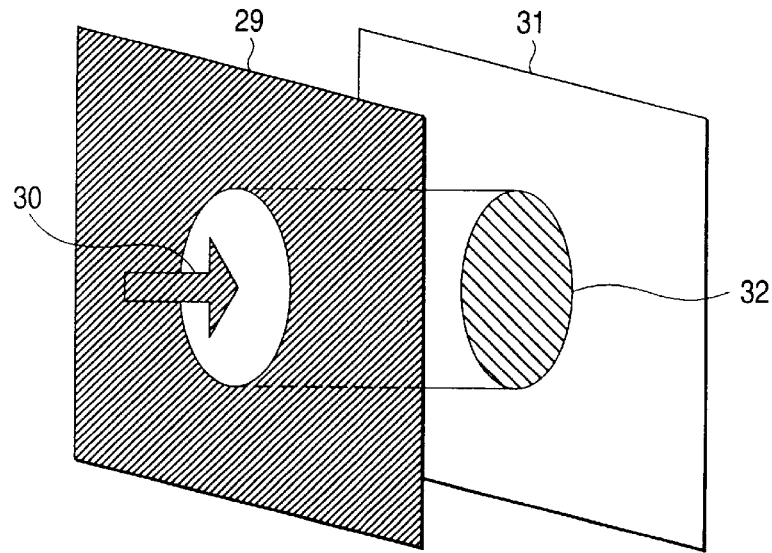
FIGS. 7A to 7C are schematic representations showing the principle of an integrating optical sensor utilizing the TDLM film.
Figure 7:
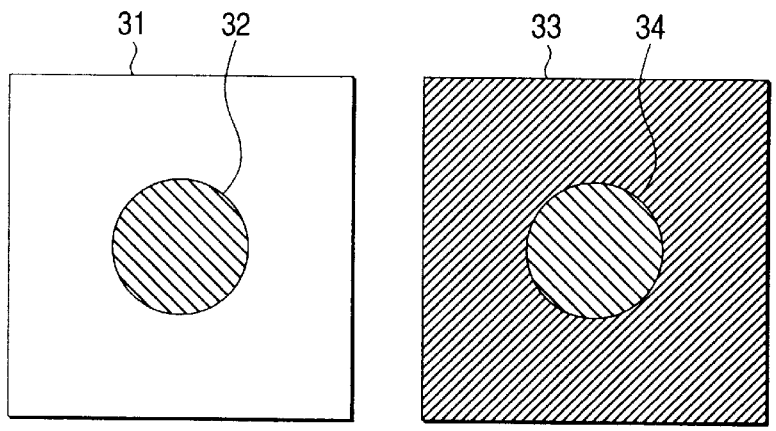
Figure 7:
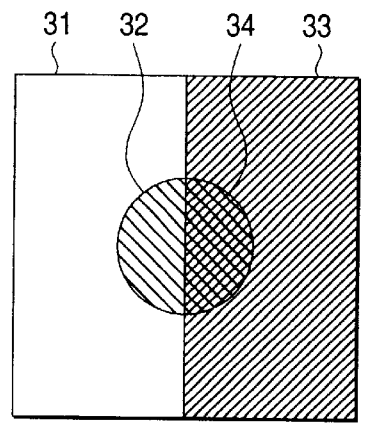

(7) FIGS. 7A, 7B, and 7C are diagrammatic representations showing the principle underlying another example of the optical memory device (e.g., an integrating optical sensor) When a TDLM film 31 is exposed to light to be detected (such as UV ray) 30 (see FIG. 7A), the intensity of the light emitted from the TDLM film 31 is changed with irradiation time (or the dose). The absolute or relative amount of the total dose of the light to be detected 30 (such as UV ray) can be ascertained by measuring the amount of change in the luminous intensity quantitatively (see FIG. 7B) or qualitatively (see FIG. 7C)

(a) When the TDLM film 31 is exposed to the excitation light (such as UV ray) 30 through; e.g., a pin-hole type mask 29 having a certain area, mask patterns image 32 whose brightness differ according to irradiation time (or the dose) are recorded on the TDLM film 31.

(b) The principle of measurement of an absolute amount of irradiation will now be described. A standard phosphor film 34 having a known quantum efficiency is formed on the solid substrate 33 so as to have the same area as that of the mask patterns image 32. The intensity of photoluminescence emitted from the mask patterns image 32 recorded on the TDLM film 31 is compared with the intensity of photoluminescence emitted from the standard phosphor film 34, thereby enabling measurement of the absolute amount of irradiation of excitation light.

(c) The principle of measurement of a relative amount of irradiation will now be described. The TDLM film 31 is formed on half the surface of the solid substrate 33, and the standard phosphor film 34 having a known quantum efficiency is formed on the remaining area of the solid substrate 33 where the TDLM film 31 is not formed. The solid substrate 33 is then exposed to excitation light such that both the TDLM film 31 and the standard phosphor film 34 are exposed simultaneously. The luminous intensity of the TDLM film 31 is compared with the luminous intensity of the standard phosphor film 34, thereby enabling measurement of a relative amount of irradiation of excitation light.

In the optical memory device according to the present invention, a large contrast of intensity ratio is present between an exposed region and an unexposed region of the optical memory device, thereby enabling an increase in a signal-to-noise ratio. Further, the time during which luminous intensity having once been increased by the TDLM function is stored or retained is increased, so that the optical memory device can be applied to a data recording medium such as ROM. In order to diminish the stored luminous intensity and to enable erasure of an image, the optical memory device may be provided with the previously-described photoconductive thin film. In such a case, writing and erasure of data can be effectuated a plurality of times, thereby enabling application of the optical memory device to rewritable data recording mediums, displays, image pick-up devices, image processing devices, retentive duplication, integrating optical sensors, and multichannel processors.

Second Embodiment

A second embodiment of the present invention is directed to an optical memory device comprising:

a film which includes luminous nanoparticles having a (TDLM) function of increasing and/or memorizing a luminous intensity as a function of irradiation time of excitation light or as a function of the dose of excitation light; and an organic compound such as TOPO (trioctylphosphineoxide) which is added to or formed on the film as an another layer, wherein the cluster of the luminous nanoparticles and the organic compound are present in close proximity to each other.

The optical memory device according to the second embodiment of the present invention is the cluster of the luminous nanoparticles (nanoparticles), and an organic compound including at least one element selected from the group comprising P, N, O and S exists in at least a portion of the surface of each luminous nanoparticle.

An organic compound possessing electrification characteristic is desirably employed as the organic compound including at least one element selected from the group comprising P, N, O and S. For example, a desirable low-molecular-weight organic compound comprises an organic phosphorous compound such as trioctylphosphineoxide (TOPO) or trioctylphosphine (TOP); a nitrogen-containing compound such as dodecylamine; an alkyl sulphate such as octylsodiumsulfate, sodiumdodecylsulfate(SDS), or sodiumdecylsulfate; alkylaryl sulfonate metallic salt such as sodium salt dodecylbenzenesulfonate; sulfosuccinic dialkyl ester salt such as dibutylsuflosodiumsuccinate (aerosol IB), dipentylsulfosodiumsuccinate (aerosol AY), dihexylsulfosodiumsuccinate (aerosol MA), or di-(2-ethylhexyl) sulfosodiumsuccinate (aerosol OT); or a sulfur-containing compound such as thiophenol.

Further, a macromolecular compound such as polyimide-based resin may also be used as the organic compound. In addition to the above-described compounds, a commonly-used surfactant may also be used.

Of the above compounds, an organic phosphorous compound such as TOPO or TOP is particularly desirable.

The organic compounds may be used singly or in combination of two or more of species.

The organic compound is usually contained in an amount of 0.01 to 100 wt. %, preferably 1 to 50 wt. %, more preferably 1 to 20 wt. % with respect to the weight of the luminous nanoparticles. If the content of organic compound is substantially lower than described above, the TDLM effect tends to decrease; namely, the rate of increase of luminous intensity and the storage time are diminished. In contrast, if the content of the organic compound is substantially greater than described above, when a film is formed from luminous nanoparticles, the volume percentage of the luminous nanoparticles contained in the film is diminished, and the luminous intensity of the film itself tends to be diminished.

In order to retain the original light emission characteristic of the TDLM film, desirably the organic compound does not exhibit noticeable light emission or absorption within a luminous band of luminous material or in the vicinity thereof.

Methods of manufacturing luminous nanoparticles, in which such an organic compound is present on the surface of each nanoparticle, include the following:

1) Inverse Micelle Method:

According to this method, a W/O emulsion (e.g., water-heptane-based emulsion) is prepared from a surfactant such as AOT (aerosol OT), and nanoparticles of a compound semiconductor such as CdS or CdSe are synthesized from an inverse micelle of the W/O emulsion while the inverse micelle is taken as a reaction field.

2) Hot Soap Method (TOPO method):

According to this method, nuclei are generated by melting TOPO at high temperature and doping the thus-melted TOPO with a stock solution containing metal ions, and nanoparticles of compound semiconductor are synthesized by preventing growth and coagulation of nuclei, which would otherwise be caused by surface coating with TOPO.

According to either of the methods, luminous nanoparticles can be synthesized while an organic compound is chemically or physically adsorbed by, or arranged on, the surface of each luminous nanoparticle.

The amount of the organic compound existing on the surface of each nanoparticle may be changed by doping the synthesized suspension of luminous nanoparticles with an additional organic compound or by removal of the organic compound from the surface of each nanoparticle. The luminous intensity of the resultant cluster of luminous nanoparticles can be arbitrarily controlled by changing the amount of organic compound or the type thereof.

In a case where there are used nanoparticles which are synthesized according to a method other than described above and whose surface are not coated with an organic compound, the luminous nanoparticles and the organic compound are brought into contact with one another through mixing or other method, thereby preparing luminous nanoparticles whose surfaces are provided with an organic compound.

So long as the organic compound is present on the surface of each luminous nanoparticle, the optical memory device according to the present invention can efficiently express the TDLM function. More specifically, the rate of increase of luminous intensity provided by irradiation with excitation light (as a function of time or as a function of the dose) can be considerably improved, or the time during which luminous intensity having once been increased is stored or retained can be increased considerably.

The following is a conceivable mechanism which accounts for the foregoing considerable improvements in the TDLM function.

In the case of nanoparticles formed from a compound semiconductor of comparatively large Bohr radius such as CdSe or CdS (for instance, CdSe has a Bohr radius of 5.6 nm), excitons generated in the nanoparticles undergo quantum containment as a result of irradiation with excitation light. If the nanoparticles are smaller in size than the Bohr radius, the electrons and holes are individually contained. In the case of CdSe nanoparticles which have a particle size of 3.4 nm and are used in embodiments, as will be described later, electrons and holes are individually contained. When the nanoparticles are continuously exposed to excitation light, electrons are poured into a matrix (continuous phase) around the nanoparticles by means of Auger ionization [Nirmal et al., Nature, 383, 802(1996)]. The surface of each CdSe nanoparticle synthesized in the embodiments through the colloidal-chemistry technique [Peng, X. et al., J. Am. Chem. Soc. 119, 7019(1997)] is coated with TOPO molecules. In a thin film which is formed of nanoparticles and is produced by application of the nanoparticles onto a solid substrate, the TOPO is considered to act as a matrix. The process of implanting electrons into TOPO contributes to expression of the TDLM function. The ratio of initial luminous intensity to saturated luminous intensity and the time during which luminous intensity is memorized or retained is assumed to depend on the electrification characteristic of TOPO; i.e., the amount of electrons which TOPO can accept or the duration of time during which TOPO can retain electrons. Based on the above premise, a drastic improvement in the TDLM function; i.e., a considerably increase in the rate of increase of luminous intensity provided by irradiation with excitation light, is explained by the mechanism of the electrification characteristic of TOPO, which is deteriorated under influence of water molecules if the surface of the nanoparticle thin film is uncovered; specifically electrification is improved by addition or lamination of TOPO or an organic compound having the same property.

An arbitrary solid substrate on which is formed to one layer or more layers of a film including luminous nanoparticles (hereinafter often referred to as a "TDLM film") coated with the organic compound may be cited as an example of the optical memory device according to the present invention.

Within the TDLM film, the organic compound may reside on the surface of each luminous nanoparticle and combine therewith or may exist freely between nanoparticles or around a group of nanoparticles without combining with the nanoparticles.

According to the present invention, one layer or more layers of a film consisting of only an organic compound (i.e., a film which does not contain luminous nanoparticles) may be laminated on the side of the TDLM film opposite the solid substrate.

In the case that an organic compound film is formed on the TDLM film, the organic compound film is usually formed to a thickness of 0.5 nm to 1 cm, preferably 10 nm to 500 $\mu$m.

The TDLM film is formed by dissolving; e.g., an organic compound, into a suspension which is prepared through dissolving nanoparticles into the previously-described solvent, and by coating a solid substrate with the suspension and drying the thus-coated suspension in the same manner as in the TDLM film preparation method described in connection with the first embodiment of the present invention.

The content of organic compound in the suspension is not particularly limited and may differ according to a coating method or desired specifications of the TDLM function [for example, the rate of increase of luminous intensity (the ratio of initial luminous intensity to saturated luminous intensity) or a characteristic time during which the luminous intensity increases]. Within the scope in which the objective of the present invention is attained, one type of organic compound, or a plurality types of organic compounds, selected from the previously-described organic compounds may be mixed and dissolved into the suspension.

So long as the organic compound is present in the surface of each luminous nanoparticle, the optical memory device according to the present invention can efficiently express the TDLM function. More specifically, the rate of increase of luminous intensity provided by irradiation with excitation light (as a function of time or as a function of the dose) can be considerably improved, or the time during which luminous intensity having once been increased is stored or retained can be increased considerably.

The process of implanting electrons into TOPO contributes to expression of the TDLM function. The ratio of initial luminous intensity to saturated luminous intensity and the time during which luminous intensity is memorized or retained is assumed to depend on the electrification characteristic of TOPO; i.e., the amount of electrons which TOPO can accept or the duration of time during which TOPO can retain electrons.

In the optical memory device according to the present invention, a large contrast of intensity ratio is present between an exposed region and an unexposed region of the optical memory device, thereby enabling an increase in a signal-to-noise ratio. Further, the time during which luminous intensity having once been increased by the TDLM function is stored or retained is increased, so that the optical memory device can be applied to a data recording medium such as ROM. In order to diminish the stored luminous intensity and to enable erasure of an image, the optical memory device may be provided with the previously-described photoconductive thin film. In such a case, writing and erasure of data can be effectuated a plurality of times, thereby enabling application of the optical memory device to rewritable data recording mediums, displays, image pick-up devices, image processing devices, retentive duplication, integrating optical sensors, and multichannel processors.

Third Embodiment

In an optical memory device According to a third embodiment of the present invention, luminous nanoparticles capable of increasing, or increasing and memorizing, a luminous intensity as a function of irradiation time of excitation light or as a function of the dose of excitation light are present in close proximity to photoconductive material.

For example, as the photoconductive material used in the present invention, there may be utilized an inorganic substance or inorganic compound such as amorphous silicon or amorphous selenium; an organic compound such as phthalocyanine, an azo compound, or a perylene compound; a macromolecular compound such as polyviyl carbazole (PVK) or polyvinylxylene; or organic/inorganic hybrid material such as zinc oxide-organic sensitizing pigments.

Within the scope in which the object of the present invention is achieved, the photoconductive compound may include a pigment or an electron accepting compound.

An arbitrary solid substrate on which a film comprising the cluster of luminous nanoparticles and photoconductive material is formed may be cited as one example of the optical memory device according to the present invention.

According to the present invention, one or more layers of a film containing luminous nanoparticles and a film consisting of photoconductive material may be laminated on the solid substrate. Alternatively, a layer comprising a mixture of luminous nanoparticles and photoconductive material may be formed on the solid substrate.

The film consisting of photoconductive material is usually formed to a thickness of 0.5 nm to 1 cm, preferably 10 nm to 100 $\mu$m.

In a case where there is used a film comprising a mixture of luminous nanoparticles and photoconductive material, the thickness of the film is usually greater than the diameter of the luminous nanoparticle but less than 1 cm.

The film consisting of photoconductive material or the film comprising a mixture of luminous nanoparticles and photoconductive material can be formed in the same manner as in the previously-mentioned TDLM forming method.

As mentioned above, upon exposure to excitation light, the optical memory device according to the present invention increases, or increases and memorizes, the luminous intensity of the excitation light as a function of time or a function of the dose of excitation light. Further, if the optical memory device, which has increased or increased and memorized the luminous intensity, is exposed to light differing in wavelength from the excitation light, and the luminous intensity is diminished or extinguished.

Preferably, light whose energy exceeds the threshold for exciting energy required to excite luminous material is used as light for diminishing or extinguishing the luminous intensity. For example, in the case of CdSe having a particle size of 3.7 nm is used as luminous material, light of 550 nm wavelength or less must be radiated onto the luminous material.

Diminishing and extinguishing luminous intensity is considered to proceed according to the following mechanism.

In nanoparticles of CdS and Au, there is observed a phenomenon in which the intensity of light emitted from semiconductor nanoparticles is diminished (or extinguished) as a result of the semiconductor nanoparticles forming a cluster in conjunction with metal nanoparticles [Kamat, P. V. and Shanghavi, B., J. Physic. Chem. B, 101, 7675, (1997)]. The reason for this is that electron-hole pairs arise in CdS nanoparticles excited by excitation light and electrons migrate through a boundary surface between CdS and Au.

Increase and decrease in luminous intensity and memorization of luminous intensity are effectuated on the basis of the principle that the conductivity of a photoconductive film is maintained at a low level when an image is written into a nanoparticle thin film and a portion of the image desired to be erased is erased by radiating light of appropriate wavelength to the target to thereby increase the conductivity of the photoconductive film.

Accordingly, desirably the excitation light used for writing an image onto the nanoparticle thin film has a wavelength which does not change the conductivity of the photoconductive thin film. Further, the erasing beam for increasing the conductivity of the photoconductive thin film in order to erase an image preferably has a wavelength which does not excite the nanoparticle thin film (i.e., a wavelength which is not absorbed by the nanoparticle thin film).

Preferably, the photoconductive thin film has a good strength of adhesion to the solid substrate and a high mechanical strength. It is also desirable that the surface of the photoconductive thin film be as smooth as possible.

Since the previously-described optical memory device according to the present invention can effectuate writing and erasure of data a plurality of times, the optical memory device can be applied to data recording mediums, displays, image pick-up devices, image processing devices, retentive duplication, integrating optical sensors, and multichannel processors.

Fourth Embodiment

An optical memory device according to a fourth aspect of the present invention is characterized in that a protective layer formed from an insulating material is present in at least a portion of luminous nanoparticles. As a result, the rate of increase in the intensity of light emitted from the cluster of luminous nanoparticles coated with a protective layer and the time during which the increased luminous intensity is stored or reserved can be improved remarkably. An image formed on the optical memory device can be stored, retained, or reserved semipermanently or permanently.

The entirety of the cluster of luminous nanoparticles may be covered with a protective film formed from insulating material or can be formed into a desired shape such as a continuous pattern or a discontinuous pattern such as a dot pattern, according to application of the optical memory device.

For example, as the insulating material used in the present invention, there may be used an oxide such as $SiO_x$ (such as $SiO_2$), and, $TiO_x$ (such as $TiO_2$), or $Ta_2O_5$; an inorganic substance or compound such as a diamond thin film and $Si_3N_4$; or a macromolecular compound such as polyimide-based resin or polycarbonate. In view of the object of retaining the original emission characteristic of the TDLM function, desirably the insulating material does not cause noticeable emission within a luminous band of luminous material or in the vicinity thereof.

A two-layer structure—in which a film containing the cluster of luminous nanoparticles is formed on an arbitrary solid substrate and a protective layer (or film) is further formed on at least part of the film—may be cited as one example of the optical memory device.

The protective layer consisting of insulating material is usually formed to a thickness of 0.5 nm to 1 cm, preferably 10 nm to 500 µm.

In view of the object of enabling erasure of an image stored or retained by means of the TDLM function, a thin film may be formed on the solid substrate from photoconductive material.

Two or more layers of a film containing luminous nanoparticles (hereinafter referred to as a "TDLM film") and a film consisting of insulating material may be formed on a solid substrate. Here, desirably at least one layer of the TDLM film is sandwiched between a solid substrate and a film consisting of insulating material.

For example, as shown in FIGS. 3A and 3B, the protective layer (film) consisting of insulating material can be formed by coating the TDLM film formed on the solid substrate with a solvent containing insulating material (for example, sol-gel coating of $SiO_2$), or through deposition in a vacuum as in the case of CVD (chemical vapor deposition) or PVD (physical vapor deposition).

Since the protective film consisting of insulating material is present in the cluster of luminous nanoparticles having the TDLM function, the TDLM function of the luminous nanoparticles coated with the protective film can be improved remarkably. In other words, the rate of increase of luminous intensity provided by irradiation with excitation light (as a function of time or as a function of the dose) can be considerably improved, or the time during which luminous intensity having once been increased is stored or retained can be considerably increased.

The process of implanting electrons into TOPO contributes to expression of the TDLM function. The ratio of initial luminous intensity to saturated luminous intensity and the time during which luminous intensity is memorized or retained is assumed to depend on the electrification characteristic of TOPO; i.e., the amount of electrons which TOPO can accept or the duration of time during which TOPO can retain electrons. Based on the above premise, a drastic improvement in the TDLM function; i.e., a considerable increase in the rate of increase in luminous intensity provided by irradiation with excitation light and a considerable increase in the time during which the luminous intensity, once increased, is stored or retained, is explained by the mechanism of the electrification characteristic of TOPO, which is deteriorated under influence of water molecules if the surface of the nanoparticle thin film is uncovered, is improved, so long as the surface of the nanoparticle thin film is coated with a protective film of $SiO_2$.

Preferably, the insulating film has good strength of adhesion to the TDLM film and high mechanical strength. Within the scope in which the object of the present invention is achieved, an antireflection film or another insulating film may be laminated on the surface of the insulating film.

In the optical memory device according to the present invention, a large contrast of intensity ratio is present between an exposed region and an unexposed region of the optical memory device, thereby enabling an increase in a signal-to-noise ratio. Further, the time during which luminous intensity having once been increased by the TDLM function is stored or retained is increased, so that the optical memory device can be applied to a data recording medium such as ROM. In order to diminish the stored luminous intensity and to enable erasure of an image, the optical memory device may be provided with the previously-described photoconductive thin film. In such a case, writing and erasure of data can be effectuated a plurality of times, thereby enabling application of the optical memory device to rewritable data recording mediums, displays, image pick-up devices, image processing devices, retentive duplication, integrating optical sensors, and multichannel processors.

Fifth Embodiment

A fifth embodiment of the present invention is directed to a method of forming a thin film of nanoparticles by coating, under specific conditions and through spin coating, a solid substrate with a suspension prepared by dissolving nanoparticles into a solvent. Under this method, the thickness of the nanoparticle thin film can be controlled by changing the nanoparticle content in the suspension and the rotation speed of the spin coating.

As the solvent used for preparing the suspension, there may be employed water; fatty alcohol such as methanol or ethanol; aromatic hydrocarbon such as toluene; aliphatic hydrocarbon such as hexane; a mixture thereof; pyridine; and chloroform. The solvent is not particularly limited but is desirably volatile in view of efficiency of desiccation of the solid substrate after spin coating.

The nanoparticle content in the suspension differs according to a desired film (layer) structure, or according to the structure of arrangement of nanoparticles and the thickness of the nanoparticle film (or layer). The nanoparticle content usually assumes a value of 0.001 to 10 g/ml or thereabouts, preferably 0.01 to 0.1 g/ml or thereabouts.

The rotation speed required for spin coating is 500 rpm or more, preferably 1000 to 10000 rpm, more preferably 3000 to 8000 rpm.

The solid substrate is rotated for 10 seconds or more, preferably one minute or more, more preferably 3 to 10 minutes or thereabouts.

If the number of rotations required for spin coating is too low, or if the time in which the solid substrate is rotated is too short, a desired nanoparticle thin film having the TDLM function cannot be obtained.

The organic compound can be dissolved in the suspension and may be selected from TOPO (trioctylphosphineoxide), thiophenol, photochromic compounds (spiropyran, fulgide, or the like), charge-transfer complexes, or electron acceptable compounds. Desirably, the organic compound is solid at room temperature.

In this case, the quantity of organic compound in the suspension is one-thousandth or more the weight of a nanoparticle, more preferably one-thousandth to ten times or thereabouts the weight of a nanoparticle.

Within the scope in which the objective of the present invention is attained, there may be added to the suspension an additive such as a surfactant, a dispersing and stabilizing agent, or an antioxidant, or a binder such as polymer or material which gelates during the coating and drying processes.

The solid substrate used in the present invention usually includes an organic solid substance such as polymer or paper or an inorganic solid substance such as glass, metal, metal oxides, silicon, or compound semiconductor. In order to attain the object of retaining the original light emission characteristics of the nanoparticle thin film having the TDLM function, desirably the solid substrate does not exhibit noticeable light emission within a luminous band of luminous material or the vicinity thereof. Within the scope in which the object of the present invention is attained, the surface of the solid substrate may be reformed so as to become hydrophobic or hydrophilic.

After completion of spin coating, the nanoparticle thin film is usually dried by an ordinary method. According to the present invention, for example, the nanoparticle thin film is dried in air at a temperature ranging from −20 to 200° C. or thereabouts, preferably 0 to 100° or thereabouts, for one hour or more, preferably three hours or more. The nanoparticle thin film may be dried under reduced pressure, as required.

At this time, the nanoparticle thin film is subjected to a reduced pressure of $1 \times 10^5$ Pa or less, preferably $1 \times 10^4$ Pa or less. The drying operation is usually performed at a temperature ranging from −20 to 200° C. or thereabouts, preferably 0 to 100° C. or thereabouts. The decompression operation is performed for a period of time ranging from 1 to 24 hours.

The thickness of the TDLM film is not particularly limited but is usually greater than the diameter of the luminous nanoparticle but less than 1 mm, preferably greater than the diameter of the luminous nanoparticle but less than 100 $\mu$m.

Sixth Embodiment

A sixth embodiment of the present invention is directed to a method of producing a nanoparticle thin film by coating a solid substrate, through ink-jet coating, with a dispersed solution, which is formed by dispersing nanoparticles in an emulsion (O/W emulsion) whose continuous phase is a water phase and whose dispersed phase is an oily phase. According to this method, the thickness of the nanoparticle thin film can be controlled by changing a nanoparticle or surfactant content in the suspension.

Although the emulsion in the water phase primarily comprises water, a water soluble organic solvent may be added as well. The water soluble organic solvent may be ethylene glycol, propylene glycol, buthylene glycol, diethylene glycol, triethylene glycol, polyethylene glycol (#200 or #400), glycerine, an alkyl ether group of the glycol group, N-methyl pyrolidone, 1,3-dimethyl imidazolyn, thiodiglycol, 2-pyrolidone, sulfolane, dimethylsulfoxide, diethanolamine, triethanolamine, ethanol, or isopropanol. The amount of a water soluble organic solvent included in a water dispersion medium is usually not more than 30 wt. %, preferably not more than 20 wt. %.

The nanoparticle content in the suspension is not particularly limited and may differ according to a coating method and a desired film (layer) structure, or according to the structure of arrangement of nanoparticles and the thickness of the nanoparticle film (or layer). The nanoparticle content is usually within the range from 0.01 to 10 wt. % with respect to the total amount of dispersion, preferably 0.05 to 1 wt. %. If the content of nanoparticles is substantially lower than described above, there arises a possibility that the TDLM function will be insufficiently expressed. In contrast, if the content of nanoparticles is substantially greater than described above, the stability of squirting action during ink-jet coating may be impaired.

According to the present invention, desirably a surfactant and a solvent for use in dispersing nanoparticles coexist in the dispersion to be used for ink-jet coating.

As a surfactant, a following hown surfactant maybe used; e.g., an anionic surfactant (such as sodium dodecylsulfonate, sodium dodecylbenzenesulfonate, sodium laurate, or ammonium salt of polyoxyethylenealkylethersulfate), or a nonionic surfactant (such as polyoxyethylenealkylether, polyoxyethylenealkylester, polyoxyethylenesorbitanfattyacidester, polyoxyethylenealkylphenylether, polyoxyethylenealkylamine, or polyoxyethylenealkylamide). These surfactants may be used singly or in combination of two or more species. The surfactant is usually used in an amount within the range from 0.1 to 30 wt. % with respect to the total amount of ink. Desirably, the surfactant content ranges from 5 to 20 wt. %. If the surfactant content is substantially lower than described above, oil separates from water within the water dispersion medium, thereby hindering uniform coating of nanoparticle. In contrast, if the surfactant content is substantially greater than described above, the viscosity of the water dispersion medium tends to increase.

Volatile fluids such as toluene, hexane, pyridine, and chloroform are usually desirable as the solvent for use in dispersing nanoparticles. The solvent is usually used in the range from 0.1 to 20 wt. %, preferably 1 to 10 wt. %. If the solvent content is substantially lower than described above, the amount of nanoparticles capable of being contained in the water dispersion medium is reduced. In contrast, if the solvent content is substantially greater than described above, oil separates from water within the water dispersion medium.

Further, the previously-described organic compound can be dissolved into the dispersion and can be TOPO (trioctylphosphineoxide), thiophenol, photochromic compounds (spiropyran, fulgide, or the like), charge-transfer complexes, or electron acceptable compounds. Desirably, the organic compound is solid at room temperature.

In this case, the quantity of organic compound in the suspension is one-thousandths or more the weight of a nanoparticle, more preferably one-thousandths to ten times or thereabouts the weight of a nanoparticle.

Within the scope in which the objective of the present invention is attained, there may be added to the suspension an additive such as a surfactant, a dispersing and stabilizing agent, or an antioxidant, or a binder such as polymer or material which gelates during the coating and drying processes.

After completion of spin coating, the nanoparticle thin film is usually dried by an ordinary method. According to the present invention, for example, the nanoparticle thin film is dried in air at a temperature ranging from −20 to 200° C. or thereabouts, preferably 0 to 100° or thereabouts, for one hour or more, preferably three hours or more. The nanoparticle thin film may be dried under reduced pressure, as required.

At this time, the nanoparticle thin film is subjected to a reduced pressure of $1 \times 10^5$Pa or less, preferably $1 \times 10^4$Pa or less. The drying operation is usually performed at a temperature ranging from −20 to 200° C. or thereabouts, preferably 0 to 100° C. or thereabouts. The decompressing operation is performed for a period of time ranging from 1 to 24 hours.

Seventh Embodiment

A seventh embodiment of the present invention is directed to diminishing or erasing the luminous intensity that is increased, or increased and memorized, by the optical memory device having the previously-described TDLM function, by subjecting the optical memory device to heat treatment.

The temperature at which heat treatment is effected usually ranges from 0 to 500° C., preferably 20 to 400° C., or more preferably 50 to 200° C. Further, the time required for performing heat treatment ranges from $1 \times 10^{-9}$ seconds to 10 hours, preferably $1 \times 10^{-9}$ seconds to one hour, or more preferably 10 to 30 minutes or thereabouts.

The rate of reduction in luminous intensity can be controlled through appropriate selection of conditions according to the above-described requirements.

Specifically, as a heat treatment method, there may be employed a method of heating, in a high-temperature oven, an optical memory device which includes nanoparticles whose luminous intensity is increased, or increased and memorized; a method of pressing a high-temperature substance against a portion of, or the entirety of, the optical memory device; and a method of radiating infrared rays onto a portion of, or the entirety of, the optical memory device. Thus, the heat treatment method is not particularly limited.

The image whose luminous intensity is increased, or increased and memorized, through irradiation with excitation light is usually reserved for a long period of time at room temperature. However, so long as the image is subjected to heat treatment, the luminous intensity of the image can be reduced to the photoluminescence intensity before the luminous intensity is increased, or increased and stored, through irradiation with excitation light; namely, the luminous intensity is diminished to 0.9 times or less the increased luminous intensity, thereby enabling erasure of the image.

As shown in FIGS. 34A and 34B, an image is written on the optical memory device through use of light of certain wavelength λ1. The image can be erased by radiating infrared rays λ2, such as a carbon dioxide gas laser beam, onto the image.

In such a case, the optical memory device having the TDLM function can effectuate writing and erasure a plurality of times, and hence the optical memory device can be applied to data recording mediums, displays, image pick-up devices, image processing devices, retentive duplication, integrating optical sensors, and multichannel processors.

Eighth Embodiment

An eighth embodiment of the present invention is directed toward an integrating optical sensor comprising: a thin film including luminous nanoparticles capable of (or having a TDLM function of) increasing, or increasing and memorizing, a luminous intensity as a function of irradiation time of excitation light or as a function of the dose of excitation light; and a mask including a region which is exposed to light to be measured and a region which is not exposed to the light.

In the case of use of a thin film including luminous fine particles of nanometer size ("nanoparticles"), if the thin film is exposed to excitation light while being left at room temperature and in air, nanoparticles included in the exposed region of the thin film effectuate photoluminescence (fluorescence). By means of the TDLM function, the intensity of photoluminescence is increased, as a function of irradiation time (or the dose), to several times the initial intensity of photoluminescence. An arbitrary image can be formed on the nanoparticle thin film by means of a photoluminescence intensity ratio (contrast) between an exposed region and an unexposed region on the nanoparticle thin film. Such an optical memory effect is an intrinsic physical property of a multiparticle-based thin film formed on a solid substance by any of various coating methods, wherein nano particles are in close proximity to one another in the nanoparticle thin film.

The material of the mask constituting the integrating optical sensor according to the eighth embodiment is not particularly limited but must have a region which is exposed to light to be measured and another region which is not exposed to the light.

The region to be exposed may be formed from a mere pore or may be formed from; e.g., an inorganic material such as glass or quartz; or macromolecular material such as polyethylene, polypropylene, polycarbonate, or polyester. Alternatively, the region to be exposed may be formed from a neutral density (ND) filter, a sharp-cut filter, or a polarizing filter, or a composite material comprising two or more of these filters in combination.

The material constituting the unexposed region is not particularly limited. Any material may be used, so long as the material does not allow passage of light to be measured and is solid at room temperature. For example, there may also be used a material selected from metal; an alloy such as stainless steel, aluminum, iron, and duralumin; or a macromolecular compound such as polycarbonate, polystyrene, polyethylene, vinyl chloride, polyester, Teflon, and nylon.

Within the scope in which the objective of the present invention is attained, the material may contain dye or pigment.

In the present embodiment, assuming that the intensity of light at a certain time "t" is I(t), the integrating type optical sensor can measure the a total dose of light from a time (t=0) at which measurement is commenced until a time ($t=t_f$) at which the measurement is terminated; namely, the sensor can measure the total dose of light by integrating the function I(t) from $t_0$ to $t_f$ as follows:

$$I = \int_0^{t_f} I(t)dt \qquad (1)$$

As mentioned above, the integrating optical sensor can qualitatively and quantitatively ascertain the dose of excitation light or light to be measured (a product of light energy and irradiation time), by radiating through a mask, the light onto a region to be exposed and a region not to be exposed such that the photoluminescence intensity of the exposed region is increased by means of the TDLM function, and by measuring an intensity ratio (contrast) between the exposed region and the unexposed region visually or through use of a detector such as a photodiode.

In this case, the light to be measured must have energy greater than the energy required for exciting the nanoparticle thin film; i.e., the wavelength of the light must be shorter than the absorption edge of the nanoparticle thin film. For example, in a case where CdSe having a particle size of 3.7 nm is used as a nanoparticle, light to be measured has a wavelength of 550 nm or less.

In other words, the range of wavelength of light to be measured can be changed (or adjusted) by appropriate selection of the size of the nanoparticles or material of the nanoparticles. If the light to be measured includes a plurality of wavelengths (for example, white light or sunlight), the light is converted into monochromatic radiation of desired wavelength or falling within a desired range of wavelength through use of a filter, and the thus-converted light is radiated onto the nanoparticle thin film.

One example of the integrating optical sensor according to the eighth embodiment may be embodied by forming, on an arbitrary solid substrate, a thin film from nanoparticles, and by fixing a removable cap-shaped or sheet-like mask on the nanoparticle thin film through use of hardware such as a hinge butt and a hook, an adhesive, adhesive tape, a button, a screw, a clip, or a magnet.

Since the integrating optical sensor according to the present embodiment is very simple in structure and inexpensive, the sensor may be applied to a portable UV exposure sensor or a UV-radiation sensor seal for use in preventing sunburn. Further, so long as photoluminescence emitted from the nanoparticle thin film is monitored by use of the integrating optical sensor in combination with a photodetector, the optical sensor may be applied to a dose-of-radiation-sensing-type door lock whose lock is not released unless exposed to light of certain wavelength for a given period of time, as well as to a fire alarm which senses the dose of radiation of infrared rays through up-conversion.

Ninth Embodiment

A ninth embodiment of the present invention is directed toward providing an optical disk comprising, as a recording medium, luminous nanoparticles capable [or having a TDRM (time dependent reduction and memory) function] of decreasing, or decreasing and memorizing, reflectivity as a function of irradiation time of excitation light or as a function of the dose of excitation light.

In the case where a thin film including luminous "inano-particles" is employed, if the thin film is exposed to excitation light while being left at room temperature and in air, the reflectivity of the exposed region of the nanoparticle thin film decreases as a function of irradiation time (or as a function of the dose), due to the TDRM function. Such a change in the reflectivity of the exposed region is reversible and differs from a change in the reflectivity due to thermal fusion or a change in a phase, such as that observed in the conventional recording method. Therefore, recording pits can be formed in arbitrary shapes in the nanoparticle thin film by utilization of the difference in reflectivity between an exposed region and an unexposed region of the nanoparticle thin film.

Such an optical memory effect is an intrinsic physical property of a multiparticle-based thin film formed on a solid substance by any of various coating methods, wherein nano particles are in close proximity to one another in the nano-particle thin film. The reflectivity of the nanoparticle thin film can be controlled by changing the thickness of the nanoparticle thin film, the material of the solid substrate, the intensity of excitation light, or the manner of irradiation (for example, continuous or intermittent irradiation).

The period of time during which the reflectivity is diminished is usually three hours or less, preferably $1 \times 10^{-9}$ seconds to 1 minute or thereabouts. Further, the rate of decrease in reflectivity (i.e., the ratio of reduced reflectivity to initial reflectivity) usually assumes a value of no more than 0.9 times the initial reflectivity, preferably 0.01 to 0.7 times or thereabouts.

The period of time during which reflectivity is sustained or stored at a temperature of 77 K or more assumes a value of one second or more, preferably 1 hour or more, more preferably 24 hours or more.

In an example of an optical disk and a recording/reproduction method thereof, a film—which is formed on a disk-shaped solid substrate from luminous nanoparticles—is used as a recording thin film of the optical disk. When the recording thin film is exposed to excitation light (whose wavelength is shorter than the absorption edge of the film comprising the previously-described cluster of luminous nanoparticles), the reflectivity of the exposed region in the range of a certain wavelength is diminished or reduced due to the TDRM function. The region whose reflectivity is diminished or reduced is taken as a recording pit. The data recorded on the recording thin film are reproduced through detection of a difference in reflectivity, by use of light which has an appropriate wavelength and which differs from that of the excitation light.

The solid substrate used in the optical disk according to the present invention is usually formed from an organic solid substance such as polymer or an inorganic solid substance such as glass, metal, a metal oxide, an alloy, silicon, or a compound semiconductor. Within the scope in which the object of the present invention is attained, the surface of the solid substrate may be reformed so as to become hydrophobic or hydrophilic. With a view toward enabling erasure of the recording pits, which are stored or reserved, by means of the TDRM function, the solid substrate having a photoconductive film formed thereon may also be used as a substrate.

According to the present invention, after formation of a film including luminous nanoparticles (hereinafter referred to as a "recording thin film") on the solid substrate, a protective film may also be formed on the recording thin film from insulating material such as $SiO_2$. Further, each of the recording thin film and the protective film may be formed into one or more layers.

The thickness of the recording thin film is not particularly limited but is usually greater than the diameter of the luminous nanoparticle but less than 1mm, preferably greater than the diameter of the luminous nanoparticle but less than 100 $\mu$m. Preferably, luminous nanoparticles are present in at least a certain density in the recording thin film. In this sense, desirably a mean distance between the luminous nanoparticles in the cluster usually falls within a range whose maximum is ten times the diameter of the nanoparticle, more preferably within a range whose maximum is twice the diameter of the nanoparticle. If the mean distance between nanoparticles is too large, the luminous nanoparticles fail to exhibit a collective function.

In the optical disk according to the present invention, by exciting the nanoparticle thin film (continuously or intermittently) through exposure to light of an appropriate wavelength, the reflectivity of the film in a certain range of wavelength decreases as a function of irradiation time of excitation light. If the nanoparticle thin film is exposed to light without being subjected to special treatment, the reflectivity of the exposed region on the film is retained for at least several hours at room temperature. The thus-reduced reflectivity can be increased (or recovered) by application of an external field, such as an optical thermal field, an electric field, a chemical field, a magnetic field, or a mechanical field, to the nanoparticle thin film. The reflectivity of the nanoparticle thin film can be controlled by changing the thickness of the nanoparticle thin film, the material of the solid substrate, the intensity of excitation light, and the manner of irradiation (for example, continuous or intermittent irradiation).

According to the method of recording and reproducing an optical disk of the present invention, a signal is recorded by radiation of excitation light (hereinafter often referred to as a "writing beam") onto the optical disk. The reflectivity of the signal-recorded region (i.e., the recording pits) in a certain range of wavelength is diminished or reduced due to the TDRM function. The signal that has been recorded as a difference in reflectivity can be reproduced through scanning over the optical disk and through radiation of light differing in wavelength from the excitation light (hereinafter often referred to as a "reproduction beam") onto the optical disk.

In this case, the writing beam must have energy greater than the energy required for exciting the nanoparticle thin film; i.e., the wavelength of the light must be shorter than the absorption edge of the nanoparticle thin film. For example, in a case where CdSe having a particle size of 3.7 nm is used as a nanoparticle, the writing beam has a wavelength of 550 nm or less. The wavelength of the reproduction beam must be within a range in which a change arises in reflectivity due to the TDRM function. Further, the reproduction beam has energy which is insufficient for exciting the nanoparticle thin film; namely, desirably the reproduction beam is longer in wavelength than the absorption edge of the nanoparticle thin film. The range of wavelength of the reading beam and the reproduction beam can be changed (or adjusted) by changing the size of luminous nanoparticles constituting the recording thin film or the material of luminous nanoparticles.

According to the previously-described method of recording/reproducing an optical disk of the present invention, the wavelength of the writing beam and the wavelength of the reproduction beam can be made shorter. Further, since a reduction in reflectivity assumes a function of irradiation time of excitation light or a function of intensity of excitation light, a signal output from one recording pit can be imparted with a gradation, thereby enabling considerably high-density recording. Further, since the TDRM function is reversible, in principle the optical disk can be erased (or is erasable) many times. The optical disk used for the foregoing recording/reproduction method can also be manufactured by coating the disk in all the manufacturing processes, thereby realizing cost reduction.

EXAMPLES

Examples of the present invention will be described in detail by reference to the foregoing embodiments. Within the scope of the invention, the invention is not limited by the examples.

Example 1-1

According to the method that has been described by reference to FIGS. 2A and 2B, the image, which had been formed and recorded (written) on a CdSe nanoparticle thin film formed on a glass substrate, was reproduced (read). FIGS. 8A and 8B are photographs showing the recorded image and the reproduced image. The CdSe nanoparticle thin film was produced in the following manner. CdSe nanoparticles having a mean particle size of 3.7 nm were dispersed in toluene so as to prepare a suspension having a CdSe concentration of 5.5 wt. %. A glass substrate, which had been sufficiently rinsed with sulfuric acid, was coated with 1 ml of the suspension through spin coating at a rotation speed of 1000 rpm, a temperature of 21° C., and 40% humidity. An image was written on the glass substrate through use of excitation light having a wavelength of 430 nm (i.e., a semiconductor laser beam). As shown in FIGS. 2A and 2B, the diameter of a spot of excitation light 8 is enlarged to about 1 cm by means of a beam expander 5, and the excitation light 8 was then patterned by passing through a mask 6 having a Y-shaped slit. After having passed through the mask 6, the intensity of the excitation light 8 became about 0.03 mW. After the excitation light 8 patterned by the mask 6 has been radiated for about 30 minutes onto a CdSe nanoparticle thin film 7 prepared by the previously-described method, the CdSe nanoparticle thin film 7 was left in a dark place for several minutes. The entire surface of the nanoparticle thin film 7 was uniformly exposed to uniform UV rays (having a wavelength of 360 nm) 11 to thereby reproduce (read) the image (the Y-shaped pattern) recorded on, the nanoparticle thin film 7. The thus-reproduced image was photographed by a camera 10. The photographs shown in FIGS. 8A and 8B were photographed by the camera 10 at an exposure time of 1.5 minutes. Writing and reading of the image were effectuated in air at room temperature. In FIGS. 8A and 8B, photoluminescence emitted from an unmasked region 35 and photoluminescence emitted from a masked region 36 do not differ in light emission wavelength. However, they differ considerably in luminous intensity; the light emitted from the unmasked region 35 is much more intense than the light emitted from the masked region 36.

Example 1-2

With regard to photoluminescence emitted from the CdSe nanoparticle thin film which had been formed on a silicon substrate in the same manner as in Example 1-1 (by use of a suspension having a CdSe concentration of 2.3 wt. %, and a rotation speed of 6000 rpm), in order to examine the dependence of photoluminescence and retention of photoluminescence on irradiation time, excitation light having a wavelength of 400 nm was intermittently radiated onto the nanoparticle thin film, and chronological changes in the spectrum of resultant photoluminescence were measured.

Irradiation and measurement were intermittently carried out according to a sequence of irradiation phases; i.e., a first irradiation phase during which the excitation light was radiated at intervals of 10 minutes, from the start of irradiation until a time of 110 minutes thereafter (the film was exposed for two minutes and left unexposed for eight minutes); a second irradiation phase during which the film is left in a dark place from a time of 110 minutes from the start of irradiation until a time of 415 minutes from the start of irradiation (the film was exposed for two minutes beginning at a time of 170 minutes from the start of irradiation); and a third irradiation phase during which the film was exposed at intervals of five minutes, from a time of 415 minutes from the start of irradiation (the film was exposed to excitation light for two minutes and left unexposed for three minutes). FIG. 9 is a graph on which the spectrum of photoluminescence of 500 to 700 nm (the peak light emission wavelength of the CdSe nanoparticle thin film is 600 nm) is plotted every 20 minutes from the start of irradiation to a time of 100 minutes. This graph shows that the luminous intensity increases over the entire light emission wavelength with an increase in irradiation time. FIG. 12 shows chronological changes in the intensity of photoluminescence of 600 nm wavelength. The CdSe nanoparticle thin film formed on the silicon substrate was intermittently exposed to excitation light of 400 nm wavelength. Irradiation and measurement were intermittently carried out according to a sequence of irradiation phases; i.e., a first irradiation phase in which the excitation light was radiated at intervals of 10 minutes from the start of irradiation until a time of 110 minutes thereafter (the film was exposed for two minutes and left unexposed for eight minutes); a second irradiation phase during which the film was left in a dark place from a time of 110 minutes from the start of irradiation until a time of 415 minutes from the start of irradiation (the film was exposed for two minutes, beginning at a time of 170 minutes from the start of irradiation); and a third irradiation phase in which the film is exposed at intervals of five minutes after a time of 415 minutes from the start of irradiation (the film was exposed to excitation light for two minutes and left unexposed for three minutes). For convenience of analysis, a solid line in the graph is formed by connecting data points representing measured values.

As shown by the graph, the increased intensity of photoluminescence is retained (recorded/memorized) for at least 4 hours or thereabouts. The rate of increase in photoluminescence intensity is higher during the third irradiation phase (after a time of 450 minutes following start of irradiation) than during the first irradiation phase. This is due to a reduction in irradiation time intervals; the writing (recording) speed can be controlled by changing the intensity of excitation light and/or the irradiation time intervals.

Example 1-3

A CdSe nanoparticle thin film is formed on a different substrate in the same manner as in Example 1-1 (by use of a suspension having a CdSe concentration of 2.3 wt. %). Excitation light of 400 nm wavelength was continuously radiated onto the CdSe nanoparticle thin film, and chronological changes in the intensity of photoluminescence of 600 nm were measured. As shown in FIG. 10A, in the case of photoluminescence emitted from the nanoparticle film formed on the silicon substrate, photoluminescence intensity $I_{em}$ is increased to several times the initial photoluminescence intensity $I_{em}^0$. Similarly, as shown in FIG. 10B, even in the case of the nanoparticle film formed on the glass substrate, the photoluminescence intensity $I_{em}$ is increased from the initial photoluminescence intensity $I_{em}^0$. During an initial phase, the rate of increase is substantially linear shape with respect to irradiation time. Typically, the rate of increase approaches saturation in the vicinity of the irradiation time of 1 hour to 2 hours. The rate of increase (ratio of the initial photoluminescence intensity $I_{em}^0$ to saturated photoluminescence intensity $I_{em}^\infty$) in the silicon substrate (see FIG. 10A) is greater than the rate of increase in the glass substrate. The reason for this is thought to be a high reflectivity of the surface of silicon (i.e., a mirror effect). Further, minute fluctuations observed in a curve shown in FIG. 10A may result from the nature of a single CdSe nanoparticle. FIG. 10B shows the influence of thickness of the nanoparticle thin film on the TDLM effect. A nanoparticle thin film having a greater thickness exhibits a more noticeable TDLM effect and shows a greater rate of increase. Although theoretically there exists a thickness optimum for the TDLM effect, the optimum thickness may be defined by an optimum film (minute) structure.

Example 1-4

In connection with an increase in luminous intensity, a phenomenological law is derived from the measured data shown in FIGS. 10A and 10B.

$$\frac{\Phi - \Phi_0}{\Phi_\infty - \Phi_0} = 1 - \exp\left(-\frac{t}{\tau}\right) \quad (2)$$

As shown in FIG. 11, the above expression shows close agrement with the experimental data. Here, $$\Phi(t) = \frac{I_{em}(t)}{I_{em}^0} \quad (3)$$

where $\tau$ represents a characteristic time during which luminous intensity increases.

FIG. 11 is a graph showing a relationship between the intensity of standardized photoluminescence and a dimensionless irradiation time. A hollow circle symbol designates photoluminescence emitted from the CdSe nanoparticle formed on the silicon substrate ($\tau$=170 minutes, ($\Phi_\infty$=6), and a solid square symbol designates photoluminescence emitted from the CdSe nanoparticle thin film formed on the glass substrate ($\tau$=50 minutes, ($\Phi_\infty$=2.6). A solid line is produced by fitting the data to a phenomenological equation such as that indicated by Equation (2).

Example 1-5

A CdSe nanoparticle thin film was formed on a silicon substrate in the same manner as in Example 1-2. Photoluminescence emitted from the CdSe nanoparticle thin film was measured while the silicon substrate was retained by a solid metal sample holder (i.e., while contact was maintained, via metal, between a portion of the surface of the nanoparticle thin film and a portion of the surface on each side of the silicon substrate). No change in photoluminescence intensity was observed. A CdSe nanoparticle thin film was formed on a glass substrate in the same manner as in Example 1-3. At the time of measurement of photoluminescence emitted from the CdSe nanoparticle thin film, an indicator of the hydrometer for measuring ambient humidity fluctuated by ±10% or thereabouts. In a curve of photoluminescence intensity measured in such an environment, there are observed fluctuations associated with the fluctuations of the indicator of the hydrometer. This example points to the possibility of accumulation of electric charges having essential influence on the TDLM effect and points to the possibility of erasure of an image recorded by means of an external field (such as an electrical field or a chemical field).

Example 2-1

(Synthesis of CdSe Nanoparticles)

Preparation of High-Concentration Stock Solution

In a glove box (seal box) maintained at room temperature and in a nitrogen(or inert gas) atmosphere, 0.8 grams of selenium powder (99.999% purity, Aldrich Co., Ltd.) was put into a 20 ml Bayer flask. 8.0 grams of tri-n-butylphosphine (99% purity, Strem Chemicals Co., Ltd.) were added into the Bayer flask and the resultant solution was stirred for minutes, to thereby prepare a uniform, transparent solution. After the solution had been purified through a vacuum transfer method, 2.16 grams of dimethylcadmium (99+% purity, Strem Chemicals Co., Ltd.) stored in a refrigerator in the gloved box were added to the purified solution and the resultant solution was stirred for minutes, to thereby prepare an uniform transparent solution.

Preparation of Diluted Stock Solution

In a gloved box maintained at room temperature and in a nitroge atmosphere, 1.0 gram of the high-concentration stock solution is put into the 20 ml Bayer flask, and 4.0 grams of tri-n-butylphosphine (99% purity, Strem Chemicals Co., Ltd.) were added into the Bayer flask and a resultant solution was stirred for minutes, to thereby prepare an uniform transparent solution. The Bayer flask was closed with a septhum cap and stored in the gloved box.

Synthesis of CdSe Nanoparticles 2 grams of trioctylphosphineoxide (TOPO) (90% purity, Aldrich Co., Ltd.) and a magnetic impeller were put into a 25 ml three-necked flask, and Ar gas was circulated through the flask for 30 minutes, thereby substituting the air in the flask for Ar. After the start of agitation, the inside of the flask was heated to 350° C. through use of a mantle heater. The diluted stock solution was taken out of the gloved box, and 1.0 ml of the stock solution was dispensed into the flask at a time of about 0.1 second in an Ar atmosphere through use of a 5 ml syringe.

As a result, the solution in the flask turned a dark purple color, from which the start of reaction was ascertained. The interior of the flask was maintained at 270 to 290° C. and cooled to room temperature after lapse of 60 minutes after the stock solution was dispensed, thereby terminating reaction.

Separation of CdSe Nanoparticles 10 ml of methanol anhydride (99.8% purity, Aldrich Co., Ltd.) was added to the flask and the resultant solution was stirred for five minutes, thereby yielding a dark purple cloudy suspension. A portion of, or the entirety of, the suspension was transferred to several 5 ml Bayer flasks. The Bayer flasks were subjected to centrifugation at a rotation speed of 3000 rpm for 15 minutes. After centrifugation, a supernatant was discarded, and the residue deposit was dried by blowing nitrogen gas. In this way, there was prepared about 90 mg of CdSe nanoparticles having a mean particle size of 34 angstroms.

Evaluation of Influence of the Quantity of Organic Compound (TOPO) on Luminous Intensity CdSe nanoparticles having a mean particle size of 3.4 nm were dispersed in toluene, thereby preparing a suspension having a CdSe concentration of 5 wt. %. TOPO was added to the suspension to thereby prepare four samples: a sample having a TOPO concentration of 1.75 wt. %, a sample having a TOPO concentration of 4.05 wt. %, a sample having a TOPO concentration of 5.25 wt. %, and a sample having a TOPO concentration of 9.65 wt. %. The sample having a TOPO concentration of 1.75 wt. % shows the TOPO concentration when no TOPO is added to the sample. In other words, during the processes of synthesizing and separating nanoparticles, TOPO is not completely separated from the surface of the nanoparticles through purification. The concentration results from analysis of free TOPO mixedly existing in the nanoparticles (the concentration of TOPO in nanoparticles is about 35 wt. %). A thin film was formed on the glass substrate by coating the substrate with 100 μl of the suspension through spin coating at a rotation speed of 3000 rpm for a period of 10 minutes (during which the glass substrate was rotated). The thin film was then dried in air for 24 hours and under reduced pressure for another 24 hours (at room temperature). Chronological changes in the intensity of light emitted from the CdSe nanoparticle thin film formed on the glass substrate were measured through use of a fluorophotometer. Light of 400 nm wavelength was continuously radiated onto each of the samples for one hour. An increase in luminous intensity is expressed by phenomenological Equation (4) shown below. The rate of increase in luminous intensity and a time constant were obtained by fitting test data.

$$(I-I_0)/(I_\infty-I_0)=1-\exp(-t/\tau) \quad (4)$$

where $(I_\infty-I_0)$ represents the rate of increase in luminous intensity, and $(\tau)$ represents a time constant.

The rate of increase in luminous intensity and the time constant show an increase with increasing TOPO concentration ($C_{TOPO}$) (see FIGS. 13A to 13C). Here, I represents luminous intensity, $I_0$ represents initial luminous intensity, and $I_\infty$ represents saturated luminous intensity. The light emission wavelength of each CdSe nanoparticle thin films was 570 nm.

Application Example 2-1

FIGS. 14A to 14C show the principle underlying an application, to a data recording medium, of an optical memory device which can increase a signal-to-noise ratio of an image recorded or memorized by the TDLM effect and/or can significantly extend the time during which the image is stored or retained. In FIG. 14A, a solid substrate 52 is coated with a thin film 51 comprising a mixture of nanoparticles and an organic compound. The image which is recorded on or retained in the nanoparticle thin film by exposure is imparted with a high contrast (a signal-to-noise ratio) and/or is stored or retained for a long period of time by adjustment of the property of the organic compound. As a result, the image can be semipermanently or permanently reserved. The same also applies to optical memory devices such as those shown in FIGS. 14A and 14B, wherein a nanoparticle thin film 53 and an organic compound film 54 are stacked in alternating layers.

Example 3-1

CdSe nanoparticles having a mean particle size of 3.7 nm were dispersed into toluene, thereby preparing a suspension having a CdSe concentration of 5 wt. %. A glass substrate on which Ag had been deposited to a thickness of about 60 nm through vacuum deposition was coated with 1 ml of the suspension at a rotation speed of 3000 rpm for 10 minutes through spin coating, thus forming a thin film. The thus-formed film was dried in air for 24 hours and in a vacuum for 24 hours (at room temperature). The thus-formed CdSe nanoparticle thin film formed on Ag showed initial luminous intensity and a significant decrease in the TDLM effect (see FIG. 17), thus suggesting migration of electrons along a boundary surface between the CdSe nanoparticle thin film and Ag. As shown in FIGS. 16A and 16B, a significant reduction in the TDLM effect was observed in conjunction with initial luminous intensity. So long as a photoconductive thin film is provided below a substrate as an underlying layer in the manner as shown in FIG. 18 by application of the above-mentioned principle, there can be embodied an device capable of effectuating writing and erasing operations while controlling the TDLM effect by means of light.

Application Example 3-1

FIGS. 19A and 19B show the principle underlying an application, to a data recording medium, of an optical memory device which can erase an image recorded or memorized by the TDLM effect. In FIG. 19A, a photoconductive thin film 64 is deposited on a solid substrate 65 in a vacuum, and the photoconductive thin film 64 is coated with a nanoparticle thin film 61, thus constituting a multilayered structure. Provided that the wavelength of light which excites the nanoparticle thin film 61 is wavelength $\lambda_1$ and the wavelength of light which changes (or increases) the conductivity of the photoconductive thin film is wavelength $\lambda_2$, the photoconductive thin film 64 does not absorb light of wavelength $\lambda_1$. Even if the photoconductive thin film 64 absorbs light of wavelength $\lambda_1$, no changes arises in the conductivity of the photoconductive thin film 64. The nanoparticle thin film 61 allows light of wavelength $\lambda_2$ to pass through. Even if the nanoparticle thin film 61 absorbs light of wavelength $\lambda_2$, only a trace amount of light is absorbed. Materials are used in combination so as to satisfy the stipulation that the materials induce little excitation. Hence, an image is written by use of light of wavelength $\lambda_1$, and the conductivity of the photoconductive thin film 64 is increased by means of light of wavelength $\lambda_2$, thereby inducing electron migration and erasing a portion or the entirety of the image. The same also applies to devices comprising the nanoparticle thin film 61 formed on the substrate 65 and the photoconductive thin film 64 formed on the nanoparticle thin film 61 as shown in FIG. 19B, and to devices comprising a mixed layer 66 in which nanoparticles and photoconductive material are mixed, formed on a substrate 65 as shown in FIG. 20.

Example 4-1

CdSe nanoparticles having a mean particle size of 3.7 nm were dispersed into toluene, thereby preparing a suspension having a CdSe concentration of 5 wt. %. A glass substrate was coated with 1 ml of the suspension at a rotation speed of 3000 rpm for 10 minutes through spin coating, thus forming a thin film. The thus-formed film was dried in air for 24 hours and in a vacuum for 24 hours (at room temperature). Through RF sputtering, a thin film was formed from $SiO_x$ on the CdSe nanoparticle thin film provided on the glass substrate. More specifically, a target $SiO_2$ was subjected to RF sputtering under the following conditions; a back pressure of $7 \times 10^{-6}$ Torr, an Ar pressure of 5 mTorr, and a sputtering rate of 4 angstroms/sec, with the result that a protective film of $SiO_x$ was formed to a thickness of 100 nm on the CdSe nanoparticle thin film. After formation of the $SiO_x$ protective film, the spectrum of the light emitted from the multilayered films was measured through use of a fluorophotometer. Light of 400 nm wavelength was used as excitation light. The intensity of spectrum measured immediately after formation of the $SiO_x$ protective film became considerably weaker than that measured before formation of the protective film (see FIG. 21A). The wavelength of the light emitted from the CdSe nanoparticle thin film was 600 nm. The reason for this is considered to be that the CdSe nanoparticle film is affected by reverse sputtering during the sputtering process or is damaged. The CdSe nanoparticle thin film was further continuously exposed to the excitation light (of 400 nm) for one hour, and the spectrum of the light was measured. From the result of such measurement, the luminous intensity was found to become about 14 times as strong as that measured immediately after formation of the $SiO_x$ protective film (see FIGS. 21A and 21B). The rate of increase in luminous intensity is seven to eight times that measured in the CdSe nanoparticle thin film which does not have a $SiO_x$ protective film. In order to examine attenuation of the thus-increased luminous intensity in a dark place, after the laminated films had been stored in air and in a dark place for about one week, the spectrum of the light emitted from the film was measured. After the laminated films had been reserved for eight days in a dark place, the luminous intensity that had been amplified to about 14 times the initial luminous intensity through exposure for one hour was found to have dropped by about 30%. The laminated films were further stored for ten days in a dark place, but no drop in the luminous intensity of the films was found (see FIG. 21B). In the case of the CdSe nanoparticle film not having a $SiO_x$ protective film, the luminous intensity recovers its initial level within one or two days (the degree of recovery of luminous intensity may change according to a temperature or humidity). Consequently, the time during which luminous intensity is retained was prolonged by factor of at least ten. From the attenuation curve shown in FIG. 21B, it can be readily understood that recovery of luminous intensity to the initial level will require a period of time of the order of months. In this case, the period of time during which luminous intensity is retained is increased by a factor on the order of ten.

In FIG. 21B, the luminous intensity corresponds to the intensity of light of 600 nm wavelength and is normalized with respect to initial luminous intensity (i.e., the luminous intensity of the CdSe nanoparticle film before exposure for one hour).

Example 4-2

CdSe nanoparticles having a mean particle size of 3.4 nm were dispersed into toluene, thereby preparing a suspension having a CdSe concentration of 5 wt. %. A glass substrate was coated with 1 ml of the suspension at a rotation speed of 3000 rpm for 10 minutes through spin coating, thus forming a thin film. The thus-formed film was dried in air for 24 hours and in a vacuum for 24 hours (at room temperature). Under these conditions, two samples were prepared. In one of these samples, a protective film was formed from $SiO_x$ to a thickness of 100 nm on the CdSe nanoparticle thin film, as in the case with Example 1. The spectra of the light emitted from the respective samples were measured through use of a fluorophotometer. Light of 400 nm wavelength was used as excitation light, and the spectrum of excitation light are shown in FIGS. 22A and 22B (i.e., the spectra indicated by broken lines in the drawings). The wavelength of the light emitted by the CdSe nanoparticle thin film was 570 nm.

FIG. 22A shows a sample having a $SiO_x$ protective film, and FIG. 22B shows a sample not having the $SiO_x$ protective film. The spectrum of the sample having the $SiO_x$ protective film is weaker than that of the sample not having $SiO_x$ protective film (through comparison between the spectra indicated by the broken lines shown in FIGS. 22A and 22B, respectively). This is considered to be ascribable to damage imparted to the CdSe nanoparticle thin film by sputtering or other processes, as mentioned previously. These samples were subjected to heat treatment (annealing) in a dark place at 50° C. for one hour. Subsequently, the spectra of the light emitted from the respective samples were measured in the manner analogous to that mentioned previously. FIGS. 22A and 22B show the spectra of the samples (indicated by solid lines). The luminous intensity of the sample having the $SiO_x$ protective film decreased about 15% as compared to that measured before annealing (see FIG. 22A). The luminous intensity of the sample not having the $SiO_x$ protective film decreased by about 70% as compared with that measured before annealing. Further, the peak of scattering by TOPO (a small peak observed in the vicinity of 500 to 540 nm in FIGS. 22A and 22B) was also diminished in conjunction with the base line (FIG. 22B). These results also suggest the possibility of the ability to improve the ambient characteristics of the CdSe nanoparticle thin film (e.g., a temperature characteristic or the like).

Application Example 4-1

FIG. 23 shows the principle underlying an application, to a data recording medium, of an optical memory device which can increase a signal-to-noise ratio of an image recorded by the TDLM effect and/or can significantly prolong the time during which the image is retained or reserved. In FIG. 23, a solid substrate 72 is coated with a nanoparticle thin film 71, and an insulating material film 73 is deposited on the nanoparticle thin film 71 in a vacuum through sputtering, thereby constituting a multilayered structure. By satisfying requirements, such as a superior insulating characteristic of the insulating material or a high humidity cut-off characteristic, which would be achieved by a closely-packed film structure, there is achieved a high contrast (signal-to-noise ratio) of the image recorded in the nanoparticle thin film through exposure and/or retention or reservation of the image for a long period of time. As a result, semipermanent or permanent reservation of an image becomes feasible. The same also applies to an optical memory device comprising an alternating multilayer structure.

Example 5-1

CdSe nanoparticles having a mean particle size of 3.7 nm were dispersed into toluene, thereby preparing a suspension having a concentration of 2.3 wt. %. A silicon wafer rinsed thoroughly with sulfuric acid was coated with 1 ml of the suspension at 21° C. and 40% humidity for 10 minutes through spin coating while the rotation speed was changed over the range 1000 to 5000 rpm. Although the time during which spin coating is performed may change according to the type of solvent, the temperature, and the humidity, the time is preferably one minute or more. The silicon wafer was dried in a desicator at room temperature under a normal pressure for about 24 hours. Within the scope in which the object of the present invention is achieved, the silicon wafer may be dried under reduced or increased pressure in a heated or cooled state and in an inert gas environment. The CdSe nanoparticle thin film formed on the silicon wafer exhibited a noticeable TDLM effect. From the spectrum of the light emitted from the CdSe nanoparticle thin film upon exposure to excitation light of 400 nm wavelength, only a luminous intensity at 600 nm, which is the original emission peak of the CdSe nanoparticle thin film, was extracted. The thus-extracted spectrum was plotted as a function of the rotation speed used for spin coating and is shown in FIG. 25A. Of the nanoparticle thin films, the nanoparticle thin film formed at a rotation speed of 1000, the nanoparticle thin film formed at a rotation speed of 3000, and the nanoparticle thin film formed at a rotation speed of 5000 were subjected to measurement of thickness through use of an atomic force microscope (AFM). The thus-measured thicknesses were plotted as a function of rotation speed used for spin coating and are shown in FIG. 25B. As can be seen from both FIGS. 25A and 25B, luminous intensity and film thickness are diminished with an increase in the number of rotations. However, in the vicinity of a rotation speed of 3000 rpm, the rate of decrease in both luminous intensity and film thickness is diminished, thus suggesting that the nanoparticle thin film approaches a single layer film corresponding to the size of a single particle. In fact, the result of the measurement performed by the AFM suggests that a single layer film is formed in the vicinity of the range of a rotation speed of 5000 rpm. The behavior of the nanoparticle thin film is explained by means of the following phenomenological model by extension of a model [Melo, F. et al., Phys. Rev. Lett., 63, 1958 (1989)] representing the dependence of a film thickness on the number of rotations when a droplet spreads over an infinitely wide substrate in conjunction with rotation of the substrate.

$$h(\omega) = d_p + \alpha/\omega \tag{5}$$

where "h" represents a film thickness, "$d_p$" represents the diameter of a particle, $\omega$ represents the speed of rotation, and $\alpha$ represents a fitting parameter. A solid line shown in FIG. 25B represents fitting of experimental data sets according to Equation (5).

As shown in FIG. 26, a good correlation exists between the intensity of light emitted from the CdSe thin film and the film thickness measured by use of the AFM. In this CdSe thin film, luminous intensity increases so as to be proportional to film thickness.

This correlation can be expressed by the following model.

$$\Delta I = \Delta I_1 + \Delta \phi A (1 - \in)(h - d_p) \tag{6}$$

$$\Delta I = (I_{600}(0) - I_{650}(0))/I_{650}(0)$$

where $$\Delta \Phi = (\Phi_{600} - \Phi_{650})/\Phi_{650}.$$

$\Phi_{600}$ represents luminous efficiency at 600 nm; $\Phi_{650}$ represents luminous efficiency at 650 nm; A represents an area exposed to excitation light; and $\in$ represents a porosity and corresponds to about 0.4 in the case of random packing. The solid line shown in FIG. 25A represents fitting of experimental data according to Equations (5) and (6).

The microstructure of the CdSe thin film samples was observed under a high-resolution SEM. No significant change was observed in the microstructure in any of the samples produced at the rotational speeds from 1000 to 5000 rpm. FIG. 27 shows a photograph of the CdSe nanoparticle thin film produced at a rotation speed of 1000 rpm, the photograph having been produced by the high-resolution SEM. As can be seen from the drawing, nanoparticles integrated at high density were observed. White spots observed in the drawing correspond to CdSe nanoparticles.

Reference Example 5-1

CdSe nanoparticles having a mean particle size of 3.7 nm were dispersed into toluene, thereby preparing a suspension having a CdSe concentration of 10 wt. %. A hollow Teflon cell—in which a hole having a radius of 1 cm is formed—was placed on a glass substrate rinsed thoroughly with sulfuric acid. 25 ml of the thus-prepared suspension was poured into the Teflon cell and was evaporated and deposited, with the result that a CdSe nanoparticle thick film was produced. This thick film did not exhibit any TDLM phenomenon, but rather a light darkening phenomenon was observed. The reason for this is considered to be that Brownian motion of particles becomes more dominant than the evaporation rate and that a microstructure of the thick film becomes different from that formed in Example 1.

Example 6-1
(Preparation of Recording Liquid)

11.1 mg of CdSe nanoparticles having a mean diameter of 3.4 nm were dispersed into 0.5130 grams of chloroform. 1502.5 mg of sodium dodecylsulfonate and 9530 mg of ion-exchanged water were added to the dispersion and the resultant solution was shaken for about 5 minutes, thereby preparing nanoparticle-containing emulsion.

| COMPOSITION OF NANOPARTICLE-CONTAINING EMULSION | AMOUNT OF USE (PARTS BY WEIGHT) |
|---|---|
| CdSe nanoparticle having a mean particle size of 34 angstroms | 0.1 |
| Sodium dodecylsulfonate | 13.0 |
| Chloroform | 4.4 |
| Ion-exchanged water | 82.5 |
| Total amount | 100.0 |

(Preparation of Thin Film by Ink-jet Coating Method)

Through use of the nanoparticle-containing emulsion produced by the method mentioned in connection with the above example, a 12.6-by-6.1-cm square on an OHP (overhead projector) film (Model No. Mc701) forusein an ink-jetprinter (Mitsubishi Chemical Company Ltd.) was solidly printed through ink-jet coating in an ink-jet printer (trade name: DeskWriter 660C, Hewlett Packard).

(Measurement of Photoluminescence)

The nanoparticle thin film produced on the OHP sheet by the above method was stored and dried for 24 hours in a dark place at room temperature. The solidly-painted portions were cut into four pieces, each measuring 3 cm×3 cm, in order to exaggerate photoluminescence. Photoluminescence (hereinafter abbreviated "PL") of the film was measured while the four pieces were stacked together. For the purpose of exaggerating the peak of PL. FIG. 28 shows the profile of PL. Light emission caused by the CdSe nanoparticles is observed in the vicinity of 555 nm, and it is ascertained that good printing is effected.

A peak arising at a wavelength of 535 nm and a peak arising at a wavelength of 600 nm are induced by molecular vibration of trioctylphosphineoxide which is a capping agent and is used in synthesizing CdSe through use of the colloidal-chemistry technique.

(Ascertainment of TDLM Phenomenon)

After the thin film containing CdSe nanoparticles had been continuously subjected to excitation light of 400 nm wavelength for one hour, the spectrum of PL of the thin film was measured again. An increase in PL and exhibition of the TDLM phenomenon were ascertained. FIG. 29 shows such an increase in PL and the TDLM phenomenon.

Example 7-1

CdSe nanoparticles having a mean particle size of 3.7 nm were dispersed into toluene, thereby preparing a suspension having a CdSe concentration of 5 wt. %. A glass substrate was coated with 1 ml of the suspension through spin coating at a rotational speed of 3000 rpm for 10 minutes, thus forming a thin film. The thus-formed film was dried in air by a desiccator for 24 hours (at room temperature). Curve A shown in FIG. 30A represents the spectrum of photoluminescence (hereinafter abbreviated "PL") emitted by the thus-produced CdSe nanoparticle thin film. After the thin film had been exposed to UV rays of 365 nm wavelength for 20 minutes, the PL of the film was measured. An increase in the intensity of PL and an increase in the TDLM effect were ascertained (as indicated by curve B shown in FIG. 30A). Subsequently, after the thin film was stored in a dark place for one hour at room temperature, the intensity of PL of the film was measured. No decrease in PL intensity was observed (as indicated by curve C shown in FIG. 30A). The TDLM effect of the nanoparticle thin films formed by the same method was ascertained (as indicated by curves D and E shown in FIG. 30B). After the films had been stored in a dark plate at room temperature for 20 minutes, the films were heated for 20 minutes at 100° C. through use of a low-temperature desiccator (DP-23, Yamato Science Co., Ltd.). In the following description, unless otherwise specified, this low-temperature desiccator was used for heat treatment. After lapse of 20 minutes following completion of the heat treatment, PL was measured. The intensity of PL was decreased until it became lower than the initial intensity of PL (as indicated by curve F shown in FIG. 30B). It is thought that the sample had already been excited to a certain degree by exposure to indoor light at the time of drying of the sample and measurement of PL and that the intensity of PL had been diminished so as to become lower than initial intensity. Next, the thin film was exposed to UV rays for 20 minutes, and the intensity of PL of the film was measured. The results show that the intensity of PL is increased again and the TDLM effect is yielded, thus showing a possibility of rewriting (indicated by curve G shown in FIG. 30B). FIG. 31 shows 600 nm peaks of PL spectra which are plotted with reference to time. In the drawing, solid lines H and I are formed by connecting measured points through use of a straight line. Because of radiation of light during measurement of PL, the individual measured points are located slightly higher than the points measured after UV irradiation or heat treatment.

Example 7-2

CdSe nanoparticles having a mean particle size of 3.7 nm were dispersed into toluene, thereby preparing a suspension having a CdSe concentration of 5 wt. %. A glass substrate was coated with 1 ml of the suspension through spin coating at a rotational speed of 3000 rpm for 10 minutes, thus forming a thin film. The thus-formed film was dried in air and in a dark place by a desiccator for 24 hours (at room temperature) and then dried in a dark place at reduced pressure of 10 mmHg or less and at 50° C. for 24 hours. The thus-formed CdSe nanoparticle thin films exhibited the TDLM effect (as indicated by curves J and K shown in FIG. 32). After having been stored in a dark place for 20 minutes, the thin films were heated at 45 (for 20 minutes. After the thin films were stored in a dark place again for 20 minutes, the intensity of PL was measured. The results of such measurement show no appreciable decrease in PL intensity. Further, after lapse of 20 minutes, the thin films were heated at 100° C. for 20 minutes. After the thin films were further stored in a dark place for 20 minutes, the intensity of PL of the films was measured. The results of such measurement show a decrease in the intensity of PL to the initial intensity. Subsequently, the thin films were exposed to UV rays (of 365 nm wavelength) and the intensity of PL of the films was measured. The results of measurement show that the intensity of PL is increased again, the TDLM effect is yielded, and rewriting is enabled. FIG. 33 shows a graph formed by plotting the peaks at about 600 nm with reference to time. A solid line O in FIG. 33 is formed by connecting measured points. Since the samples were exposed to excitation light used for measurement of PL, the values of the respective measured points are slightly greater than those obtained after exposure to UV rays or after heat treatment. The point measured at 80 minutes is increased as compared with the point measured at of 20 minutes. The reason for this is that the luminous intensity was increased by excitation light used at the time of measurement of PL. Specifically, drying the sample to a great extent is thought to prevent a slight reduction in PL, which would otherwise be caused during treatment at room temperature, and to result in high measured values.

Example 7-3

CdSe nanoparticles having a mean particle size of 3.7 nm were dispersed into toluene, thereby preparing a suspension having a CdSe concentration of 5 wt. %. A glass substrate was coated with 1 ml of the suspension through spin coating at a rotational speed of 3000 rpm for 10 minutes, thus forming a thin film. The thus-formed film was dried in air in a dark place by a desiccator for 24 hours (at room temperature) and then dried in a dark place at reduced pressure of 10 mmHg or less and at 50° C. for 24 hours. The thus-formed CdSe nanoparticle thin film was subjected to image recording, reading, and erasure according to methods shown in FIGS. 35A to 35C. A recorded image is shown in FIG. 36A, and an erased image is shown in FIG. 36B. As shown in FIG. 36A, the diameter of a spot of excitation light 91 (e.g., a semiconductor laser beam of 430 nm wavelength) was enlarged to about 1 cm by means of a beam expander 88, and the excitation light 91 was then patterned through use of a mask 89 having a circular aperture formed therein. After being exposed to the excitation light 91 patterned by the mask 89 for 15 minutes, the CdSe nanoparticle thin film 10 formed by the previously-mentioned method was left in a dark place for several minutes. As shown in FIG. 35B, the entire surface of the nanoparticle film 90 was uniformly exposed to UV rays (of 365 nm wavelength) 94 to thereby read an (O-shaped) image recorded on the nanoparticle film 90, and the thus-read image was photographed by the camera 13 at an exposure time of one minute. The thus-photographed image is shown in FIG. 36A. The nanoparticle thin film 90, which had been photographed in the step shown in FIG. 35B, was removed. As shown in FIG. 35C, a stainless rod 95 heated to 100° C. was pressed, for 10 seconds, against the surface of the substrate which is not coated with nanoparticles, thereby heating and erasing a part of the recorded image. The substrate was left in a dark place for several minutes. According to the method shown in FIG. 35B, the image was read again, and the thus-read image was photographed by the camera 93. FIG. 36B shows the thus-photographed image. As can be seen from FIG. 36B, of an area 97 in which the image is written, only a heated portion 99 has weak luminous intensity, and the recorded image is erased. An area 18 outside the "O-shaped" area 97, which had not been exposed to the laser beam during the image writing process, was also exposed to UV rays (designated by 94 shown in FIG. 35B) for reading use, and hence the luminous intensity of the area 98 was increased. However, the luminous intensity of the area 98 is found to be reduced by heating.

Application Example 7-1

FIGS. 34A and 34B show the principle underlying an application, to a data recording medium, of an optical memory device which can erase an image recorded or stored by means of the TDLM effect. In FIGS. 34A and 34B, a solid substrate 82 is coated with a nanoparticle thin film 81. Provided that the wavelength of light 83 used for exciting a nanoparticle thin film is λ1 and the wavelength of light 85 used for erasing an image is λ2, an image 4 can be written through use of light of wavelength λ1. Further, as indicated by reference numeral 86 shown in FIG. 34B, a portion or the entirety of the thus-written image 84 can be erased by increasing the temperature of the image 84 through use of light of wavelength Example 8-1

CdSe nanoparticles having a mean particle size of 3.4 nm were dispersed into toluene, thereby preparing a suspension having a CdSe concentration of 5 wt. %. A glass substrate was coated with 1 ml of the suspension through spin coating at a rotational speed of 3000 rpm for 10 minutes, thus forming a thin film. The thus-formed film was dried in air for 12 hours and in a vacuum for 48 hours (at room temperature). The initial intensity of light emitted by the CdSe nanoparticle thin film, which was formed on the glass substrate in the manner as mentioned above, was measured through use of a fluorophotometer (indicated by a broken line provided in FIG. 37A). Light of 400 nm wavelength was used as excitation light, and the wavelength of the light emitted by the CdSe nanoparticle thin film was 570 nm.

Next, this sample (sample 1) was continuously exposed to sunlight for 90 minutes. FIGS. 39A to 39C show chronological changes in the intensity of sunlight (solar radiation). FIG. 39A shows chronological changes in the intensity of light of 400 nm wavelength included in sunlight; FIG. 39B shows chronological changes in the illumination intensity of sunlight; and FIG. 39C shows chronological changes in atmospheric humidity. The mean intensity of sunlight was 764.5 $\mu W/cm^2$; the mean illumination intensity of sunlight was 811.6 lux; and the mean humidity was 75.3%. Further, ambient temperature was 24° C. Since the measurement was performed on a rainy day, the illumination intensity of sunlight is considerably weak. After the sample had been continuously exposed to sunlight for 90 minutes, the intensity of light emitted from the nanoparticle thin film was measured by means of a fluorophotometer in the same manner as employed in the measurement of initial luminous intensity (indicated by a solid line shown in FIG. 37A). The luminous intensity of the nanoparticle thin film was increased by the TDLM effect so as to become about 1.7 times the initial luminous intensity (see FIG. 37B). Another sample (Sample 2) was formed by coating a glass substrate with a CdSe nanoparticle thin film under exactly the same conditions as those under which the above-mentioned thin film was produced. The TDLM effect of the Sample 2 was measured at 24° C. and 70% humidity through use of fluorophotometer (see FIG. 38) while light of 400 nm wavelength was used as excitation light. The initial luminous intensity of Sample 2 is substantially equal to that of the sample 1. However, the rate of increase in luminous intensity of the Sample 2 was greater than that at which the luminous intensity is increased by exposure of the sample to sunlight (the rate of increase is increased by a factor of about 6.4 when the sample is continuously exposed for 70 minutes). The light emitted by the fluorophotometer is monochrome and has an intensity of about 950 $\mu w/cm^2$. In contrast, although the luminous intensity of light of 400 nm wavelength in sunlight is somewhat weak, light of another wavelength capable of effecting excitation is also radiated simultaneously. The above results suggest that the speed or rate at which luminous intensity is increased by the TDLM effect can be controlled by radiating light of another appropriate wavelength onto the CdSe nanoparticle thin film simultaneous with radiation of weak excitation light. The sunlight was converted into monochrome light of 400 nm wavelength by filtering, and the monochrome light was radiated onto the nanoparticle thin film. In this case, a photoluminescence intensity ratio between an exposed region and an unexposed region on the nanoparticle thin film was found to reach a maximum of at least 6.

Application 8-1

FIGS. 40A to 40C are schematic diagrams showing a wristwatch-type handy UV-radiation sensor which is an example of application, to an UV sensor, of the integrating optical sensor capable of measuring the dose of light (i.e., the product of light energy and irradiation time) by utilization of the TDLM effect. FIG. 40A is a top view of the wristwatch-type handy UV-radiation sensor, and FIG. 40B is a vertical cross-sectional view of the same. In FIG. 40B, the sensor comprises in principle a solid substrate 205 coated with a nanoparticle thin film 206. Although not shown in the drawings, the nanoparticle thin film 206 may be further provided with a protective film consisting of $SiO_2$ or a like substance.

In FIGS. 40A and 40B, a cap-like mask comprises an unexposed region formed from material such as aluminum. In FIGS. 40A to 40C, a window (a region to be exposed) 202—which is a mere aperture or is formed from an arbitrary substance—is formed in the unexposed region 201 formed from aluminum or a like substance. The mask is fixed to the solid substrate 205 by means of a hinge 203 and can be opened and closed in a manner as shown in FIG. 40C. The window 202 formed in the cap-shaped mask may be provided with a filter, such as an ND filter, a sharp-cut filter, or a polarizing filter, or a plate-like substance consisting of glass or polymer. The device structure or main unit—which comprises the solid substrate 205 coated with the nanoparticle thin film 206 and the cap-shaped mask which has the window 202 formed therein and is fixed to the solid substrate 205 by the hinge 203—can be removably attached to a user's wrist like the case of a wristwatch. Depending on the size of the main unit, so long as a ring formed from metal or a like substance is attached to the main unit in place of a strap 204, the UV-radiation sensor can be formed into a ring. If the ring is changed to a chain, the sensor can also be formed into a necklace. When the nanoparticle thin film 206 is exposed to UV rays through the window 202, the nanoparticle thin film 206 is divided into a region exposed through the window 202 and an unexposed region shielded by the unexposed region 1 of the cap-like mask. Due to the TDLM effect, the intensity of photoluminescence emitted from the exposed region is increased with an increase in the dose of UV rays. As shown in FIG. 40C, so long as the entire nanoparticle thin film 206 is uniformly exposed to excitation light for a certain length of time, a mask pattern—which is formed by the cap-shaped mask and reflects the photoluminescence intensity ratio (contrast) between the exposed region and the unexposed region—becomes visible. By visually observing the photoluminescence intensity ratio (contrast) between the exposed region and the unexposed region, or by measuring the contrast through use of a detector such as a photodetector, the user can ascertain a total dose of UV rays.

A portion of the region of the nanoparticle thin film 206 to be exposed to UV rays is sufficiently excited beforehand through the window 202, by means of light of appropriate wavelength (i.e., the photoluminescence intensity of the portion is brought to saturation in advance). Subsequently, the nanoparticle thin film 206 is exposed to UV rays through the window 202. The photoluminescence intensity of the pre-excited portion has already attained saturation and does not change. However, the photoluminescence intensity of the remaining portion of the exposed region is increased. The photoluminescence intensity ratio (contrast) between the pre-excited portion and the portion of the UV-exposed region that had not been excited previously may be measured.

Application Example 8-2

FIGS. 41A to 41C are schematic diagrams showing a UV-radiation sensor seal for use in preventing sunburn, which is an example of application, to an UV sensor, of the integrating optical sensor capable of measuring the dose of light (i.e., the product of light energy and irradiation time) by utilization of the TDLM effect. FIG. 41A is a top view of the UV-radiation sensor seal, and FIG. 41B is a vertical cross-sectional view of the same. As shown in FIG. 41B, in principle the sensor seal comprises a solid substrate 211 which is formed from polymer or paper and is coated with a nanoparticle thin film 210. The nanoparticle thin film 10 may be further provided with a protective film 209 consisting of polymer, vinyl, $SiO_2$, or a like substance. The lower surface of the solid substrate 211 is provided with a layer 212 comprising an adhesive or glue, with the result that the sensor can also be affixed to any place as a seal.

As shown in FIGS. 41A and 41B, a sheet-like mask comprises an unexposed region 207 formed from an arbitrary substance. As shown in FIGS. 41A to 41C, a window (a region to be exposed) 208—which is a mere aperture or is formed from an arbitrary substance—is formed in the unexposed region 207 formed from aluminum or a like substance. The mask is fixed to the protective film 209 by means of an adhesive or glue and can be opened and closed, or removed in such a manner as shown in FIG. 41C. The window 208 formed in the sheet-like mask may be provided with a filter, such as an ND filter, a sharp-cut filter, or a polarizing filter, or a plate-like substance consisting of glass or polymer. Only light of the wavelength to be measured can be radiated to the seal by selection of the filter, or an absorption wavelength band can be adjusted within a desired range by changing the size of nanoparticles included in the nanoparticle thin film 210 or material of the nanoparticles. Further, the dose of light of wavelength causing sunburn can be measured by selection of a filter, the size of nanoparticles, and/or material of the nanoparticles.

When the nanoparticle thin film 210 is exposed to sunlight through the window 208, the nanoparticle thin film 210 is divided into a region exposed through the window 208 and an unexposed region shielded by the sheet-like mask 207. The intensity of photoluminescence emitted from the exposed region is increased by the TDLM effect with an increase in the dose of UV rays included in sunlight. As shown in FIG. 41C, so long as the entire nanoparticle thin film 210 is uniformly exposed to solar rays at a certain time by opening or removing the sheet-like mask 207, a mask pattern-which is formed by the sheet-like mask 7 and reflects the photoluminescence intensity ratio (contrast) between the exposed region and the unexposed region—becomes visible. By visually checking the photoluminescence intensity ratio (contrast) between the exposed region and the unexposed region through comparison, the user can ascertain a total dose of UV rays, and sunburn can be prevented.

Even when the seal is not provided with the sheet-like mask 207, a portion of the nanoparticle thin film 210 is sufficiently excited beforehand by means of light of appropriate wavelength (i.e., the photoluminescence intensity of the portion is brought to saturation in advance). Subsequently, the overall nanoparticle thin film 210 is exposed to sunlight. The photoluminescence intensity of the pre-excited portion has already attained saturation and does not change. However, the photoluminescence intensity of the remaining portion of the exposed region is increased. From the photoluminescence intensity ratio (contrast) between the pre-excited portion and the portion of the UV-exposed region that had not been excited previously, the total dose of UV rays can be ascertained.

Example 9-1

CdSe nanoparticles having a mean particle size of 3.4 nm were dispersed in toluene, thereby preparing a suspension having a CdSe concentration of 5 wt. %. A glass substrate was coated with 1 ml of the suspension through spin coating at a rotation speed of 3000 rpm and 10 minutes, thus forming a thin film. The thus-formed film was dried in air for 24 hours and in a vacuum for 48 hours (at room temperature).

The transmissivity and reflectance spectrum of the CdSe nanoparticle thin film, which was formed on the glass substrate in the manner as mentioned above, were measured through use of a spectrophotometer. An integrating sphere was used for spectrum measurement, and measurement wavelength ranged from 220 to 2000 nm. Further, in order to minimize errors, the spectrophotometer was warmed up for one hour after startup, and baseline values was measured before commencement of all measurement operations.

As mentioned previously, after measurement of transmissivity and reflectance spectrum of the CdSe nanoparticle thin film, the nanoparticle thin film was continuously exposed to UV rays (having a wavelength of 365 nm and an intensity of 150 $\mu W/cm^2$ and serving as a writing beam) for one hour. Subsequently, transmittance and the reflectance spectrum of the thin film were measured again. The results of such measurement showed no difference between transmittance before UV radiation and transmittance after UV radiation, but showed a significant reduction in reflectance spectrum in the range of 750 nm (see FIGS. 42A and 42B). The absorption edge of the CdSe nanoparticle thin film resides at about 600 nm, and absorption is not observed in the range of wavelengths longer than 600 nm (see FIG. 43). Accordingly, a signal written by the writing beam can be read without affecting the reflectivity of the nanoparticle thin film, so long as light ranging 600 to 750 nm is used as reproduction light. Further, reduction in reflectivity is a function of the time at which the writing beam is radiated or a function of intensity of the writing beam. Therefore, a single recording pit signal can be imparted with gradation, thus enabling considerably high-density recording.

Application Example 9-1

FIGS. 44A to 44C show the principle underlying a method of recording or reproducing data on or from an optical disk, which method enables reproduction of a signal or data by detection, as a difference in reflectivity, of a signal or data recorded or stored by means of the TDLM effect. As shown in FIG. 44A, a solid substrate 222 is coated with a nanoparticle thin film 221, and the nanoparticle thin film 221 is coated with a protective film 223 formed from a substance such as $SiO_2$, thus constituting an optical disk. The optical disk is exposed to excitation light (or writing light) 225 in response to a signal to be recorded, with the result that the reflectivity of the exposed region on the nanoparticle thin film 221 is diminished, thereby forming recording pits 224. At the time of reproduction of the recorded signal, reproduction light 226 is radiated onto the optical disk, and light 227 reflected by the disk is detected. The signal is reproduced by reading a difference in reflectivity between the recording pits and a land. As a recording method, there may be employed a mark position recording method (in which a signal 228 is written into the center of each recording pit 224) shown in FIG. 44B or a mark edge recording method (in which a signal 229 is written into the edge of each recording pit 224) shown in FIG. 44C.

What is claimed is:

1. An optical memory device comprising:
a luminous material comprising luminous nanoparticles which increase and/or memorize a photoluminescence intensity as a function of irradiation energy of excitation light wherein an organic compound comprising at least one element selected from the group consisting of P, N, and S is present on at least a portion of the surface of each luminous nanoparticle, and the quantity of the organic compound is 1 to 50 wt. % with respect to the weight of the luminous nanoparticles.

2. The optical memory device of claim 1, wherein the luminous nanoparticles have a diameter which is smaller than the Bohr radius of the luminous material, whereby excitons generated in the nanoparticles undergo quantum containment state in which the electrons and holes are individually contained as a result of irradiation with excitation light.

3. The optical memory device of claim 2, wherein the nanoparticles are covered with a organic compound thin film comprising at least one element selected from the group consisting of P, N, O and S.

4. The optical memory device of claim 2, wherein the nanoparticles are made of CdSe.

5. The optical memory device of claim 2, wherein the nanoparticles are made of CdS.

6. The optical memory device of claim 1, wherein the nanoparticles are distributed in a TDLM thin film coated on a substrate.

7. The optical memory device of claim 1, wherein the luminous material has a time required for increasing luminous intensity of $1 \times 10^{-12}$ seconds or more.

8. The optical memory device of claim 1, wherein the luminous material has a rate of increase in luminous intensity of 1.1 times or more than an initial luminous intensity.

9. The optical memory device of claim 1, wherein the luminous material has a time during which luminous intensity is stored at a temperature of 77 K or more of 1 second or more.

10. The optical memory device of claim 1, wherein a mean distance between luminous nanoparticles in a cluster thereof falls in a range whose maximum is ten times 4 the diameter of the nanoparticle.

11. The optical memory device of claim 1, wherein the luminous nanoparticles have a particle size of 0.5 to 100 nm.

12. The optical memory device of claim 1, wherein the luminous nanoparticles comprise inorganic compounds.

13. The optical memory device of claim 1, wherein the luminous nanoparticles comprise organic compounds.

14. The optical memory device of claim 1, wherein the luminous nanoparticles comprise a semiconductor.

15. The optical memory device of claim 1, wherein one or more layers are formed on a solid substrate from a film containing luminous nanoparticles.

16. The optical memory device of claim 15, wherein the film comprises a cluster of luminous nanoparticles and has a thickness greater than the diameter of the luminous nanoparticle but less than 1 mm.

17. The optical memory device of claim 1, further comprising luminous nanoparticles and a photoconductive material, wherein a cluster of the luminous nanoparticles and the photoconductive material are present in close proximity to each other.

18. The optical memory device of claim 1, wherein the luminous intensity can be diminished or erased by radiation, onto the optical memory device, of light whose wavelength differs from that of the excitation light.

19. The optical memory device of claim 1, wherein at least a part of a luminous nanoparticle is formed from a protective layer including an insulating material.

20. A nanoparticle thin film manufacturing method comprising forming on a solid substrate a thin film from nanoparticles capable of increasing, or increasing and memorizing, photoluminescence as a function of irradiation time of excitation light or as a function of the dose of excitation light, wherein
the solid substrate is coated by spin coating a suspension formed by suspending nanoparticles in a solvent, while rotating the solid substrate at a speed of 500 rpm or more for 1 minute or more.

21. The nanoparticle thin film manufacturing method of claim 20, wherein the suspension has a nanoparticle content of 0.001 to 10 g/ml.

22. The nanoparticle thin film manufacturing method of claim 21, wherein the solvent comprises an organic compound.

23. The nanoparticle thin film manufacturing method of claim 22, wherein the quantity of organic compound in the suspension is one-ten-thousandth or more the weight of a nanoparticle.

24. The nanoparticle thin film manufacturing method of claim 20, wherein the nanoparticle thin film is dried in air for 30 minutes or more after spin coating at a temperature ranging from −20 to 200° C.

25. The nanoparticle thin film manufacturing method of claim 24, wherein the nanoparticle thin film is further subjected to drying under reduced pressure after having been dried in air.

26. The nanoparticle thin film manufacturing method of claim 25, wherein the nanoparticle thin film is dried in a vacuum of $1 \times 10^5$ Pa or less at −20 to 200° C. for 1 to 24 hours.

27. A nanoparticle thin film manufacturing method of forming on a solid substrate a thin film comprising nanoparticles capable of increasing, or increasing and memorizing, a luminous intensity as a function of irradiation time of excitation light or as a function of the dose of excitation light, wherein the solid substrate is ink-jet coated with a dispersed solution formed by dispersing nanoparticles in an emulsion whose continuous phase comprises water and whose dispersed phase is an oily phase.

28. The nanoparticle thin film manufacturing method of claim 27, wherein the nanoparticle thin film is dried in air for 30 minutes or more after ink-jet coating at a temperature ranging from −20 to 200° C.

29. The photoluminescence erasing method of claim 28, wherein the heat treatment is carried out for a time of from $10^{-9}$ seconds to 1 hour.

30. A photoluminescence erasing method, wherein after the luminous intensity of an optical memory device—which includes luminous nanoparticles capable of increasing, or increasing and memorizing, a luminous intensity as a function of irradiation time of excitation light or as a function of the dose of excitation light—has been increased, or increased and memorized, the optical memory device is subjected to heat treatment, thereby diminishing the luminous intensity.

31. The photoluminescence erasing method of claim 30, wherein the heat treatment is carried out at a temperature of 50 to 200° C.

32. An integrating optical sensor comprising:

a thin film including luminous nanoparticles capable of increasing, or increasing and memorizing, a luminous intensity as a function of irradiation time of excitation light or as a function of the dose of excitation light; and a mask including a region which is exposed to light to be measured and a region which is not exposed to the light.

33. The integrating optical sensor of claim 32, wherein the excitation light has an intensity of 1 $nW/cm^2$ or more.

34. An optical disk comprising, as a recording medium, the optical device of claim 1, wherein at least a portion of the surface of each of the luminous nanoparticles which increase, decrease or memorize reflectivity as a function of irradiation time of excitation light or as a function of the dose of excitation light have an organic compound comprising at least one element selected from the group consisting of P, N, and S.

35. The optical disk of claim 34, comprising luminous nanoparticles deposited on at least one side of a solid substrate.

36. The optical disk of claim 34, wherein the luminous material has a time at which reflectivity is diminished of three hours or less.

37. The optical disk of claim 34, wherein the luminous intensity of the luminous material is diminished to 0.9 times or less than an initial luminous intensity.

38. The optical disk of claim 34, wherein the luminous material has a time during which reflectivity is stored at a temperature of 77 K or more of 1 second or more.

39. The optical disk of claim 34, wherein a signal is recorded by reducing reflectivity by radiation of excitation light onto the optical disk, and a recorded signal is reproduced by detecting a variation in reflectivity through use of light whose wavelength is identical with or differs from that of excitation light.

* * * * *

UNITED STATES PATENT AND TRADEMARK OFFICE
CERTIFICATE OF CORRECTION

PATENT NO. : 6,337,117 B1
DATED : January 8, 2002
INVENTOR(S) : Maenosono et al.

It is certified that error appears in the above-identified patent and that said Letters Patent is hereby corrected as shown below:

<u>Title page,</u>
Item [56], References Cited, after "*cited by examiner" it should read:
-- OTHER PUBLICATIONS
Nasser PEYGHAMBARIAN, et al., Nature, Vol. 383, 1 page only, "NEW STACK SYSTEM FOR RECORDS," October 10, 1996.
M.NIRMAL, et al., Nature Vol. 383, pages 802-805, "FLUORESCENCE INTERMITTENCY IN SINGLE CADMIUM SELENIDE NANOCRYSTALS," October 31, 1996.
pages 722-725, Semiconductor Lasers, "OTHER PUMPING METHODS AND LASER MATERIALS" --

Signed and Sealed this

Fourth Day of February, 2003

JAMES E. ROGAN
*Director of the United States Patent and Trademark Office*